(12) United States Patent
LaDue

(10) Patent No.: US 7,848,358 B2
(45) Date of Patent: Dec. 7, 2010

(54) OCTAVE PULSE DATA METHOD AND APPARATUS

(75) Inventor: Christoph LaDue, Melbourne (AU)

(73) Assignee: Symstream Technology Holdings, Oakleigh, Victoria (AU)

( * ) Notice: Subject to any disclaimer, the term of this patent is extended or adjusted under 35 U.S.C. 154(b) by 2518 days.

(21) Appl. No.: 10/294,765

(22) Filed: Nov. 15, 2002

(65) Prior Publication Data

US 2003/0133423 A1 Jul. 17, 2003

Related U.S. Application Data

(63) Continuation of application No. PCT/AU00/01229, filed on Oct. 10, 2000, and a continuation of application No. 09/573,466, filed on May 17, 2000, now abandoned.

(51) Int. Cl.
*H04J 1/02* (2006.01)
(52) U.S. Cl. .................. 370/494; 370/493; 704/221
(58) Field of Classification Search ................ None
See application file for complete search history.

(56) References Cited

U.S. PATENT DOCUMENTS

| | | | |
|---|---|---|---|
| 3,909,532 A * | 9/1975 | Rabiner et al. ............. 704/215 |
| 4,426,555 A | 1/1984 | Underkoffler |
| 4,471,165 A | 9/1984 | DeFino et al. |
| 5,428,183 A | 6/1995 | Matsuda et al. |
| 5,532,641 A | 7/1996 | Basasubramanian et al. |
| 5,553,194 A * | 9/1996 | Seza et al. .................. 704/221 |
| 5,590,406 A | 12/1996 | Bayley et al. |
| 5,612,974 A * | 3/1997 | Astrachan ................... 375/295 |
| 5,711,012 A | 1/1998 | Bottoms et al. |
| 5,751,718 A * | 5/1998 | Yip et al. .................... 370/468 |
| 5,778,316 A | 7/1998 | Persson et al. |

(Continued)

FOREIGN PATENT DOCUMENTS

EP 0 801 513 A1 10/1997

(Continued)

OTHER PUBLICATIONS

Reference No. P104499EP-PCT; App No. 00969093.4-2412-AU0001229 Supplementary EP Search Report dated Aug. 26, 2004.

(Continued)

*Primary Examiner*—Phuc Tran
(74) *Attorney, Agent, or Firm*—Blakely, Sokoloff, Taylor & Zafman

(57) ABSTRACT

Methods and apparatus are provided for sending data communications over wireless digital voice communications networks which transmit voice communications in voice frames, each of which contains a digitized segment of a voice communication in a voice frame format. The method including the steps of: encoding the data communication into a plurality of data frames, each of the data frames having the same format as the voice frame format; transmitting the data frames over the wireless digital voice communications network; and decoding the data frames to reconstruct the data communication. The apparatus includes: a processor for encoding the data communication into a plurality of data frames, each of the data frames having the same format as the voice frame format; and a transmitter for transmitting the data frames over the wireless digital voice communications network.

19 Claims, 24 Drawing Sheets

U.S. PATENT DOCUMENTS

| | | | |
|---|---|---|---|
| 5,781,593 | A | 7/1998 | Petch et al. |
| 5,818,870 | A | 10/1998 | Yaguchi |
| 5,864,813 | A | 1/1999 | Case |
| 5,905,761 | A | 5/1999 | Je et al. |
| 5,978,365 | A | 11/1999 | Yi |
| H1880 | H * | 10/2000 | Vines et al. .................. 370/310 |
| 6,285,767 | B1 | 9/2001 | Klayman |
| 6,353,745 | B1 | 3/2002 | Wehrend et al. |
| 6,426,960 | B2 * | 7/2002 | Antonio ...................... 370/477 |
| 6,477,176 | B1 * | 11/2002 | Hamalainen et al. ......... 370/435 |
| 6,501,962 | B1 * | 12/2002 | Green ......................... 455/558 |
| 6,584,442 | B1 | 6/2003 | Suzuki et al. |
| 6,958,780 | B1 | 10/2005 | Kawai |
| 7,031,739 | B1 * | 4/2006 | Imura .......................... 455/522 |
| 2001/0033560 | A1 * | 10/2001 | Tong et al. ................... 370/337 |

FOREIGN PATENT DOCUMENTS

| | | |
|---|---|---|
| EP | 0 844 796 A2 | 5/1998 |
| EP | 0 948 154 A2 | 10/1999 |
| WO | WO 95/26603 | 10/1995 |
| WO | WO 97/19569 | 5/1997 |
| WO | WO 97/29566 | 8/1997 |
| WO | WO 98/59449 | 12/1998 |
| WO | WO 98/59449 A2 | 12/1998 |
| WO | WO 99/20021 A2 | 4/1999 |
| WO | WO 99/49677 | 9/1999 |
| WO | WO 99/50963 A2 | 10/1999 |
| WO | WO 99/60757 A1 | 11/1999 |
| WO | WO 00/13432 A2 | 3/2000 |

OTHER PUBLICATIONS

Int'l app No. PCT/AU 00/01229; Int'l filing date: Oct. 10, 2000; IPER dated Sep. 16, 2002.

1st CN Office Action; letter from FA dated Sep. 2, 2005 6886P001CN.

2nd CN Office Action; letter from FA dated Mar. 17, 2006 6886P001CN.

App No. 00 969 093.4-2412; ref No. P104499EP-PCT 6886P001EP examination dated Nov. 23, 2004.

App No. 05016515.8-2416 PCT/; ref No. P104499EP-PCTD1 6886P001EP-D Search Report dated Sep. 28, 2005.

App No. 06075263.1-2416; Ref No. P104499EP-PCTD/EP-D2 Search Report dated Aug. 24, 2006.

GSM 04.11 Version 3.3.0, "Point-to-Point Short Message Service Support on Mobile Radio Interface", ETSI/GSM, Jan. 1993, 73 pg.

Stajano et al., "The Thinnest of Clients: Controlling It All Via Cellphone", *Mobile Computing and Communications Review*, vol. 2, No. 4, p. 1-8.

Indian Patent Application No. 148/DELNP/2005 First Examination Report dated Sep. 19, 2007.

Non-Final Office Action for U.S. Appl. No. 11/029,967, Mailed Dec. 23, 2008, 9 pages.

* cited by examiner

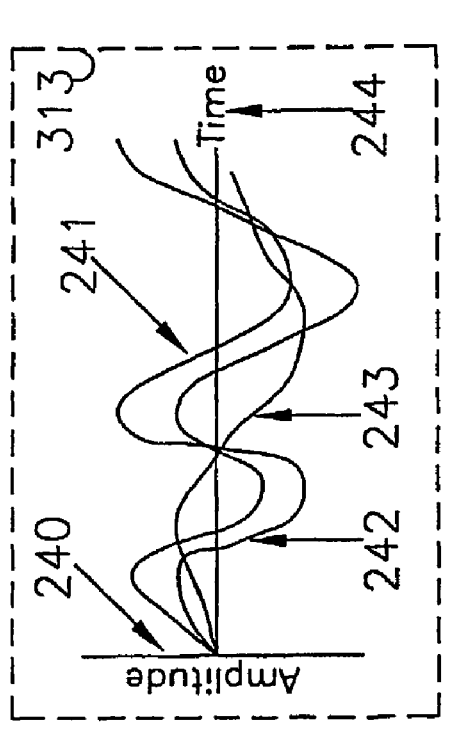
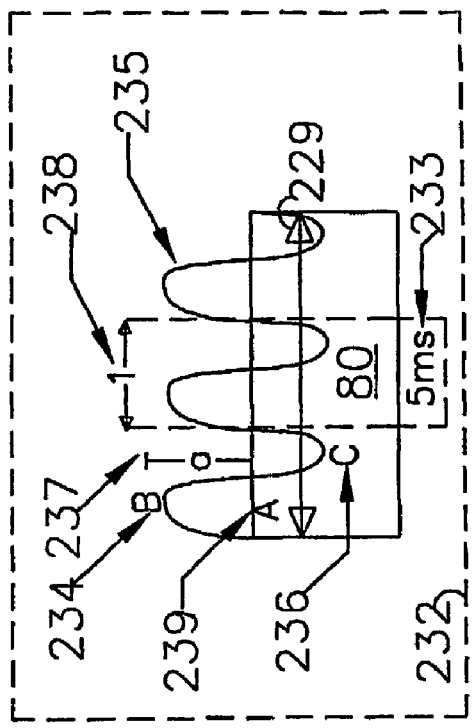
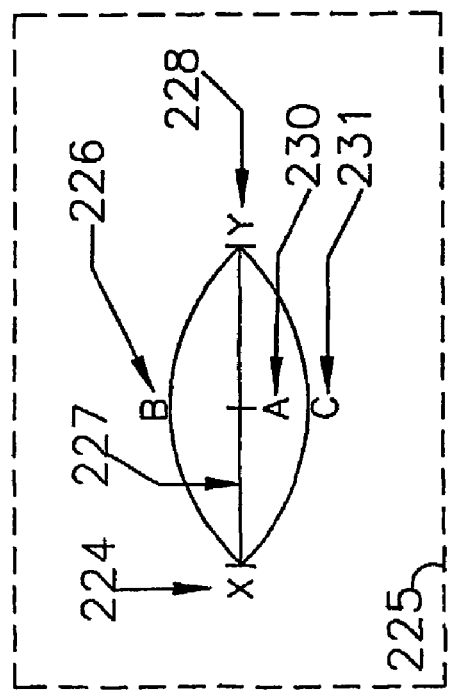
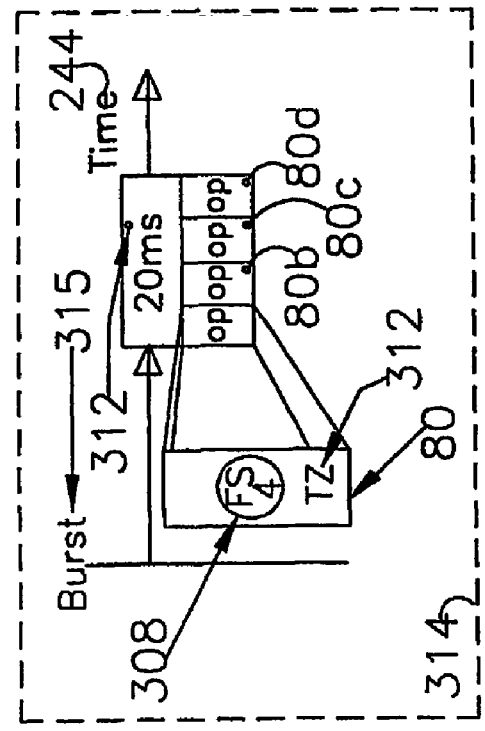

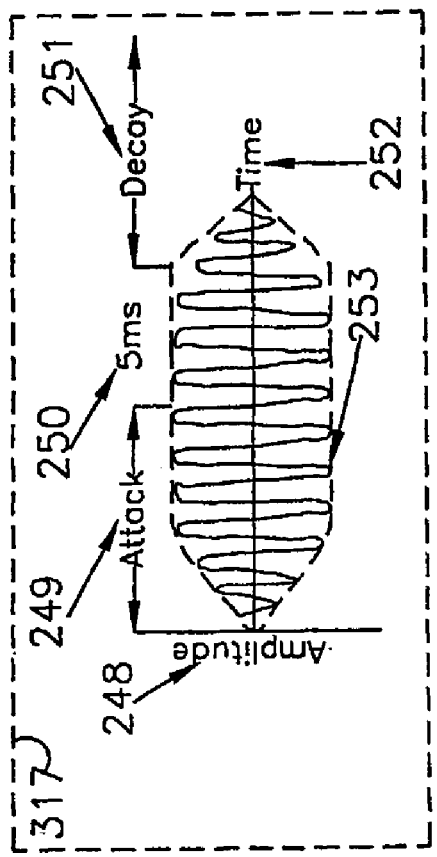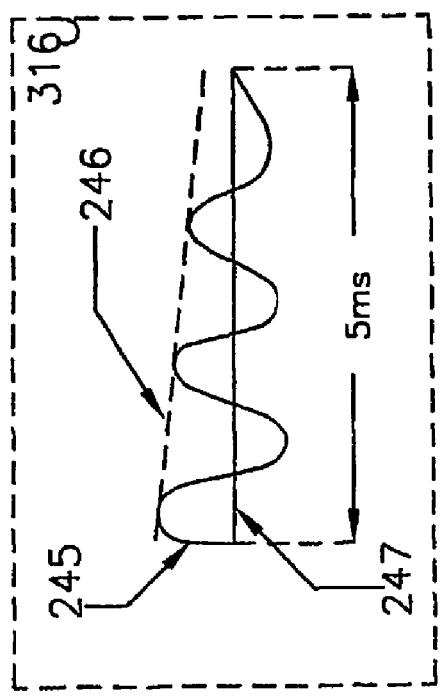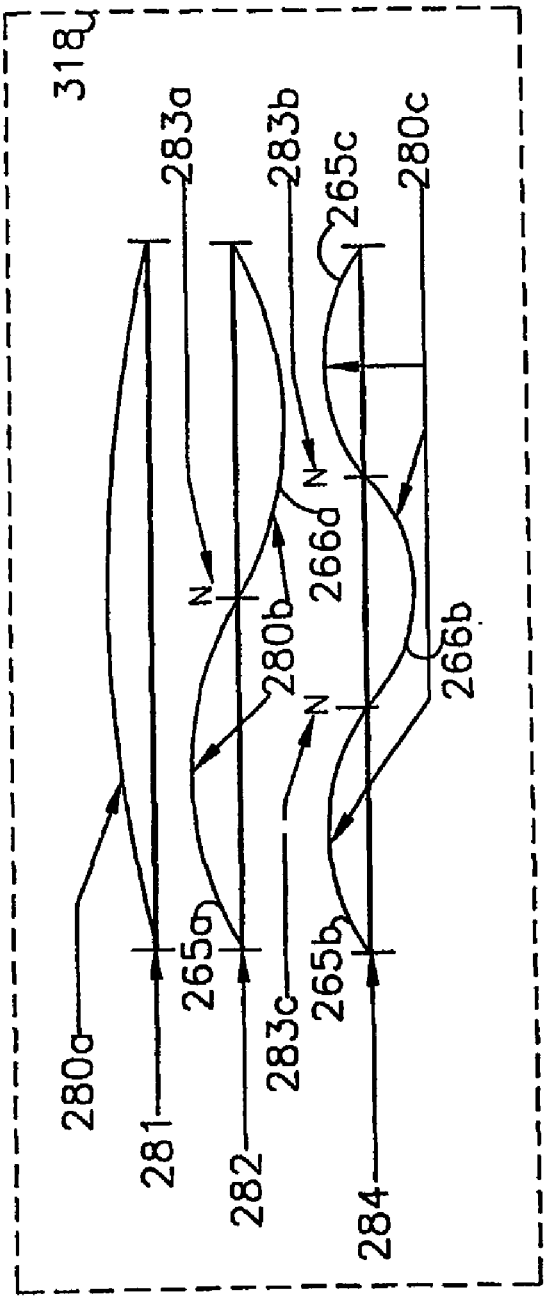

OCTAVE PULSE DATA METHOD AND APPARATUS

This is a Continuation of Application No. PCT/AU00/01229 filed Oct. 10, 2000, and a Continuation of U.S. patent application Ser. No. 09/573,466 filed May 17, 2000 now abandoned. The entire disclosures of the prior applications are hereby incorporated by reference herein in their entirety.

BACKGROUND OF THE INVENTION

1. Field of the Invention

The present invention relates to data communication over a wireless digital voice communications network.

2. Description of Related Art

Today with few exceptions, wireless telemetry data systems tend to mimic the conventional protocols and processes that reflect a technical adaptation of conventional wireless terrestrial trunked radio systems, such as: cellular, personal communications systems (PCS), trunked mobile radio (MTR), and conventional specialized mobile radio (SMR). Now, with new generation wireless data systems and protocol standards, including but not limited to, GSM 900/1800PCN, GSM 900/1900PCS, Motorola iDEN, Ericsson EDACS, and GSM related General Packet Radio System (GPRS), Universal Mobile Telephone System (UMTS), and conventional and new generation circuit switched cellular, there is a need for a new paradigm of simplified wireless data technology. Telemetry, abbreviated Internet web clipping services, push technology, and stock market data information are transported through the same air interfaces and switching matrices as the modernized data that produce bearer and teleservice information. For price sensitive web clipping, new service delivery, and telemetry, for example, a new efficient and low cost transaction based paradigm must emerge globally, if low cost application specific data services are to proliferate in a seamless fashion.

Application specific data (ASD) is now modernized as connection based circuit switched data operating with analog and digital cellular networks worldwide. ASD data suffers globally because it is subject to inherent complexity, a low level of reliability, and high cost. Many companies also use short message service data (SMS) for Internet based abbreviated web clipping services, news service reporting, telemetry data, and the like. SMS was originally designed as a cellular paging modality that reflects non-cellular paging system formats, message management, and network element topologies. Paging and SMS are unreliable, slow, and costly mediums for application specific data such as telemetry, abbreviated Internet web clipping services, news services, stock reporting, and were not designed for time critical delivery to the user. SMS as it exists today is configured with a hodgepodge of data-bit standards. For example, one SMS telemetry modem built by the Siemens Company will not operate properly in a network built by Alcatel, Lucent or Ericsson. All four organizations are supposed to conform to one GSM-900/1800PCN SMS format supported ETS standard, however they do not. The same SMS incompatibility issues also plague time critical web clipping services, stock reporting and stock purchase transaction services.

TDMA and CDMA air interface traffic-speech channels, and PCM (pulse code modulation) circuits convert and process voice information in essentially the same manner. These encompass processes such as convolutional codes, code interleaving, and the like, and are essential to such modulation coding schemes as binary phase shift keying (BPSK) and quadrature phase shift keying (QPSK). BPSK and QPSK related codes and their variants achieve coding gains at the expense of bandwidth expansion. That is, when the redundant bits used in any channel space are used to provide coding gains, the overall data rate and, consequently, bandwidth is increased for the same information rate. Typically in digital voice frame construct overall information rate exchange on both ends is reduced. Therefore, these convolutional codes are not incorporated into modems and thus modem protocols. Designers tend to limit the best component structures of a given medium in order to achieve a much lesser degree of performance. This fact alone limits sending of conventional modernized data over GSM-TDMA, TDMA and CDMA air interface digital speech and pulse code modulated (PCM) channels without using a specialized modem on each end of the communications event.

Voice information transported through a digital medium is much easier to manage than conventional modernized data originally applied in an analog circuit switched cellular environment. In fact, GSM 900/1800/1900 cannot support circuit switched data through "voice" channels without radically modifying existing physical and logical channel infrastructure. GSM has provided many different connection-based and connectionless data pathways not all of which are good choices for web-based application specific information gathering information and application specific telemetry data, because of the complexity that results in overhead hungry data protocols which are prohibitive with respect to expense and low performance.

SUMMARY OF THE INVENTION

The object of the present invention is to address some of the difficulties associated with present wireless communications systems.

According to a first aspect of the invention, there is provided a method of sending a data communication over a wireless digital voice communications network which transmits voice communications in voice frames, each of which contains a digitized segment of a voice communication in a voice frame format, the method including the steps of:

(a) encoding the data communication into a plurality of data frames, each of the data frames having the same format as the voice frame format;

(b) transmitting the data frames over the wireless digital voice communications network;

(c) decoding the data frames to reconstruct the data communication.

According to a second aspect of the invention, there is provided apparatus for transmitting a data communication over a wireless digital voice communications network which transmits voice communications in voice frames, each of which contains a digitized segment of a voice communication in a voice frame format, the apparatus including:

(a) a processor for encoding the data communication into a plurality of data frames, each of the data frames having the same format as the voice frame format;

(b) a transmitter for transmitting the data frames over the wireless digital voice communications network.

According to a third aspect of the invention, there is provided a method for transmitting data or information or web content material, over air interface traffic channels, using wireless telecommunications networks, whereby the information, data, or web content material is subjected to turbo coding prior to being transmitted, said method comprising:

(a) compiling said data, information, or web content material, (b) turbo coding said data, information, or web content material, using any form of data turbo coding algorithm, and (c) transmitting said turbo coded data, information, or web content material over wireless telecommunications networks.

BRIEF DESCRIPTION OF THE DRAWINGS

The accompanying drawings, which are incorporated in and constitute a part of the specification, illustrate a preferred embodiment of the invention and together with a general description given above and the detailed description of the preferred embodiments given below, serve to explain the principles of the invention. It is to be understood that the particularity of the ensuing description does not supersede the generality of the foregoing summary of the invention.

FIG. 12, is a graphic representation of a string acoustically vibrating in an A-B-A-C-A music notational protocol, according to the invention.

FIG. 13, is a graphic representation of amplitude sound wave coefficients expressed over time, according to the invention.

FIG. 14, simply depicts a five millisecond octave pulse as a quantum of a musical sound notation signature, qualified as an F Sharp, according to the invention.

FIG. 15, graphically depicts defined acoustic sound waveforms captured in time, therefore quantized as a measured wavelength, according to the invention.

FIG. 16, depicts a graph that illustrates waveforms decreasing in amplitude as the originating energy dissipates, according to the invention.

FIG. 17, graphically depicts as an envelope of sound which is always shaped differently for each sound signature, according to the invention.

FIG. 18, graphically illustrates shows each of the first three modes of vibration that deals with musical sound loops and nodes, according to the invention.

DETAILED DESCRIPTION

1. General Description

Figure 1:
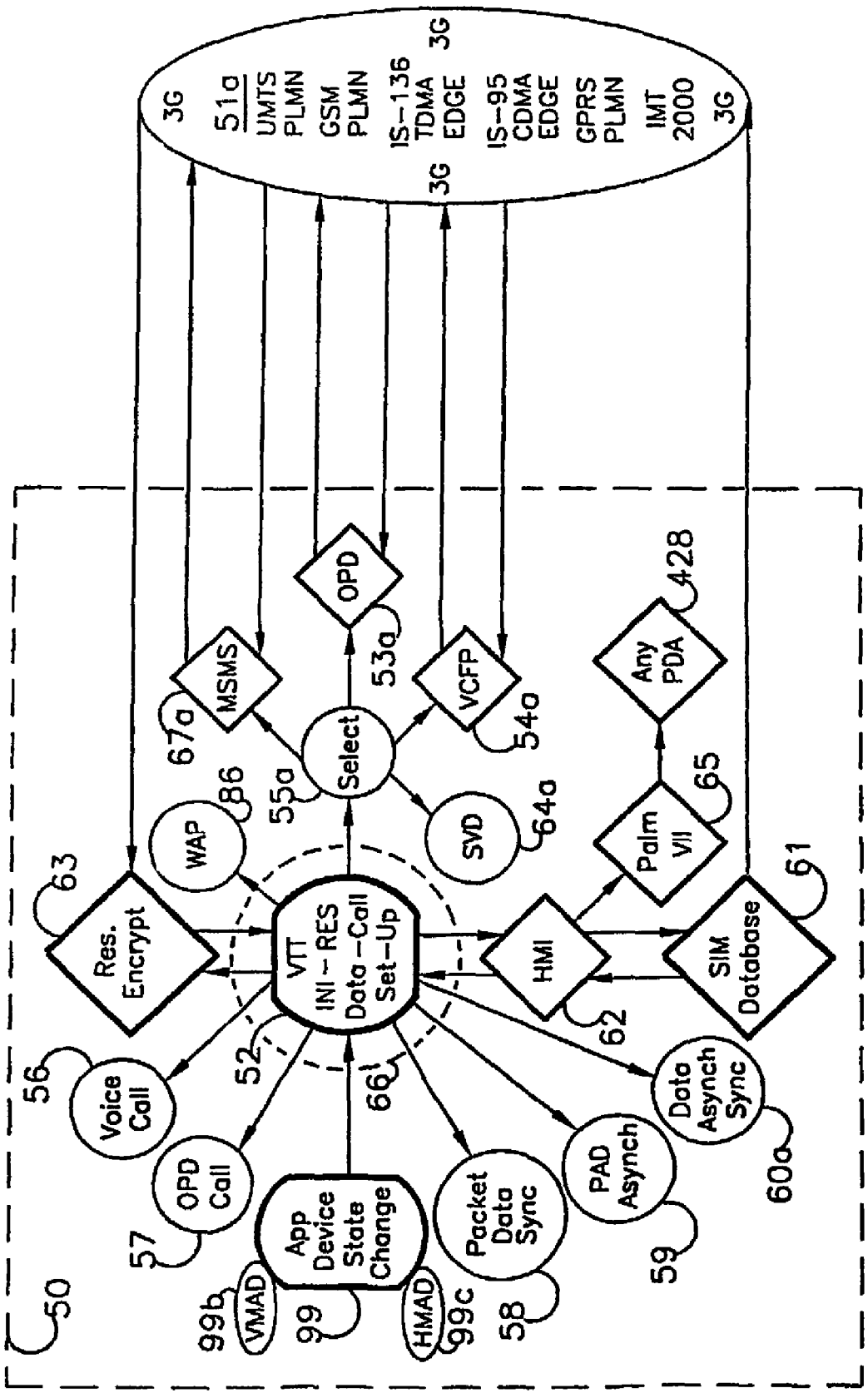
FIG. 1, is a logical block diagram of the VTDN network, causing an OPD transaction event, transmitted from a VTT, according to the invention.

According to one aspect of the invention, there is provided an Octave Pulse-Virtual Transaction Data Network (OP-VTDN), which provides a new paradigm for wireless electronic commerce via the Internet world-wide-web (WWW). OPD (Octave Pulse Data) is a Unified Messaging (UM) platform paradigm that encompasses many data and network protocol layers, and is completely compatible with Wireless Application Protocol (WAP) and Wireless Application Environment (WAE). The top layers of OPD-VTDN protocols are the Octave Pulse Data (OPD) data languages GSM narrow band TDMA channels that operate frequencies such as 900 Mhz, 1800 Mhz and 1900 Mhz generate a sampling rate of 8,000 samples a second that is a synthesized match, to human speech and hearing spectral limitations. Each OPD pulse possesses and produces an absolute value in accord with the assigned language constructs, of a given digital data communications system such as wireless Internet access, browsing, or web clipping or other form of application specific data communications language system. In fact all air interface digital traffic channels and land based pulse code modulation (PCM) channels utilize a codec sampling process rate of 8000 bits a second (8 kHz). This 8 kHz speech-sampling rate is applied through current telecommunications infrastructures. However certain codec algorithmic constructs produce data resolution rates ranging from 13 Kbps to 32 Kbps, while the sampling rate 8 kHz remains consistent. The invention's wireless Virtual Transaction Terminal (VTT), octave sampling and data conversion engine (OSE), and the virtual host system (VHS) system's integrated OSE, generates the same 8 kHz on its input side, and 8 kHz on its channel coding output side. Both OSE ends maintain critical synchronization with the VTT's "clock", the host PLMN networks 20 ms and 5 ms timed burst cycles, and other host air interface traffic channel and PCM channel network synchronization referencing means.

The new OPD paradigm produces high-speed digital data communication methods through narrowband and wideband digital traffic channel mediums with robust improvements that range from 20 to 60% over conventional data rates inherent to GSM-TDMA and GSM-Enhanced Data Rates for GSM (EDGE), IS-136-TDMA, IS-95-CDMA, CDMA-2000, Wideband CDMA, Wideband TDMA, UMTS, GPRS, IMT 2000 and other intelligent new EDGE related technology. These network topologies encompass a wide area of distribution for switching, routing and other node-elements that relate to network intelligence and data and voice traffic management. OPD operates without having to modifying any host network elements. Therefore OPD is a pure virtual conversion process that occurs by bypassing analog pulse quantizing and sampling processes, and operates directly with digital pulse sampling and decoding means that in fact creates an Octave Data Protocol (ODP).

Telecommunications systems are typically designed to have a rather rigid operating paradigm once installed and configured, and are not readily alterable without physically replacing selected host network elements with different possibly more flexible network elements. The invention creates no program change with respect to (1) its operational standard, and (2) the original intent of host network element manufactures, with respect to protocol and equipment specifications.

The invention may use specialized harmonic constructs that effectively manipulate codec algorithms. Selected loss less compression ratios can range from 2:1, to 5:1, to 10:1 or better. As a result of compression, aggregate data rates of as high as 40 to 64 Kbps can be achieved via selected GSM-TDMA, or CDMA narrow band channels when logically defined speech frame protocols are initialized as a result of a conventional voice service request. A service request is transmitted by a conventional caller or a VTT user and received by a currently serving base site, base site controller, mobile switching center (MSC), and the like. Efficient data bit communications transmission rates are achieved through utilizing turbo-coding techniques coupled with host network base site transcoder, decoder, and trans-rate-adaptive-unit (TRAU) algorithmic manipulations. These novel TRAU unit algorithmic procedures relate specifically to speech frame and 5 ms sub-frame, and 1 ms speech increment replacement procedures coupled with manipulation of selected data bit compression means and methods. Heretofore said data bit compression means are derived from a novel integration of specialized turbo coding algorithms, and public domain compression algorithms including, but not limited to, Lempel-Ziv dictionary algorithms, Huffman Coding, Long-Run Length Coding, Arithmetic Coding, and the like.

The invention also provides the means and methods of activating and deactivating the TRAU unit that is located at the host networks serving base site and base site controller (BSC). The TRAU unit is deactivated and activated dynamically whether or not the instant OPD communication event contains compressed message capsule data or conventional voice information. Typically a selected GSM cellular carrier will activate or deactivate a selected TRAU unit if a selected physical air interface channel is assigned to a mobile user who requests a conventional data call or voice call respectively. A TRAU unit is activated only if a selected mobile user has requested digital speech services initialized by a currently serving mobile switching center (MSC).

When speech service is requested, a serving mobile switching center (MSC), and its corresponding base site activates a TRAU unit only when speech services are requested. In order to achieve maximum data rates for OPD calls the TRAU unit needs to be set to a pass-through or bypass mode. The host network deactivates the TRAU unit via the pass through or bypass mode when any other data call service is requested such as asynchronous data, Tandem Free Operation (TFO), USSD data, fax calls, PAD data and the like. The invention is designed to utilize the best aspects of TRAU unit operational procedures by passing OPD message capsules through its algorithmic constructs without technical involvement from the host GSM PLMN operator. The TRAU unit may be deactivated and activated within the constructs of a dynamically controlled algorithmic procedure that is utilized remotely from the invention's network operation center (NOC).

The invention's NOC and its novel virtual network protocols can deactivate a currently serving TRAU unit upon origination and initialization of an OPD—communications event set-up request that is based upon the reception of a VTT originated service request. This same dynamic management of a selected TRAU unit can originate from a NOC initialized OPD communications event. This OPD originated event is designated for a selected VTT and the like that has previously registered and is active within the service location area of a selected OPD regional NOC when an ASP or other point of service origination requests selected OPD services. A special OPD service request can be made by an ASP whom request OPD message capsules to be transported to a currently operating and properly registered VTT operating in a selected GSM PLMN or other such digital cellular or satellite PLMN.

The invention provides the means and methods of activating or deactivating a serving GSM PLMN TRAU unit from a remote location such as an OPD compatible NOC without special modification or software upgrade to any selected host network element. In fact the invention's TRAU unit activation and deactivation process and procedure is transported to a currently serving base site and its contained TRAU unit via ADPCM circuits during the course of an OPD speech channel based data call set up process and procedure.

Furthermore, the invention provides special embedded OPD call set up algorithmic based instruction sets that automatically deactivate a currently serving TRAU unit upon directed initialization of a selected OPD message capsule based data communications event, once conventional speech service is requested during an OPD message capsule data transfer event. The serving TRAU unit specific deactivation after the TRAU unit is activated during the conventional voice call when the serving GSM PLMN operator receives and OPD speech channel data call request. In order to take advantage of high-speed OPD speech frame based data, conventional logical structures and novel synchronization schemes specific to speech frames and channel coding must be utilized. Therefore instruction sets are contained within the header and or body of a specially formatted message capsule data-bit arrangement. This specialized message capsule based instruction set is transmitted during an initial OPD speech channel based message capsule transmission that is originated from a NOC via a selected ADPCM circuit, or from a VTT over a logically defined air interface speech channel.

According to an aspect of the invention, OPD message capsule constructs and host network element management schemes are applied to selected digital speech frames and subframes of wireless cellular, satellite, radio local loop (RLL), wireless local loop (WLL), pulse code modulated (PCM) wireless communication systems. Said wireless local loop (WLL) and radio local loop (RLL) systems integrated with TCP/IP compatible public and virtual private networks (VPN).

According to embodiments of the invention, OPD can seamlessly enable Wireless Application Protocols (WAP) and Wireless Application Environment (WAE) topologies in narrow band PLMN networks such as GSM 900/1800PCN, GSM 1900PCS, IS-95-CDMA, GPRS, and IS-136-TDMA. OPD also enables WAP applications in such narrowband satellite networks such as Globalstar CDMA, ICO, Moetius, Inmarsat broadband, Orbcomm and the like, where applying WAP is difficult if not impossible due to (1) conventional bandwidth limitations and (2) the overly complex WAP application layer complexity. OPD is designed to dramatically enhance and simplify application layers with respect to such broadband digital cellular networks as GSM-TDMA, IS-136 EDGE, IS-95-CDMA, CDMA-2000, UMTS and the like. OPD will also improve digital messaging protocols for broadband telephony satellite networks such as Teledesic, Skybridge, AMSC, Moetius, and the like.

When OPD is applied to web-clipping data, full web browsing capabilities, wireless telemetry and telematics, and other WAP related applications, it provides an elegant, straightforward process. However, octave pulse data's simplicity also produces a wide range of application specific iteration diversity. OPD protocol processes entail converting application specific data bit streams such as binary, hex, and decimal formatted data generated by wireless mobile stations, PDAs with the invention's intelligent sleeve, and stationary application devices operating in the field. One of the important issues the invention effectively addresses deals with some of the limitations of WAP protocols. The idea for WAP is to deliver Internet content to wireless phones. The reality is that WAP only brings Internet content written to the rather narrow WAP specification, applied to similarly enabled wireless devices. OPD provides the means and methods of overcoming the WAP bottleneck.

OPD is applied at network operation center hosting devices, and more specifically the invention's virtual hosting system (VHS). The VHS system processes, reformats and reroutes data originating from application service providers (ASP), web content providers, whom deliver content and systems commands to selected VTT's operating in digital cellular PLMN, and selected digital satellite networks. Once converted, octave pulses are transmitted via logically defined speech PCM circuits and other related data channels where speech is transported. A primary process used in managing and transmitted digitized speech-sound information, are variants of pulse code modulation (PCM) algorithmic procedures. PCM algorithms perform three broadly defined operations that include (1) sampling, (2) quantizing and (3) encoding the generated frames of the PCM channel signal. Pulse amplitude modulation (PAM) is a term of art that is used to describe the conversion of an analog signal to a pulse type signal, where the amplitude of the pulse denotes the peak of the sound envelop of the analog information. PAM and PCM are inexorably and completely intertwined in terms of performing a full range of sampling and quantizing operations.

The PAM signal can be converted into a PCM baseband channel digital signal, which in turn is modulated onto a carrier in terms of speech, related bandpass based digital communications systems. Consequently, the analog-to-PAM conversion process is the first step in the process of converting an analog waveform via soft sampling, to a PCM digital signal. The purpose of PAM signaling is to provide another waveform that looks like analog pulses yet contains the digital representation of acoustic information that was present in the analog waveform. It is not required that the PAM signals "look" exactly like the original analog waveform; it is only required that an approximation to the original be recovered from the PAM signal. There are two classes of PAM signals: PAM that uses natural sampling, also known as gating, and PAM that uses instantaneous sampling in order to produce a flat-top pulse in terms of specific types of waveform shaping. The flattop type of pulse is more useful for conversion to PCM, however flattop waveforms must be softened for the purpose of achieving optimum performance in selected air interface digital traffic channel speech frames.

The PCM signal is obtained from the quantized PAM signal by encoding each quantized sample value into digital word. It is up to the system designer to specify the exact code word that will represent a particular quantized level, in this case the code word represents a digitized pulse with specific musical-harmonic sound quality, this is a discrete signature. The term "quintile" relates to the act of subdividing, in this case a continuous analog signal, into quanta of digital samples, in order to express in digital multiples, an accurate digital reproduction of the original individual unit. The individual unit expressed here is a continuous analog signal, expressed as a phenomena measured in time that has vector; magnitude and direction in time and space. This analog acoustic wave signal in fact produces detectable resonance signature called a sound wave. The invention retrieves digital samples from disparate sources. Once retrieved the samples are re-generated in a discrete 5 ms octave pulse signature quantum possessing all its desired harmonic characteristics Each octave pulse is stored and retrieved from an octave signature sample register located in an octave pulse storage system within a VTT or a storage area network (SAN). A SAN is located within the logical and physical matrices of the invention's VHS.

A preferred aspect of the invention is the creation of a novel octave pulse "complex waveform construct" (CWC) that embodies a specialized envelope shape derived from a plurality of harmonic "signature" characteristics. These specialized signature characteristics codify essential vector conditions, amplitude, pulse waveform shape, complex wave layers, and octave pulse wave envelope shape accordingly. The constituent elements of octave pulses are designed to conform to current designs in telecommunications networks. Octave pulse complex waveform constructs completely optimize channel space characteristics, and thus minimizes most of the negative effects of air interface channel disturbances, and landline based PCM channel noise. It is desirous to initially generate flattop pulse waveforms for database storage for latter use in the OP-VTDN network. However the same octave pulses must be custom shaped for transport over digital traffic speech channels and PCM channel space, depending on host PLMN network operations standards. These octave pulses generate well-defined musical-harmonic structures that are comprised of a combined first, second and third harmonic based waveform. Also, a single octave pulse signature "pitch", possesses a duration of 5 ms, with a beat pattern of 1-4 that represents a predictable yet, complex "pseudo harmonic" signature. An octave pulse signature is quite stable when compared to a randomly processed segment of a speech signal or other baseband analog waveform that has poor performance predictability factors because of its convoluted and unpredictable composition.

The OPD pulse codified as a data byte-word medium is much easier to sample, "quantize" and encode for conversion to alphanumeric characters, special serial binary data codes, special hexadecimal codes, graphic content data, human language conversion and the like. The invention's accurately defined octave pulses are easier to predict, sample, define, convert and regenerate than any other digital data medium. Therefore it stands to reason that OPD will achieve much higher data rates than existing digital air interface speech codec algorithms, PAM-PCM channel coding processes, radio-modulation protocols, and the like. Therefore, the invention completely exploits the PAM/PCM processes that are fundamentally inherent to all sampling value conversions involved in analog to digital conversions. PAM/PCM conversions are also inherent within analog to digital conversion algorithmic methods used in digital musical sampling instruments and other digital sound producing systems.

PCM-PAM channels are physically connected and logically communicative with selected telephony exchanges, switch matrices, digital routers and out-of-band signaling nodes. PCM-PAM algorithms are at the core of speech processing with respect to all PLMN and PSTN voice traffic processing known in the world today. Conversely the invention's virtual transaction based data NOC is comprised of switches, home location registers (HLR), digital signal processors (DSP), and TCP/IP packet routers. Contained within the NOC facility is the virtual host system (VHS). The VHS is comprised of octave pulse data sampling and conversion engines (OSE), octave pulse generation systems (OPG), octave pulse data character conversion systems (OPCC), octave pulse storage (OPS) systems, octave pulse human language (OPHL) character conversion servers, and gateway routers. Integral to the virtual host system (VHS) are modified short message service (MSMS) message stacks, switches and the like. Octave pulse human language (OPHL) character conversion enables a unique service to international users. An OPD compatible personal digital assistant (PDA), including, but not limited to a Palm VII PDA, configured for English language usage, may communicate with another OPD compatible PDA configured for a non-English language, such as the Mandarin Chinese Language for example. Neither user would need to understand any language construct originating from the other language. The invention's virtual host system (VHS) manages all of the language conversion methods and acts as a transparent gateway between people communicating from disparate cultures speaking very different language constructs. The invention's octave pulse data constructs, coupled with its intelligent sleeve, and interfaced PDA's can also enable applications including, but not limited to, wireless gaming, card games, board games, video games, wagering games, multi-player wireless games, and the like.

When the English language OPD user sends a message to a Chinese language OPD user, the English language OPD user enters the desired language conversion and presses the send button. The OPD message accompanied by the conversion request is transported from the VTT through the currently serving PLMN, PSTN, to the network operation center (NOC) and the collocated virtual host system (VHS) and its automatic human language conversion (AHLC) server and database. The invention's VHS is a wireless application portal that enables access to the Internet World Wide Web. Once the message and its conversion header is detected and read, it is routed to the appropriate OPHL conversion server and database. Once converted the message is converted back to octave pulse signatures, and sent to the other end of this instant OPD communications event.

Such application specific systems that serve vertical markets tend to simply measure and report application system state changes. Such wireless application specific systems that serve horizontal markets tend to deliver and receive user information and wireless-Internet e-commerce transactions. These horizontal data transactions include stock market quotes, traveler information, news high lights, ATM locations, mobile concierge data, general information queries, local cultural event polling, mapping information retrieval and the like. Vertical market systems include automatic utility meter reading (AMR) devices, security systems, motor vehicle anti-theft and recovery systems, mobile tracking devices, agricultural systems management, vending machines, smart homes systems, smart commercial building systems, and mobile services that generate global positioning system (GPS) location information.

These application specific devices are physically attached and logically integrated with the invention's VTT and special digital data hosting systems located at a specially constructed OP-VTDN NOC facility. This conceptual and technical marriage creates a complete wireless and wireline application specific transaction data base end-to-end virtual communications system. Each octave pulse generated by a VTT or NOC facility possesses an equivalent information value of eight bit bytes of digital data. OPD pulses are transmitted over digital traffic channels utilized in TDMA and CDMA traffic channels, and pulse code modulated (PCM) PLMN and PSTN network elements. OPD pulses are derived by creating mathematical pseudo equivalents of musical-harmonic pitches, which contain specialized attack and decay patterns, that are quantified as digital bit patterns with assigned arbitrary values based on the WAP and other languages being served, translated, stored, transmitted, or received on either end of the OP-VTDN network.

OPD pulses are sampled by the VTT based OPD digital sampling engine (OSE) as part of the OP-CODEC, at the same physical bus-logic point, and logical interval when analog the speech signal is converted into digital information. This key interval is also coupled with channel coding algorithms utilized in conventional digital mobile stations. The octave pulse engine essentially bypasses the conventional speech codec without circumventing conventional speech traffic. The invention's octave pulse engine (OPE) and octave pulse storage (OPS) is either designed as an integral component of GSM and other TDMA and CDMA digital cellular mobile stations firmware, and software and electronic circuitry. Alternatively, the OSE/OSP is designed to be the central component of a physically separate, yet algorithmically congruous and totally novel external OPD plug in module. This component replacement and or modification enables the encoding and generation of specialized digital bit arrangements that produce pulse patterns that are decoded and converted into characters that have aggregate value of eight bit-bytes seen as four separate five millisecond duration subframes that comprise one 20 ms voice frame. Therefore one narrowband GSM-TDMA, IS-136-TDMA or IS-95-CDMA 20 ms voice frame can produce four OPD pulses every 20 ms which equals a 5 ms duration value for each single character octave pulse. In terms of its first level of magnitude octave pulse data can generate 200 bytes or 1,600 Kbps of data for every one second of stabilized host network airtime used, in digital speech traffic channels that produce 9600 bps under ideal radio propagation conditions.

Octave pulses can be further manipulated in order to produce two and three character variations per pulse, based on the resolving rate of the OPD digital sampling engine (OSE), shape, harmonic construct, and pulse vector of each complex waveform. The result of this manipulation is a doubling and tripling of data rates in current narrowband digital traffic channels used in GSM, CDMA, and TDMA networks. Using an OSE with high sampling resolution a single pulse with a derived dual or tri-articulated character can be used. The dual and tri-articulated octave pulses have values of 16 and 24 data bits, respectively. Each divided pulse represents one, two or three fully variable characters with an aggregate data value of one, two, or three 8 bit bytes. This doubling or tripling of octave pulse character value effectively doubles or triples the aggregate data byte capacity of a selected OPD event without causing any changes to host network elements, in accord with Wireless Application Environment (WAE) guidelines.

A preferred aspect of the invention is the creation of octave pulse patterns that are uniquely encoded into the bitstream structures of digital narrowband and wideband TDMA, and CDMA traffic voice channel coded frames and subframes. Octave pulses are derived from manipulating source sample coding and speech sample processing that are integrated as digital building block algorithms known in codec (COder-DECoder) logical structures. Octave pulses may in some embodiments be derived from generating pseudo sound pitches that are in fact complex wave signatures that are in turn derived from codified octave structures and subset incremental musical notational measured-structures. An OPD pulse protocol can produce high-speed data transmissions within the frame and subframe structures of logically defined air interface digital traffic channels, and pulse code modulation (PCM-30)-(PCM-24) PLMN and PSTN channels, or any other digital logically defined medium that uses PAM-PCM combinations. OPD structures are applied in accord with a plurality of international wireless, Wireless Datagram Protocol (WDP), Wireless Transaction Protocol (WTP) and other standards and specifications supported and created by Wireless Application Protocol (WAP).

OPD will operate within selected transmission paths that transport digital speech information processing. OPD measured pulse-data packet increments can easily produce an aggregate 4.8 kilobyte payload message that is transmitted through a narrowband GSM-TDMA based traffic channel and PCM transmission path. Specifically a 4.8 kilobyte payload of OPD pulse data is transmitted through a narrow band voice channel with a three-second, data communications event duration cycle. Add a 1.5 second call set up cycle, and a 2.5 second call tear down cycle with the 3 second OPD transfer duration, and what results is a 7 second OPD event that produces 4.8 kilobytes of data for bi-directional up-link and down-link communications. Therefore OPD produces a 1,600 bit per second of true data throughput without any modification to selected host network elements. Key to octave pulse performance depends upon just how well intelligent end nodes, such as VTT's, and virtual host systems discriminate individual pulse signatures and at what speed. Octave pulses are derived from organic musical sound sources defined and transformed into values expressed from a tactile and auditory experience derived from a musical performance. This musical performance was later expressed or captured in the electromagnetic components of an analog or digital recording and playback device. Drawn from the discipline of physics and particle theory, one way of viewing octave pulses as groups of photons that produce oscillating waves. An octave pulse stored in a database may be defined in a broad sense, as an expression of a "standing wave" and an octave pulse oscillating in "electro magnetically generated motion", is a "traveling wave", as it travels through selected channel space. Thus the argument that the codified, formatted and shaped construct of a specialized octave pulse signature waveform is completely novel with respect to its application is based on manipulation of photonic structures.

When implemented in preferred ways, the invention dramatically improves existing circuit switched cellular system protocols and services without the need to add infrastructure elements to existing digital cellular networks. Currently, conventional cellular data systems offer analog and digital versions that can provide maybe 9.6 Kbps or 1,200 bits per second through bearer service and teleservice data call channel space and switch matrix architectures. Newer EDGE high-speed circuit switched formats such as GSM HSCS offer much higher data rates, with claims that range from 28.8 Kbps to ISDN speeds. However a given PLMN must change out all the base site radios and other network elements in order to obtain desired increases. In digital traffic channels, voice frames will typically not support any other sort of data other than sampled voice.

The invention's OPD means and methods provide a minimum data rate improvement that ranges from 50% to 200% increase in aggregate data rates over digital traffic channels, in a completely virtual manner. The invention provides the means and method for implementing seamless wireless electronic commerce transaction based services. OPD characters are transmitted and received in a selected digital cellular and satellite networks, delivering a minimum data payload assemblage of 4.8 Kilobytes with an aggregate air time consumption of three seconds. OPD network protocols also utilize a revolutionary variation of a virtual circuit fast packet (VCFP) switched architectured protocol. VCFP telemetry and Internet based web-clipping data services produce an overall transaction based event duration that ranges between 5 to 7 seconds, from origination to termination. OPD also uses a novel approach to connectionless protocols for message transfer between the user and the OPD VHS Internet portal.

According to an aspect of the invention there are provided unique simultaneous voice and data (SVD) octave pulse data protocols, means and methods. This aspect of the invention provides algorithmic procedures that enable the transmission and reception of specially interleaved octave pulse subframes that are interleaved with conventionally sampled speech subframes. These interleaved octave pulse and speech frames and subframes are transmitted and received by the invention's virtual transaction terminal (VTT) in the form of an intelligent sleeve with an attached PDA and the VHS located at a network operations center. Accordingly, octave pulse SVD operates without causing disruption or circumvention of conventional voice and data services. Octave pulse data SVD protocol means and methods completely exploit discontinuous transmission (DTX) speech traffic management algorithms in a novel way. The DTX mode takes advantage of the fact that during a conventional digital cellular voice conversation both parties rarely speak at the same time, and thus each directional transmission path has to transport speech data only half the time. In DTX mode, the transmitter on both ends of the conversation is only activated when the current speech frame in fact carries speech information. The DTX mode can reduce the power consumption and hence prolong battery life.

Conversely the reduction of transmitted energy also reduces the level of interference and thus the spectral efficiency of any digital cellular system. OPD utilizes the DTX feature by enabling a uniformly structured bi-directional octave pulse data "conversation". The invention's VTT and the VHS portal "converse" in an "octave pulse data word" language, via selected host cellular PLMN networks, satellite networks and public switched telephone networks (PSTN). The DTX protocol is quite similar to time division duplex (TDD), in that data is transmitted from either end of the data communications event in a "staggered interleaved" pattern. When one end transmits and completes a message capsule transfer to the other end, the receiving node responds with its own octave pulse message capsule transmission. Consequently, the invention utilizes its previously disclosed interleaved speech frame and octave pulse protocol in accord with conventional DTX/TDD algorithms.

Accordingly, the invention provides the means of interleaving not only 20 ms speech frames, with 20 ms octave pulse frames, but also interleaving 5 ms speech subframes and 5 ms octave pulse data word subframes. In this way the invention provides the means and methods of providing quality speech and data during one octave pulse data (OPD) communications event. At the end of an OPD communications event each node completes its message transmission by transmitting an acknowledgement octave pulse message capsule, which terminates and completes the event. Therefore the invention creates a novel SVD communications system, in accord with the OPD communications language that operates virtually and actually within a plurality of international wireless and PSTN networks. Octave pulse SVD protocols comply with web browsing protocols, Wireless Datagram Protocol (WDP), Wireless Transaction Protocol (WTP) and other standards and specifications supported and created by Wireless Application Protocol (WAP). OPD provides SVD data protocol constructs that enable simultaneous digital voice and data dispatch to numerous recipients in one multi-path dispatch event. The invention provides text to speech, and speech to text algorithms, protocols, and procedures within each VTT bus logic firmware and software module, and is managed and supported at the virtual hosts system (VHS) portal located at the OPD network operation center (NOC).

Some wireless telephony standards require different call set-up and tear down procedures that stipulate a wide range of multi-layered parameters that tend to increase or decrease origination and termination algorithmic procedures. The VTT and any other mobile station that operates in a selected digital cellular network must utilize these conventional call set-ups and tear down procedures. Therefore, the OPD event duration is measured as a process that includes call set-up and tear down procedures respectively. OPD pulse protocol characters will transmit through any selected narrowband and wideband digital TDMA and CDMA traffic voice channel medium, known to be utilized in all wireless digital terrestrial and space segment networks. OPD creates a novel virtual data transport layer, and in a new data communications language that operates virtually and actually within a plurality of international wireless, Wireless Datagram Protocol (WDP), Wireless Transaction Protocol (WTP) and other standards and specifications supported and created by Wireless Application Protocol (WAP).

An aspect of the invention provides specialized OPD message word formats, and routing algorithms. This aspect of the invention provides VTT's that are compatible to operation standards of a GSM network, an IS-95 CDMA, a CDMA-2000 network, and an IS-136-EDGE TDMA for example. The VTDN NOC, and its integral VHS portal can manage all VTT host network standard formats. Because once octave pulse bit streams pass through a selected digital air interface speech channel, the bitstream is decompressed and transcoded into PCM circuit data. The PCM transmission path format is a PCM 24 or PCM 30 circuit embodied in a T1 or E1 PSTN network respectively. These speech circuits deliver the OPD bitstream to the VHS portal originating from a selected PLMN. Host network data transports means is essentially the same, regardless of the air interface standard that the VTT is utilizing. Moreover, the conventional differentiation of each separate digital cellular standard becomes immediately transparent and irrelevant in relation to the contained data as managed by the VHS acting as portal to the Internet.

The invention provides another important feature, simultaneous voice and data services that transpire during one combined octave pulse data event. The data coming from the speech codec are channel coded, before they are forwarded to the modulator in the transmitter. The channel coder, adds some redundancy back into the data bitstream, but does so in a very careful and orderly way so that receiver on the other end of a noisy transmission path can correct bit errors caused by the channel. Almost 40% of total speech channel data throughput rate is consumed by channel coding with respect to error correction. The receiver needs the extra bits the channel coder ads, in order to perform this important function.

Channel coding almost doubles the data rate to 22 Kbps. The invention takes complete advantage of fact that various channel coding manipulations will provide algorithmic modalities that enable significantly expanded narrow band and wideband air interface channel throughput rates while transporting octave pulse data with specially coded subframes. The invention provides specialized octave pulse data words, word data blocks and automatic repeat request (ARQ) functions to the OPD bitstream protocol. The invention provides modem like functions without the ponderous overhead functions, and added synchronization modalities that modem protocols add to the wireless data equation.

The invention provides a novel modified short message service (MSMS) protocol. The concept involves means originating an SMS event without involving the serving networks short message switching center (SMSC) and its message stack system. The invention performs a specialized call set up algorithm that involves routing the call to the invention virtual host system (VHS) located at the network operations center (NOC), thus bypassing conventional SMS PLMN network elements. The routed application specific message is comprised of the invention's MSMS data packet stream that contains between 160-640, 8 bit byte MSMS characters. The MSMS data call is routed through an asynchronous or synchronous data pathway directly to the VTDN NOC facility. This novel action bypasses the GSM PLMN short message switching center and storage stack system. This manipulated short message system process requires little modification to the selected GSM radio and terminal, and creates no adverse impact upon the conventional channel space and routing mechanisms of the conventional host PLMN network.

The invention provides mobile station data call packet transfer initialization schemes, network operation center data call packet transfer initialization schemes. The invention combines forward channel and reverse channel data packet transfers and network routing modalities that result in a application specific data communications event utilizing a selected digital data air interface medium and PLMN and PSTN PCM mediums. The invention takes an existing data, manipulates that data without disrupting the communication medium applied to in accord with a plurality of international terrestrial wireless networks, and space segment networks. The invention means and methods will enhance and virtually improve mobile satellite networks such as Globalstar that are compliant with Wireless Datagram Protocol (WDP), Wireless Transaction Protocol (WTP) and other standards and specifications supported and created by Wireless Application Protocol (WAP).

The invention manipulates data packet modalities and data packet routing modalities such as the synchronous and asynchronous, transparent and non-transparent data that operates within network elements of GSM-900/1800PCN, GSM-1900PCS, IS-95-CDMA, IS-136-TDMA, UMTS, GPRS, Globalstar, IMT-2000 based, connectionless and connection based Short Message Service (SMS) or equivalents. This virtual topology thus creates a novel modified short message service (MSMS) that operates virtually and actually within a plurality of international wireless, Wireless Datagram Protocol (WDP), Wireless Transaction Protocol (WTP) and other standards and specifications supported and created by Wireless Application Protocol (WAP).

An aspect of the invention provides specialized data call packet formats, data call packet and hybrid data packet formats. This aspect of the invention provides mobile station data call packet transfer initialization schemes, network operation center data call packet transfer initialization schemes, and forward channel and reverse channel data packet transfers that result in an application specific data communications event utilizing a selected digital data air interface medium. The invention takes existing data, manipulates that data, without disrupting the communications medium applied to, such as the asynchronous and synchronous, and transparent and non-transparent Packet Assembler Disassembler (PAD) service, or signaling system number #7 (SS#7) based Un-Structured Supplementary Data (USSD) services that provide 80 byte data packet for user data, in accord with Wireless Application Protocol (WAP) and Wireless Application Environments (WAE).

According to an aspect of the invention, special fiber optic based data communications called "photonic pulse data" (PPD) are provided as an extension to octave pulse data (OPD). This aspect of the invention conforms to synchronous optical network (SONET) operation standards. The SONET standard encompasses optical fiber line protocols that generate data rates that range from 51.84 Mbps for OC-1, up to 2,4888.32 Mbps for OC-48. The OC-1 signal for example is an optical light signal that is turned on and off, that is modulated by an electrical binary signal. This signal is called synchronous transport signal level 1 (STS-1) for example. The invention provides the means and methods of converting octave pulses into photonic pulses with its novel octave pulse to photonic pulse conversions. PPD is used for direct high-speed data communications over selected fiber optic networks, without creating disruption to existing fiber optic protocols such as OCR Sonet and the like. The invention takes an existing data, manipulates that data, without disrupting the communications medium applied to, optical protocols that are essential to worldwide fiber optic based communications in accord with Wireless Application Protocol (WAP) and Wireless Application Environments (WAE).

An aspect of the invention involves the use of specialized data call packet formats, data call packet and hybrid data packet formats. This aspect of the invention provides mobile station data call packet transfer initialization schemes, network operation center data call packet transfer initialization schemes, and forward channel and reverse channel data packet transfers that result in a application specific data communications event utilizing a selected digital data air interface medium. The invention takes an existing data, manipulates that data, without disrupting the communications medium applied to, such as circuit-switched asynchronous data services, in accord with Wireless Application Protocol (WAP) and Wireless Application Environments (WAE).

An aspect of the invention involves the combining of OPD protocols, MSMS protocols, PAD data protocols, USSD data protocols, improved GPRS channel management, messaging protocols, and digital circuit switched protocols, under one VTDN network multi-layered hierarchical protocol that is new and revolutionary Unified Messaging (UM) system. The VDTN protocol is designed to utilize the best components, processes and procedures from all disclosed bearer services while discarding the most inefficient features of each. This is accomplished by the invention's means and methods by taking an existing data, manipulating that data without disrupting the communications medium applied to, while applying the invention's heretofore disclosed protocol scheme.

OPD creates a novel virtual data transport layer, data packet formatting combined with a new data communications language based upon pseudo-musical pitch, timbre, and notational structures. OPD creates a new paradigm that operates virtually and actually within a plurality of international wireless, Wireless Datagram Protocol (WDP), Wireless Transaction Protocol (WTP), WAP Micro browser and other standards and specifications supported and created by Wireless Application Protocol (WAP).

According to one aspect of the invention there is provided an octave pulse data (OPD) compatible "intelligent sleeve". The intelligent sleeve is comprised of a modified digital cellular mobile station transceiver, octave pulse-CODEC, a specialized ARM processor, a global positioning system (GPS) receiver, and physical and logical means for integrating with a selected personal digital assistant (PDA). The intelligent sleeve can be physically constructed to allow a Palm VII personal digital assistant (PDA), or any other available PDA, to fit inside its physical construct. In this configuration, the intelligent sleeve is the VTT. The marriage of a Palm VII PDA, or any other PDA, with the intelligent sleeve enables octave-pulse data (OPD) communications that originate from the attached PDA. This aspect of the invention provides firmware, software and apparatus means that enable digital cellular or satellite voice communications, hands free digital voice communications, octave pulse data communications that support e-mail, e-commerce related purchases, web-clipping applications, automatic voice call placement, and the like.

One aspect of the invention provides a novel stylus based "tap and call" feature. The VTT software in conjunction with PDA software provides a virtual "cellular phone key-pad" in the form of a graphical user interface (GUI), which appears on the PDA screen when initialized by the user via the PDA stylus and a physical "tap" initialization exercise. The invention's VTT based intelligent sleeve also enables additional services including, but not limited to, global positioning system (GPS) based information gathering and display, compressed video reception and display, speech to text, text to speech, simultaneous octave pulse data and speech communications, and compressed speech algorithms for specialized concierge service applications, and the like. The invention enables the benefits heretofore described for the Palm VII, to any other PDA including, but not limited to, the Phillips Velo PDA(s), Avigo PVA, Clio PDA, Hewlett-Packard PDA(s), IBM WorkPad PDA(s), Casio's Cassiopeia PDA(s), Palm III PDA, Palm V PDA, Apple Newton PDA(s), Poqet PDA(s), Psion PDA(s), REX PDA(s), Visor PDA(s), Handspring PDA(s), and the like.

According to one aspect, the invention can, in fact, take a PDA that is not enabled for wireless, and convert it to an effective and low cost wireless PDA and digital telephony speech based communications device. With the addition of the VTT configured as an intelligent sleeve, a non-wireless PDA, such as the Palm V, becomes an effective wireless PDA that may operate on all digital cellular and satellite public networks operating or planned for deployment in the world today. The invention can also transform any non-wireless PDA into an effective e-commerce device with the added advantage of offering a wide range of operations, applications and services that no other wireless PDA can provide. The invention provides novel interactive software and graphical user interface (GUI) constructs that enable a myriad of services. For example a user can take a Palm V PDA, Palm VII PDA or such other heretofore disclosed PDA, insert it into the invention's intelligent sleeve and it immediately becomes a GSM 900/1800/1900, IS-95-CDMA, CDMA-2000 IS-136-TDMA-EDGE, IS-136-TDMA-CDMA hybrid, or IS-136-TDMA-GSM hybrid digital cellular phone. Once this feature is initialized the user simply inserts his hands-free earpiece and combined microphone into the intelligent sleeves mini plug or serial plug.

Once inserted, the user taps the PDA tablet screen directly over the graphic symbolic construct provided and a virtual cellular phone keypad appears. To dial a number, the user simply taps each keypad GUI symbol that simulates a two-dimensional conventional keypad construct. Also, the user may simply scroll through his address and telephone number database, tap the desired number, and the intelligent sleeve coupled with the instant invention's PDAs software automatically dials the desired number. In fact every graphic symbolic construct that is relevant to digital cellular phone operation may appear on the invention's virtual cellular phone PDA screen. Additional displays available on the invention's PDA screen include, but are not limited to, information such as personal identification number (PIN) request, short message service (SMS) messages, the invention's modified short message messages (MSMS), SIM card status, SIM card wireless carrier readouts, receive signal strength indication (RSSI), message waiting indicators (MWI), voice mail indicators and the like.

Like any conventional digital mobile station, the invention's intelligent sleeve provides a wide range of ring tones and vibration alert modes. The intelligent sleeve also provides conventional mobile station rechargeable batteries that also power the inserted PDA. Essential logical thinking dictates that if a PDA becomes the virtual dial pad, and cellular phone display that the battery consumption of the combined intelligent sleeve and an interfaced PDA will be about even. Therefore it certainly makes much more sense to convert a PDA to a digital cellular phone than the other way around, with respect to current efforts of many manufacturers. The invention provides the means and methods of converting any selected PDA into a digital cellular phone, with the added benefit of having all the features of PDA applications, coupled with the power and flexibility of octave pulse messaging technology.

Another aspect of the invention provides yet another feature with respect to enabling ubiquitous world wide-wireless OPD-PDA service with octave pulse data virtual transaction data network flexibility and usability. For example when a user purchases an intelligent sleeve from an electronics retailer, he simply inserts any PDA, then powers up the sleeve. Automatically, the invention's intelligent sleeve detects a PDA, connects to the currently serving cellular area satellite PLMN, which in turns routes the OPD call to the invention's network operations center (NOC) and its co-located virtual host system (VHS), which serves as a portal to application service provider and the Internet world wide web. The VHS detects contained codes within the constructs of OPD words, which indicate the user needs interface and specialized GUI software that is compatible to any PDA. The VHS system retrieves the appropriate software from its co-located storage area network (SAN) and transmits the software and other data to the VTT configured as an intelligent sleeve with an inserted PDA. The octave pulse intelligent sleeve coupled with a selected PDA can also be transformed into a personal security device.

The intelligent sleeve can, in fact, be equipped with a passive infrared and/or microwave detector that detects movement within a specific range. In a preferred embodiment, the intelligent sleeve can also be equipped with a small video camera so that the user may enable a video conference with another video of presence on the Internet, and the like. In addition, the intelligent sleeve can act as a wireless security server. The intelligent sleeve can contain an industrial system management (ISM)-DECT-Home RF, and IEEE802.112.4 Ghz to 5.8 Ghz wireless nodes that communicate with from eight to 16 interlinked nodes configured as a passive infrared, glass breakage detector, or normally closed/normally opened contact closure device. These wireless devices can be placed around a given parameter such as a construction site, or boat harbor for protecting vessels, and other related applications. The invention's OPD operates directly within ISM/DECT and Bluetooth 80C51 compliant digital speech/audio paths. Octave pulse resonate signatures are adaptable to any ISM/DECT/Bluetooth 80C51 speech and audio communication link paths that support digital sampled voice and audio. Any PDA can use security software, such as produced by Tattletale Corporation of Columbus Ohio.

The invention's intelligent sleeve can also act as an intelligent wireless server that controls these wireless nodes, with respect to a creating a virtual radio organism (VRO) type of application, for example the Clarion or Erricson smart Automotive, and smart home systems. The octave pulse data personal network operates within the standard and specification constructs of ISM standard, the European digital cordless telephone (DECT) standard, home RF, IEEE802.11 a-e and the like. OPD is completely adaptable to Bluetooth, DECT, LMDS and MMDS wireless voice transmission paths were voice codecs are used to encode and decode speech information. The invention provides its intelligent sleeve to operate in a telemetry and telematics environment, with respect to transferring octave pulse signatures, through unlicensed spectrum based Bluetooth 80C51/DECT/IEEE802.11 a-e compliant speech/audio channel space from within a motor vehicle to a small compatible base site node located within a truck dispatch facility that has a limited signal propagation range.

This OPD base site node is interface with the Internet world wide web (WWW), and logically communicative with the invention's virtual host system (VHS), serving as Internet portal, and its specialized web-page that further enables downloads of intelligent sleeve and compatible PDA software upgrades, updates and the like. In fact to save digital cellular PLMN octave pulse data air time charges, the intelligent sleeve can bi-directionally transfer octave pulse data messages and other such information directly via Bluetooth 80C51, DECT, Home RF and IEEE802.11 a-e compliant modulation schemes and protocol schemes. Therefore, a desktop and/or laptop computer, using an OPD PCM/CIA compliant plug in card, may also act as a OPD-VTDN base site node, when the computer is also interfaced with the Internet world wide web (WWW) via high speed digital subscriber line (DSL) services, cable modem services, and other high speed dialup modem access. In essence, the intelligent sleeve becomes a virtual radio organism (VRO) topological mini-mobile base site with respect to utilizing unlicensed spectrum to facilitate bi-directional OPD communications between remotely placed ISM/DECT nodes and a small base site node that is also interconnected to the Internet worldwide-web (WWW) via a personal computer.

According to another aspect of the invention, the entire OPD protocol is embedded on an intelligent SIMM card and its integral registers that acts as a form of application specific integrated circuit (ASIC) chip. A typical SIMM card contains: 8-bit micro-controller with optional crypt co-processor 20-32 KB of ROM, 4-32 KB of EEPROM. Using a programmable SIM card as a medium for storing, accessing and retrieving OPD code-decode algorithms for operating and providing message capsule, data packet transport protocols, and simultaneous voice and data information over conventional digital speech channels. In conjunction with this novel SIM card based protocol construct, the only additional modification to a conventional GSM radio module occurs with special reference to resident firmware modifications that fully enable OPD protocol means and methods in addition to all conventional digital cellular, data and voice services functions and feature sets.

According to another aspect of the invention, specialized OPD harmonic bit stuffing is provided, utilizing a novel integration of conventional data compression such as Huffman, Dictionary and/or Arithmetic algorithms, or any combination or iteration thereof. These compression techniques are further combined with specialized utilization of specialized forward error correction (FEC) known in the Art as Turbo coding. These conventional compression techniques are further combined with specialized constructs of a million-to-one video compression that reduces large-scale raster and other video source files to 28 bps-2.8 kbp/s video and audio information that is based on lossy compression algorithms. A 2.8 kbps data rate will fit seamlessly within the constructs of raw GSM speech channel rates that range from three to 13 kbps respectively. Each raster or other video source file is constructed of densely placed full ASCII text and numerical characters generated in the PAL 25 frame per second 625 line resolution standard, and or NTSC 30 frame per second 525 line resolution standard respectively. Each raster or other video generated source file that contains a finite ASCII character resolution that is based upon just how many video lines it takes to create an ASCII character. Each generated video screen is comprised of 312.5 horizontal lines inter-lace, and 312.5 vertical line interlace with reference to the PAL 625 line standard. Each generated video screen is comprised of 262.5 lines of horizontal resolution and 262.5 lines of vertical line resolution with reference to the NTSC 525 line standard. Thus, an OPD full ASCII video raster or other video and audio source file is compressed with reference to a million-to-one compression and transmitted through digital speech air interface channels and ADPCM 32 Kbps speech circuits via selected PSTN speech paths without the need for modems, specialized channel management and the like or other such end-ti-end channel management constructs accordingly. The invention therefore provides the means and methods of enabling a file ASCII text file in the form of compressed video files through an unaltered digital air interface speech channel and a selected ADPCM digital speech circuit successfully.

According to an aspect of the invention. Turbo coding is used in order to maximize selected forward error correction (FEC) constructs that augment the invention's novel harmonic bit stuffing means and methods, that in fact optimize its specialized video compression that enable video generated full ASCII characters for video burst message capsule transmissions. These specialized video-ASCII file compressed message capsules are used to transmit EFTPOS, web clipping, and telematics messaging constructs that originate from the invention's intelligent sleeve application wireless data platform operating in a wireless PLMN such as GSM or mobile satellite environment to a selected regional OPD NOC whereby the message is relayed to a point of presence, such as an application service provider (ASP) operating the Internet world wide web via to TCP/IP 1500 byte data packets respectively. Accordingly, the same type of novel OPD compressed full ASCII-video messaging construct may originate from the invention's NOC, and is therefore transmitted via an assigned ADPCM speech path through the host GSM PLMN to the Intelligent Sleeve, accordingly.

According to aspects of the invention, the invention creates specialized data call packet formats, data call packet and hybrid data packet formats. The invention provides mobile station data call packet transfer initialization schemes, network operation center data call packet transfer initialization schemes, and forward channel and reverse channel data packet transfers that result in a application specific telemetry data communications event utilizing a selected digital data air interface medium. The invention takes an existing data, manipulates that data without disrupting the communications medium to which it is applied, such as signaling system number #7 (SS#7) based Un-Structured Supplementary Data (USSD) services that provide 80 byte data packet for user data. The invention utilizes USSD to transport application specific data, and data call routing means and methods to the VTDN NOC, and/or VTDN Gateway Node. Contained within the bit structure of the 80 byte USSD packet is application specific data that always points the data call to the VTDN NOC via the currently serving SS#7 network, which provide 64 Kbps data rates, and SS7 networks that provide between 56 Kbps and 64 Kbps data rates.

The VTDN NOC can contain a home location register (HLR) that is essentially a service control point (SCP) as a point-of-presence (POP) on any SS#7/SS7 network. The invention provides specialized and simplified data call routing mechanisms that are transmitted in-band, that is within the framing structures of data call itself, via such mediums including, but not limited to, PCM-24, PCM-30, DSO, and DS1 networks, and the like. These heretofore disclosed PCM networks are distributed worldwide. No matter how the data call is initialized, its front-end data packet always points to the same terminating destination, the VTDN NOC facility that is completely interconnected to all TCP/IP Internet network node topologies, PLMN node topologies, PSTN node and switching topologies, and SS7/SS#7 signaling network topologies.

The invention combines OPD harmonic bit stuffing protocols utilized in digital speech channels, combined with conventional yet modified bearer service, and teleservice data protocols that include manipulated and modified SMS protocols, PAD data protocols, USSD data protocols, USSD, PAD, and digital circuit switched protocols. The invention utilizes these selected data call service layers under a cogently structured and efficient VTDN network multi-layered hierarchical protocol. The VDTN virtual data protocols are designed to utilize the best components, processes and procedures from all disclosed bearer and teleservice iterations while discarding the most inefficient and bandwidth hungry features of each. This is accomplished utilizing the invention's means and methods simply by taking an existing data and manipulating that data, which in fact creates an application specific data, without disrupting the conventional means and methods of the communication medium selected as host network transport means.

The term harmonic bit stuffing relates to multiple levels of digital speech frame data bit manipulation. These levels of data bit manipulation include but are not limited to, (1) processes that manipulate low pass and band pass filter coefficients, i.e. causing harmonic octave pulse generated ASCII characters to seamlessly pass through TRAU units, base site decoders, base site subsystem (BSS) and other speech channel network elements without causing disruption to any conventional host network traffic, and without the need to reconfigure host network elements, (2) utilizing off-the-shelf runlength coding, Huffman coding, Arithmetic coding, Lempel-Ziv-LZ77/LZ78 dictionary compression constructs and the like, and (3) utilizing data bit communication augmentation constructs such as turbo coding that encompass recursive systematic convolutional (RSC) which is the basic building block of all turbo code variants, iterations, and the like. Octave pulse constructs utilize conventional algorithmic procedures that increase channel efficiency.

Additional objects and advantages of the invention will be set forth in part by the description that follows; other parts will be obvious from the description, and still other parts may be learned by practice of the invention's many protocols. The objects and advantages of the invention will be realized and attained by means of the elements and combinations particularly pointed out in the appended claims.

2. Description of the Drawings

Reference will now be made in detail to the present preferred embodiments of the invention illustrated in the accompanying drawings. In describing the preferred embodiments and applications of the invention, specific terminology is employed for the sake of clarity. However, the invention is not intended to be limited to the specific terminology so selected, and it is understood that each specific element includes all technical equivalents that operate in a similar manner in similar wireless and wireline communication systems to accomplish a similar purpose.

Referring to FIG. 1, one major component of the invention's octave pulse virtual transaction based data network (OP-VTDN) is the virtual transaction based wireless terminal (VTT) systems and its functional iterations, 50. Expressed in this simple rendering are the main functional protocol elements that drive the VTT configured as an intelligent sleeve, 66. These protocol elements are the core protocol control system module, 52, that is integrated with a selected human machine interface (HMI), 62, configured in such hardware, firmware and software modalities as a Palm VII PDA, 65, or any PDA, 428, that has a "stylus tap-tablet screen", and an LCD or color video view screen. Other HMI interfaces also include, but are not limited to, an ASCII keyboard, an infrared service port, an ISA infrared data interchange port, an ISM/DECT/802.11 a-b compliant 2.4-5.8 GHz wireless broadband node data port, a fingerprint scan system port, a retina scan system port, and the like. Interconnected physically and integrated logically with the VTT core module, 52, is the application specific device (ASD), 99. An ASD can be a vertical market telemetry device, 99*b*, and a horizontal market, speech to text-text to speech module, simultaneous voice and data module (SVD), and an abbreviated Internet web-clipping device, 99*c*, other than a PDA. Either way, core functionality remains the same. Accordingly, there is provided specialized means, methods, and protocol variants that produce application specific data packet messaging and host network routing algorithmic routines. The specialized means, methods and algorithmic protocols are utilized in selected host networks by taking an existing data and manipulating said data, without causing disruption to said conventional means, methods and modalities that relate to the original design and intent of the network elements in question.

Referring to FIG. 1, there is provided the means, methods and modalities of the invention's octave pulse data (OPD), defined as a practical wireless and network data communications language based upon complex wave musical-resonant-constructs. OPD also serves as a stand-a-lone data language, and a means to interpret arbitrary character values based eight bit byte octave pulse signatures. Application specific data character formats are derived from the type of messaging constructs a particular type of application utilized. OPD is therefore applicable with any selected public network's wireless and wireline physical channel transmission path-space, since octave pulse signature constructs essentially remain within the same range of variation. Each end of the OPD communications event may utilize an unlimited range of machine and human language constructs. OPD utilizes conventional modulation schemes and systems protocols in a transparent manner. ODP is designed to operate virtually within the network elements of selected wireless PLMN network and wireline PSTN networks. OPD, with its unique "creation" and support systems, is an "EDGE" technology that is derived from theoretical extrapolations drawn from music theory, acoustic sciences, systems theory, information theory, and is combined with the real world practice with respect to a plurality of wired and wireless telecommunication network means, methods and apparatus.

Figure 3:
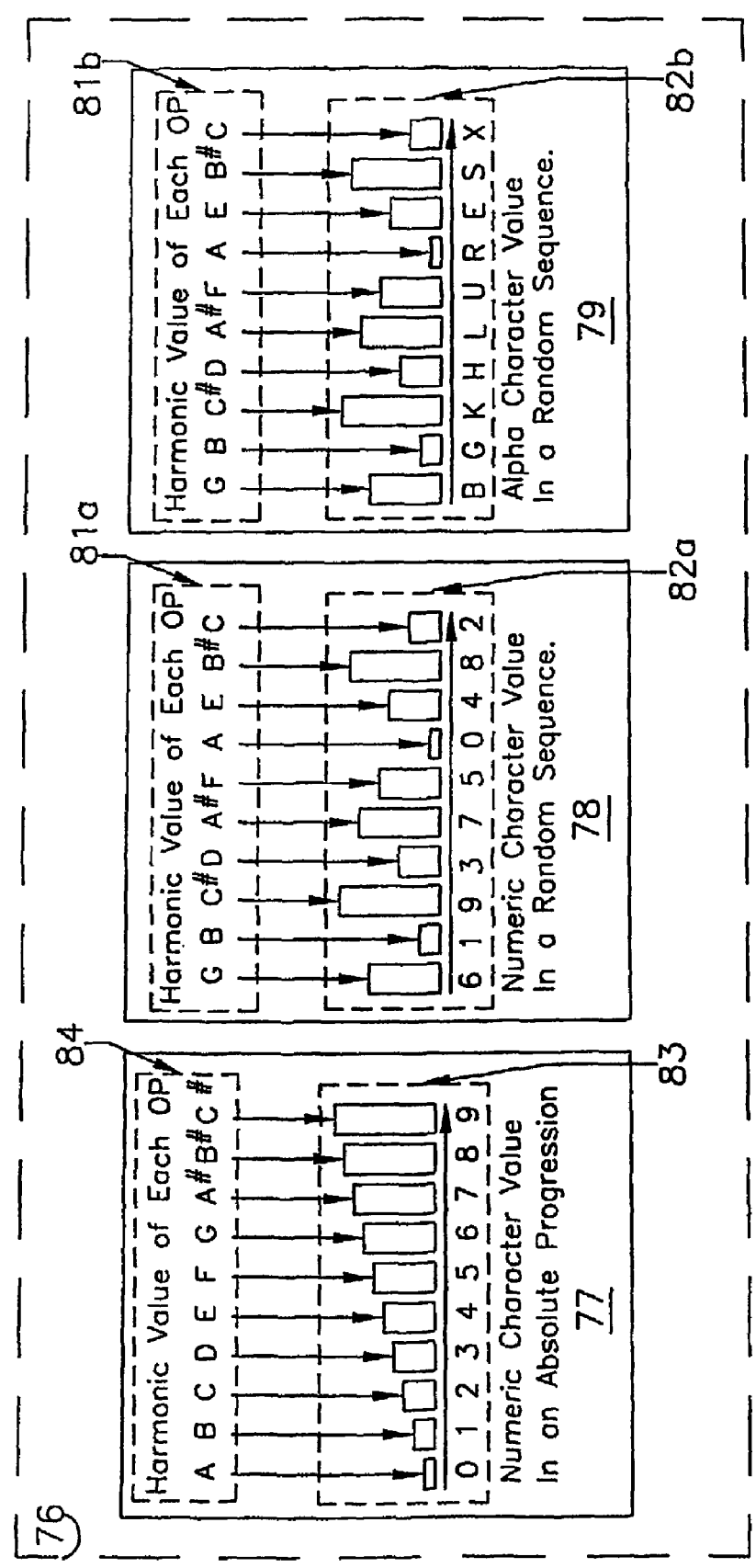
FIG. 3, is block depiction of the Octave Pulse Data expressed in alphanumeric characters, according to the invention.

FIG. 3 depicts a set of fundamental semantic constructs specific to OPD, 76, theory and practice. For example, octave pulse values can be expressed in numeric characters arranged in an absolute progression, 77. Each numeric character, 83, has a corresponding harmonic octave value attribute, 84. Therefore, the very nature of OPD enables a communications system that is at its core a "self simplifying system", in that whatever host network to which OPD is adapted, achieves a significant increase in host network efficiency. Application product diversity is increased when "common sense simplicity" is applied to intelligent management constructs of host network elements from each of the invention's intelligent applications. Simplifying host network elements by merely using each element more intelligently increases all network processes, procedures and applications by virtue of manipulating its origination, termination and routing procedures. Conventional data and digital voice channels are "massaged" with innovative protocols and simplified channel coding using octave pulse generation.

Accordingly, the aforementioned OPD constructs are derived from the phenomena of acoustics. The scope of OPD constructs that are derived from music theory are effectively reduced to, and expressed in, concrete terms that actually point to a given increment of generated sound. This increment is a sound signature construct, that has a set of values expressed in combinations of pitch, timbre, amplitude, beat, sustain and other related aspects. These music elements can be adapted to coincide with other languages such as a plurality of digital communicative constructs utilized in intelligent end nodes and host network elements.

Octave pulse signatures are defined as a "digital message stream" that travels through PLMN channel space. Octave pulses are constructed of electrons carried by "photon packets" at the nuclear particle level. Whether it is a guitar string at rest, or an octave pulse signature stored in an inert database, both examples are expressed as fundamental kinetic or potential energy constructs. To extend this concept further, octave pulse signatures are complex electromagnetic waves that have kinetic energy like a standing wave. As an example, guitar strings when plucked produce similar kinetic complex acoustic waves, with a stored electromagnetism component, and a released kinetic sound wave. Whether at rest in an inert electromagnetic database, or at rest within the physical constructs of a guitar string, reduced to the atomic-particle level, the essential phenomenological expressions of both mediums are the same. For purposes inherent to this disclosure, comparisons in the study of electrical magnetism apply to the constructs of the present invention. The difference between a "standing electromagnetic wave" and a "traveling electromagnetic wave" is essentially the difference between potential and kinetic energy respectively as applied in any electrical medium such as digital channel space.

Referring to FIG. 12, the phenomenological constructs that qualify and quantify octave pulse data (OPD) are common in "harmonic sound shaping systems" known as natural and man made musical instruments. These instruments are human vocal chords, horns, and pipe organs, for example, that shape and move columns of air, and strung instruments that produce sounds as a result of plucking, striking or rubbing strings with fingers, or striking a string with bow or mallet. For the purposes of this disclosure analogies of octave pulses and the harmonic constructs generated by string instruments are utilized here. For example, a "generic string", 225, is stretched between points "X", 224 and "Y", 228. The string, 225, is at rest. The string is displaced by natural and or mechanical intervention, such that the strings midpoint "A", 230, is displaced to point "B", 226, and/or point "C", 231, and released. The string will vibrate in such a way that its midpoint repeatedly traverses these points "A-B-A-C-A". This harmonic movement will continue until the original applied kinetic-energetic force dissipates because of the strings age, tension and pitch level, gravity, air pressure, humidity, the law of entropy, and the like.

Figure 10:
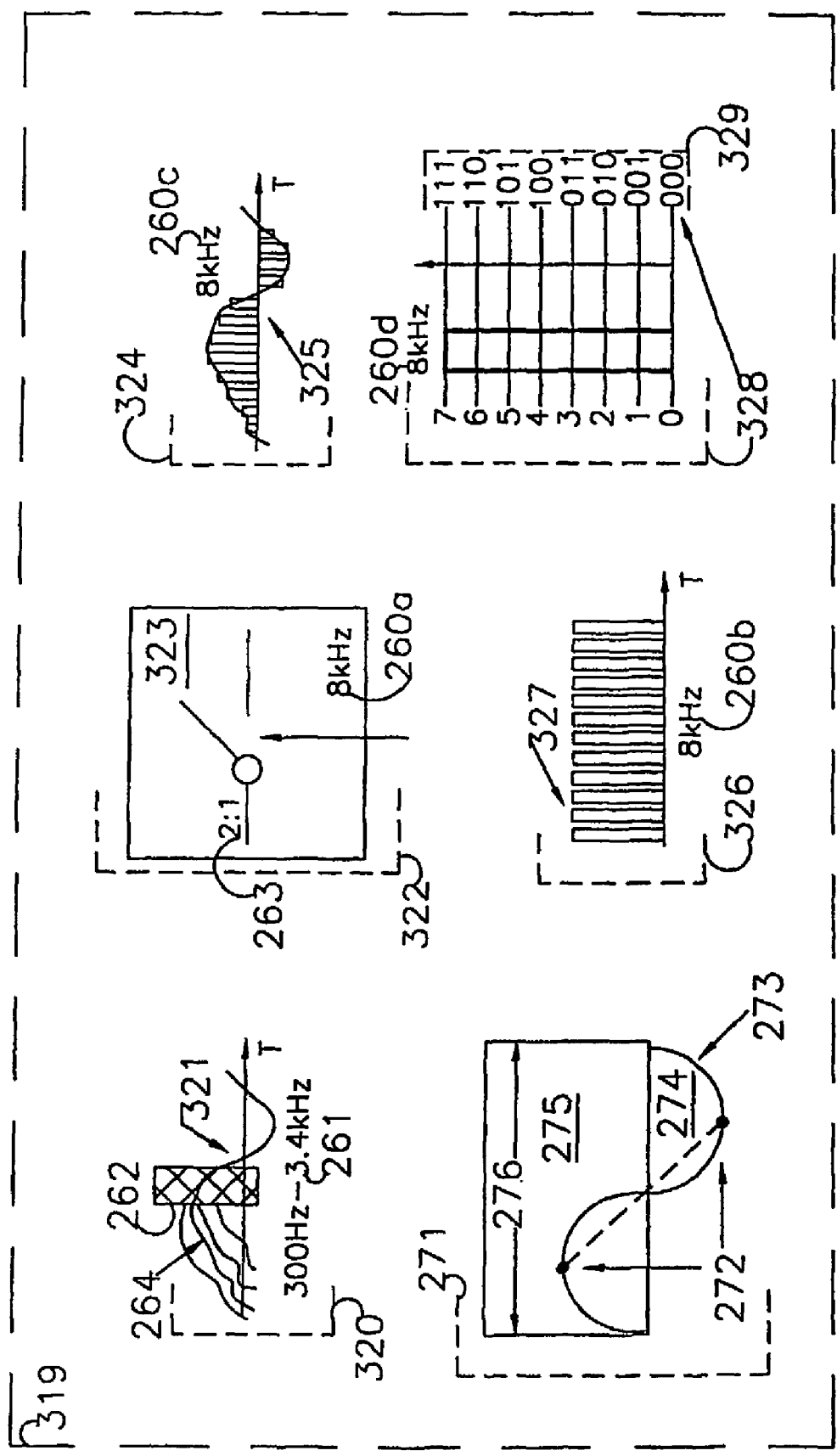
FIG. 10, is a diagram depicting phases of conventional digital cellular speech signal sampling processes, according to the invention.

Depicted in FIG. 10 are fundamental sampling processes 319 that are endemic to conventional digital cellular systems. Baseband speech signals are shown here as a typical acoustic wave, 320, with an unspecified duration. Speech signals are typically restricted to the minimum bandwidth that ranges from "300 Hz to 3.4 Khz", 261, after being filtered, 312, with selected cut-off frequencies, 262. The Sampling Theorem states that the sampling rate, governed by a corresponding sampling interval, 323, has to be at least a 2:1 ratio, 263, i.e. twice the maximum signal frequency. This process is necessary in order to reconstruct the original signal, 264, with minimal distortion and produce clear speech signals in a radio environment.

A conventional mobile stations sampling conversion is a process that involves filtering 262 this raw acoustic or analog input source, 320. Every 125 microseconds (µs), a value is sampled from the analog signal, 264, and quantized, 328, by a "13-bit word", 328, in 8 bit patterns, 329. The 125 µs sampling interval, 323, is used to create a sampling frequency signal of 8 kHz, 260b, which is how 8,000 samples per second are derived from the source, 264, and converted to a sampling signal, 326, and quantized, 328, from hard digital sampling, 327, sources within the 8 kHz range, 260d. Shown here is a symbolic representation of a digital hard sampling signal 325 that is used previous to the channel coding interval, while still maintaining 8 kHz, 260c.

Like a digital music workstation, the mobile phone or the invention's VTT, converts, samples, quantizes and channel codes this voice or octave pulse sound information into a digital bit stream and transmits it to its host network destination. Conversely on the receiving side, the VTT, for example as the intelligent sleeve, receives the digital bitstream information and converts the digital information back into an analog signal that is "played back" via an ear piece speaker or hands free speaker instantaneously. This digital voice information is transmitted over GSM-TDMA, GPRS, IS-136 TDMA, and IS-95-CDMA digital traffic channels. A digital mobile station such as a GSM handset converts the acoustic voice information into digital information via sampling, and quantizing the information into data bit streams, and transmits the information in 20 ms bursts. Each burst represents one frame. Each 20 ms frame speech frame is comprised of four speech subframes; each subframe contains 40 samples. In terms of the aggregate, the derived quanta are 160 samples of voice information total. Each subframe has a duration value of 5 ms.

The invention manipulates these forty samples of each 5 ms subframe with an increment of "pseudo harmonic pattern" that is specially shaped with a sharply defined signature that generates a specifically measured pitch, timbre, amplitude, beat and other identifiable sets of complex waveform dynamics. By providing precise octave pulse signatures, conventional sampling and channel coding processes are optimized as result. In terms of any type of wireless data transmission, any RF channel is a hostile environment at best. Octave Pulse Data is designed to circumvent the effect of noisy digital radio channels and PCM circuits. Each octave pulse produced by the invention's fully synchronized octave pulse sampling and conversion engine (OSE), as part of the OP-CODEC, is designed to be generated as a perfect "fit" within each 5 ms subframe that is encoded, transmitted and received and decoded by a VTT or virtual host system (VHS). Octave pulse precision and thus predictability can dramatically offset the vagaries of a GSM or other cellular or satellite radio channel. Therefore recognition of a single or a plurality of octave pulses in a message bitstream is more predictable, thus enabling a high degree of octave pulse recognition by both intelligent ends involved in a selected OPD communications event.

Major features of digital data transmission involve the techniques used to protect data or speech frames through specialized coding. Coding adds additional bits to the original octave pulse signature information, in order to provide a means of protecting original information in the same way conventional speech information is protected. The invention changes nothing in the way speech and data frames or optimized. The invention simply takes advantage of these coding features, and derives the best benefit from these processes and procedures, and stay well within host network operating standards. In a GSM environment-coding processes are unique and yet are quite similar with respect to IS-95 CDMA, CDMA-2000, IS-136 TDMA-EDGE traffic channel, and Globalstar CDMA/TDMA coding modalities for example. These coding means and methods gives data more security, since it is possible to identify and even correct to some extent data corrupted in the RF path. A simple channel-coding scheme is to break the data stream into blocks or data words and then add a single bit to each block, which indicates to the receiver if the block is correct. This is an example of a block or cyclic code. Convolutional coding is another example of channel coding.

Figure 4:
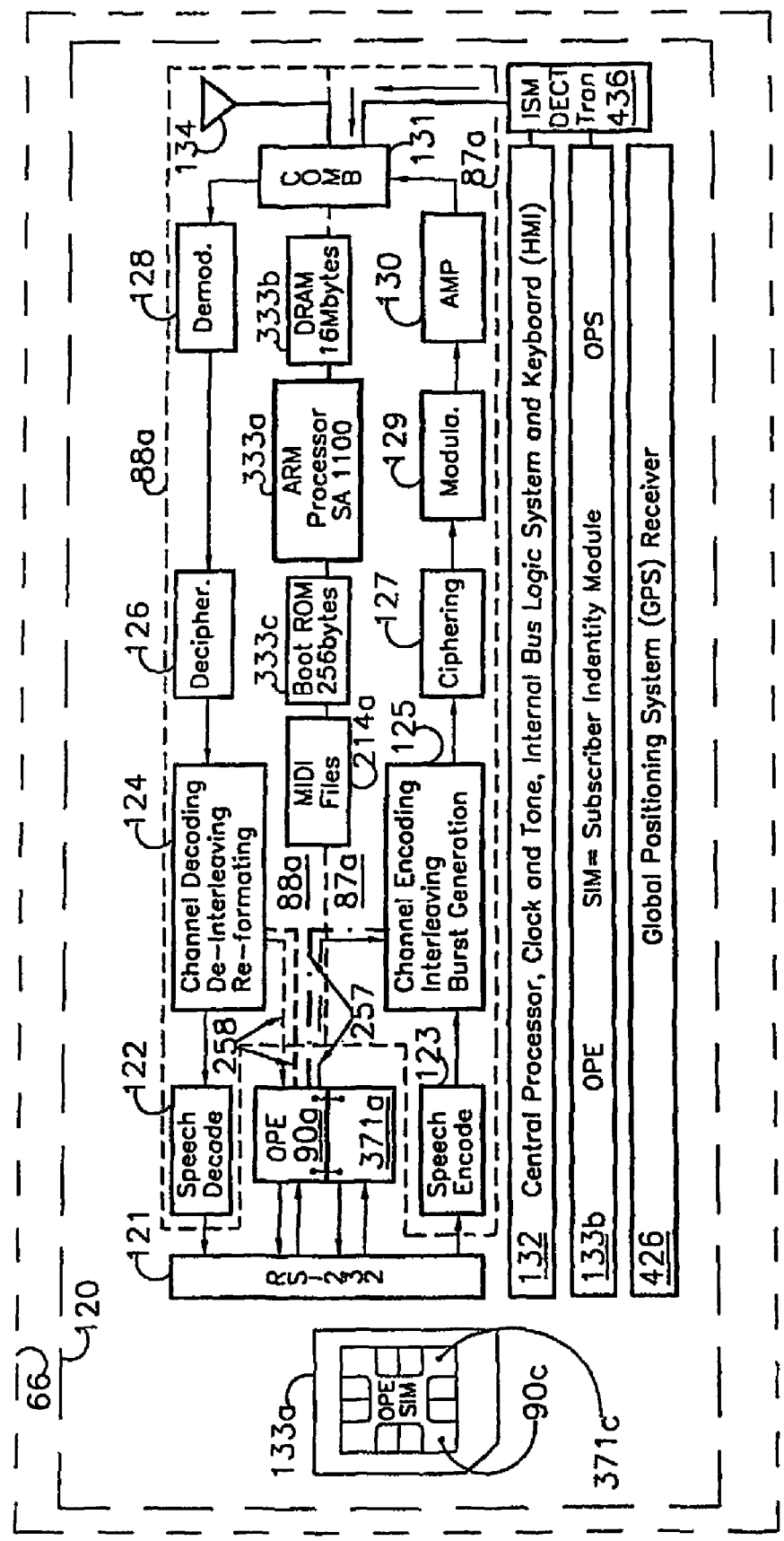
FIG. 4, is a block diagram depicting the component structure of the virtual terminal that supports OPD processing with specialized SIM card, according the invention.

Convolutional coding adds redundant bits in such a way that a decoder can, within limits, detect errors and correct them. For a code to be able to correct errors, a certain number of additional bits have been added to the data payload or "octave pulse" load. The added bits are called redundancy bits. These conventional coding processes and procedures do not effect octave pulse data in any adverse way. In fact, octave pulse data enables much less data bit errors because each 5 ms pulse is highly predictable in terms of its octave pulse signature, structure, and duration. An octave pulse is generated in a 5 ms subframe at the point and time of a speech channel 20 ms frame, by the GSM radio, for example. Along with clean and predictable octave pulse recognition and subframe synchronization, there is yet another interesting feature to channel coding that the invention productively exploits. This is illustrated in FIG. 4, which depicts a block representation of the invention's Virtual Transaction data Terminal (VTT) componentry, 120. This example reflects conventional design formats with special modifications. The VTT comprises a subscriber identity module (SIM), 133, a module card, 132, that contains the central processor (CPU), clocking and tone functions, internal bus logic and an interface/adapter to allow connection to a human machine interface (HMI) apparatus including, but not limited to, a key board, key pad, speech to text module, and the like. The VTT integrated circuitry means are broadly divided into the encoding side and decoding side. There is also provided a global positioning system (GPS) receiver, 426, in order to provide positioning information when the VTT, 120, is configured as an "intelligent sleeve", 66, for an OPD modified personal digital assistance (PDA), 65, as depicted in FIG. 23.

With reference to FIG. 4, the VTT utilizes a conventional TDMA data encoding module set, 125, that includes channel encoding, interleaving, and TDMA burst generation processing, a ciphering module, 127, a modulator module, 129, a combiner, 131, and an antenna or antenna port, 134. On the decoding side there is provided a conventional demodulator module, 128, a deciphering module, 126, and a channel-decoding module, 124, that performs de-interleaving and reformatting procedures. There is also provided an RS232 interface port, 121. The invention provides a specialized speech decoder, 122, and a speech decoder interface, 123. Also provided is an octave sampling and conversion engine (OSE), 90a, and an octave pulse storage system (OPS), 255, in the form of chipset or series of chips operating in parallel that comprises the OP-CODEC. The OSE, 90a, is interconnected to the channel decoding module, 124, via specialized bus logic, that provides octave pulse content and synchronization, 258, with channel burst cycling. The OSE, 90a, is also interconnected to the channel encoding module, 125, via specialized bus logic that provides octave pulse content and burst cycle synchronization, 257. There is also provided a MIDI data instruction file, 214a, used for octave pulse loading, an ARM processor chip, 333a, boot RAM memory chip, 333c, and a DRAM chip, 333b. These three components further enable incredible application diversity for the invention's "intelligent sleeve", 66. Additionally, there is provided a specialized SIMM card, 133a, that is configured as an OPD fully programmable gate array (FPGA), or application specific integrated circuit (ASIC) that contains all of the OP-CODEC program constructs that enable OPD, voice, and simultaneous voice and data communications protocols, processes and procedures, accordingly. The novelty of this construct also extends into the potential ease as to which OPD may be applied to a conventional GSM digital cellular or other digital cellular or satellite based terminal. In addition to the insertion of OP-CODEC compatible SIMM card, the only other modification deemed necessary is nominal radio firmware bus-logic based instruction sets that will enable (1) the deactivation of a conventional speech CODEC and (2) the activation of the invention's OP-CODEC and its operational iterations.

Figure 23:
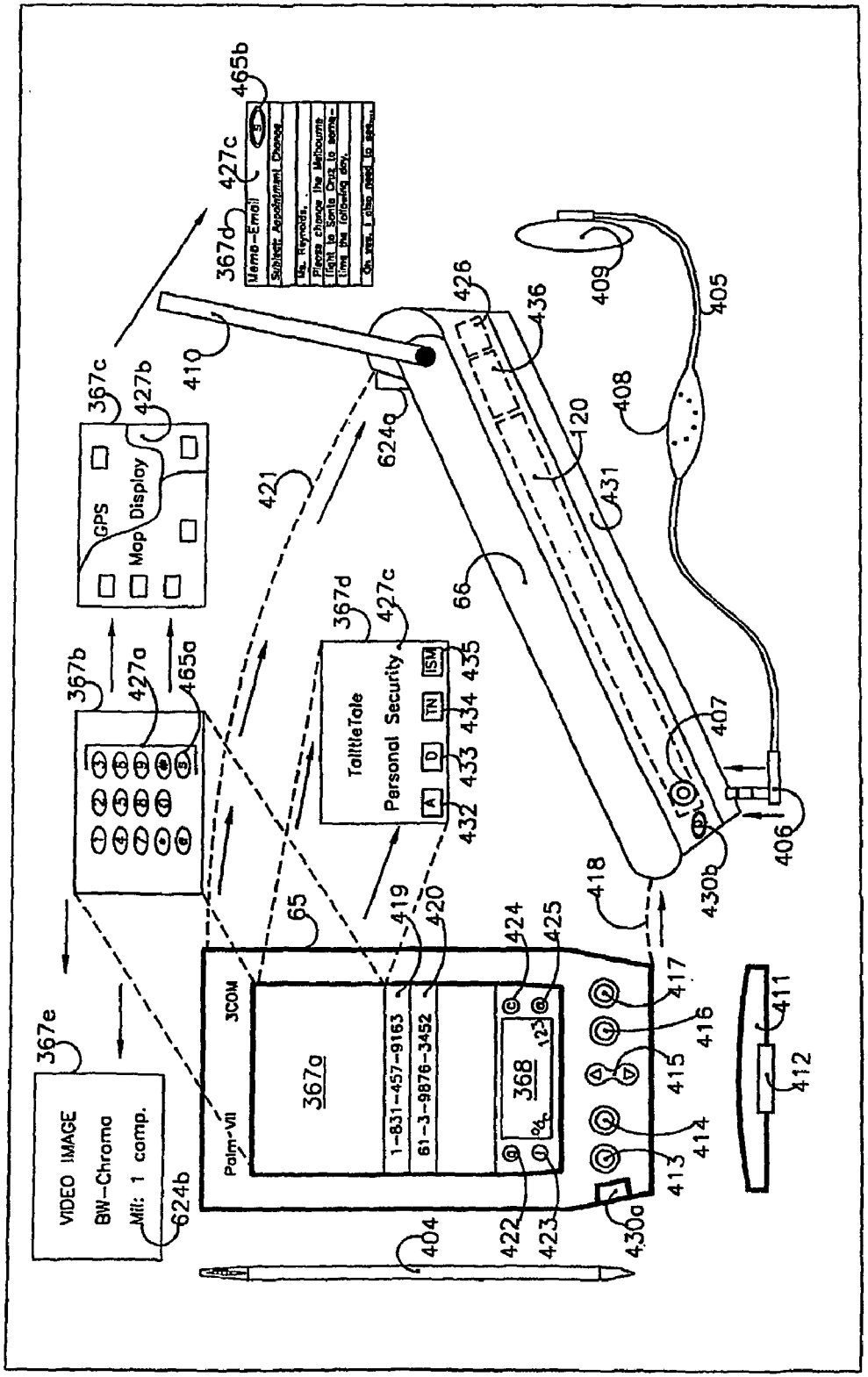
FIG. 23, is a graphic representation of a modified personal digital assistant (PDA) and the intelligent smart sleeve, according to the invention.

Referring to FIG. 23, ARM processors are designed to support many software modules and kernels that enable high-resolution graphic displays, and interactive methods such as a "tap stylus", 404, for PDA screens such as the one shown, 367a, as part of the Palm VII PDA, 65. In fact, the intelligent sleeve, 66, is structured around an "embedded-system" architecture. While the intelligent sleeve does not have a display of its own, with the ARM processor the intelligent sleeve will support any and all PDAs with high resolution graphic displays, including color displays, and the like. There can be many application modules and kernels that are embedded within the firmware and software means of the OPD based intelligent sleeve, 66. These embedded application kernels and modules will power and process applications specific to octave pulse data management, digital cellular applications, and other such applications to be accessed, controlled, and displayed on the interfaced PDA, 65.

Figure 25:
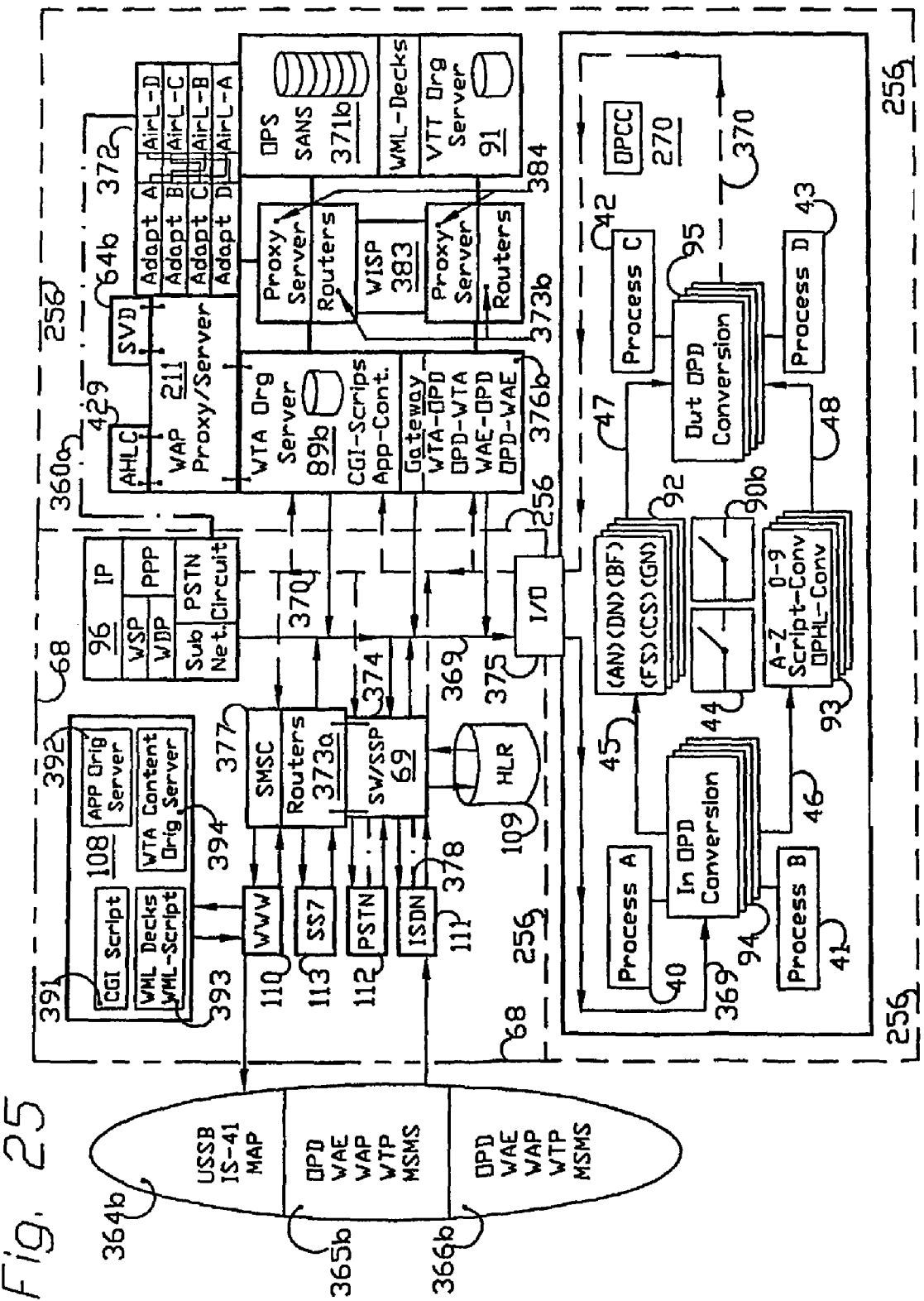
FIG. 25, is a schematic representation of the OPD-VTDN network operation center and the virtual host system portal, according to the invention.

Referring to FIG. 4, the invention's virtual transaction terminal (VTT), 120, acts as one end of the intelligence chain that contains the invention's synchronized octave sampling and data conversion engine OSE/OSP chipset, 90a and 371a, respectively. On the other end of the virtual network, the OSE, 90b, and as shown in FIG. 25, is a key component of the invention's core octave pulse generation system (OCGS), 44, and the octave pulse character conversion (OPCC), 270. All three components are part of the invention's virtual host system (VHS), which serves as a portal, 256. The VHS, used as an Internet portal, 256, is a comprehensive WAP compliant system that is located at a designated master network operation center (NOC). The virtual host manages all octave pulse activity, MSMS messaging, voice and data call processing and routing. The invention's OSE, OCGS and OPCC are designed to completely synchronize with host network, specifically with digital traffic channel coding, framing synchronization and PCM channel synchronization. Like a speech codec, data streaming from a VTT integrated OSE is channel coded and octave pulse coded before being forwarded to the modulator integrated within the substrate layers the transmitter that is a part of the VTT, 120, used in conjunction with an intelligent sleeve, 66.

The same process occurs within the virtual host system. The invention's OSE, OCGS and OPCC are designed to synchronize with the input algorithms of the PCM encoder and the output algorithms of the PCM decoder. Octave pulse signatures are transported by way of associated PSTN and its PCM channels. Octave pulse data is also channel coded during the data compression and conversion process of converting PSTN channel data protocols to digital air interface channel protocols. This conversion takes place when it arrives at the currently serving base site (BS), base site controller (BSC) and or satellite transponder. Interestingly, digital traffic channels with speech frames are the most ubiquitously deployed wireless data medium in the world, and PCM channels have more comprehensive penetration worldwide than any other data and voice transport medium. The invention makes the best of this situation.

To better understand the fundamental details of Octave Pulse Data character structure, references to particular musical sound dynamics are disclosed. These specific sound dynamics are inherent with the acoustic effects of instruments such as a piano, violin, lute or guitar, for example. Strings that are struck or plucked during play produce unique harmonic constructs that are easily defined, yet are complex and reveal the fundamental harmonic signature constructs of each individual octave pulse and its unique pseudo sound signature (PSS). When many octave pulses are combined to create a data-message in a database, and then transmitted over a digital traffic channel or a PCM network, a new data transport means is harnessed. When the message arrives at its destination and is read by a person, a new digital data communications language is defined. Plucked or struck instrument strings produce easily quantifiable and predictably managed sound values. The behavior of musically defined acoustic phenomenon is a predictable constant in much the same way channel coding, codec algorithms and filter coefficients predict the behavior of human speech patterns in digital cellular and satellite radio systems.

Figure 9:
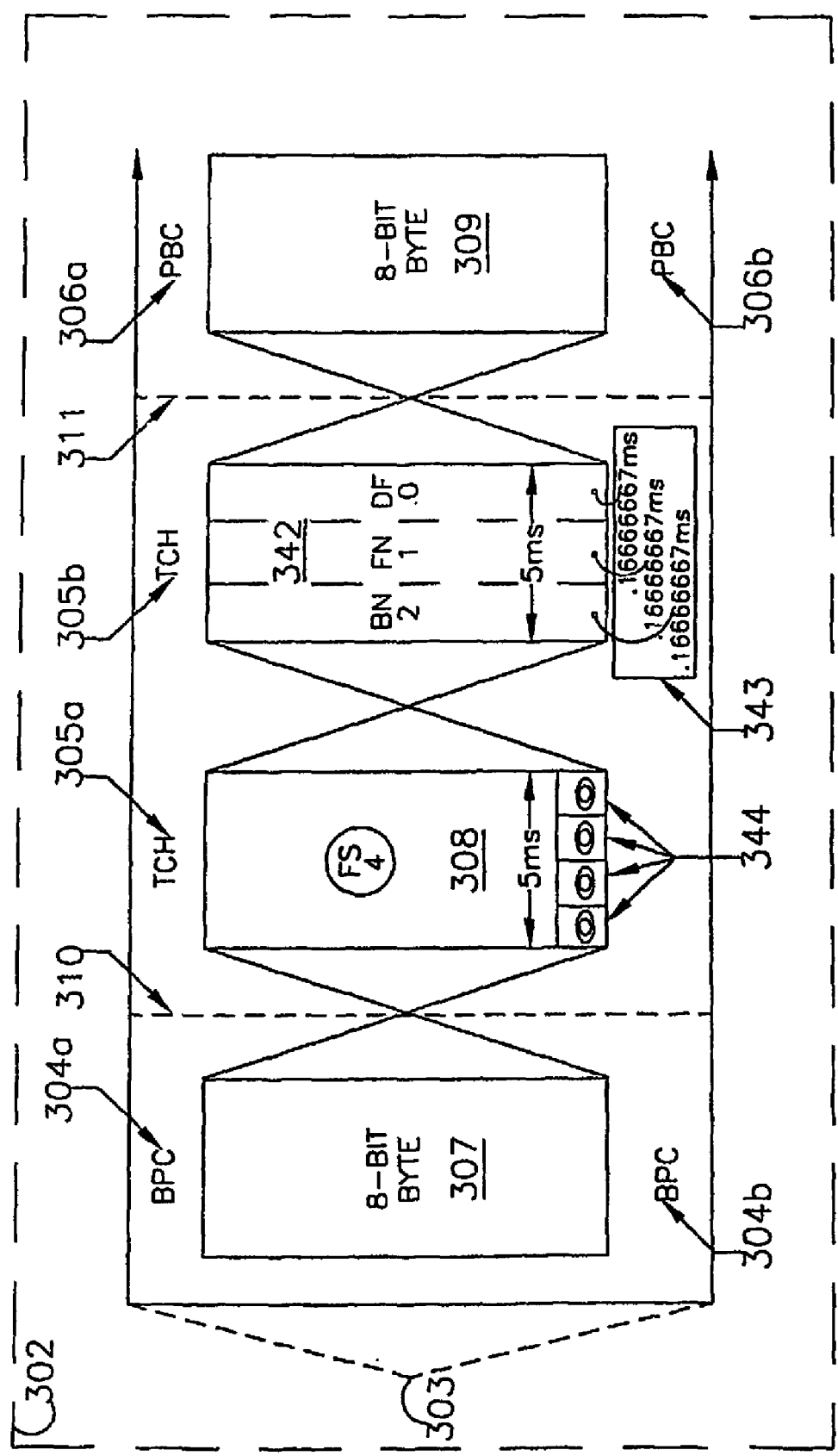
FIG. 9, is a depiction of an Octave Pulse notation differentiation converted to conventional data formats, according to the invention.

Depicted in FIG. 12 is a displaced string, 225, oscillating on a string instrument. Imagine that this string has been stretched between points "X", 224, and "Y", 228, with its midpoint at "A", 230. This string, 227, is stretched between, and attached to, wooden or metal pegs mounted on the body and neck of a guitar, or within the body and frame of a piano. For example, if the string, 227, at midpoint "A", 230, is displaced in some manner to point "B", 226, and released, it will vibrate in such a way that its midpoint repeatedly traverses the course "A-B-A-C-A", assuming for the moment the absence of friction, stiffness in the string at rest, and the like. Now imagine that the midpoint of the string "A", 230, is a point of light, and that light sensitive paper is passed along the string at a steady speed, in a direction parallel to the length of the string, and in a plane parallel to the plane in which the string is vibrating. The vibrations of the string are then best understood as represented by waveforms. Referring to FIG. 15, these waves, 235, have a duration of 1, 238 oscillations as traced by the midpoint "A", 239, the distance encompasses one complete wave, one harmonic vibration cycle, or one octave pulse, 80, during which, in a musical context the midpoint of the string has traversed the course, "A", 239, "B", 234, "A", "C", 236, "A", that equals a measure or an increment of temporal time called a duration, 233, equaling 5 ms. This measured, 238, wave, 235, therefore stipulates and specifies the "wavelength" of an octave pulse, 80, expressed as a combined character value of "TZ", 312. Referring to FIG. 14, this particular wavelength equals a specific musical value that is expressed "pseudo acoustically, as a "high speed data, "digital note, in the form of an "F Sharp" with a beat factor of four, 308. The "beat factor", refers to the unique signature of this octave pulse, 80, as depicted in FIG. 9. Each "beat", 344, possesses a pseudo sound signature that has a time duration value of 1 ms that comprises a 5 ms octave pulse. Accordingly, within the bit structures of the octave pulse "signature", defined here, as "FS4", 308, is the selected 5 ms that are one to four 1 ms "beats", or "tick-track" signatures, coupled with well-defined syncopation patterns. There is provided a three signature octave pulse, 342, that contains three complex waves that generate a B natural with a two beat value, an F natural of a one beat value, and a D flat with a 0 beat value. Each signature or sub-pulse has a duration of 0.16666667 ms, which comprises a 5 ms pulse.

Syncopation can be defined as the pause between the beats. Each octave pulse can possess a one-to-four beat signature that is a unique pattern that may be arranged differently, because each octave pulse signature connotes a unique ASCII, Alphanumeric character arrangement. Therefore this particular pulse has a well-defined musical-tone based "octave language value" (OLV) of an F sharp that is combined with an equal or offset beat value of four, 308. This particular octave pulse also has a character translation value of one to three eight bit byte(s), 307 and 309, respectively, with an ASCII character value of "TZ", 312, after translation at either "end" of the invention's OP-VTDN network. An equal or even beat pattern suggests the "beats", 344, have equal syncopation between beats, or "beat equal syncopation" (BES). An offset beat syncopation suggests the "beats" have an uneven or "beat off-set" (BOS) pattern.

Referring to FIG. 15. In terms of the dynamics of light, sound or radio waves all three phenomena produce waves or waveform. All waves oscillate with cyclical characteristics. The three waves, 235, depicted here are complete waves, also known as vibrations and cycles. Because this wave is quantifiable and qualifiable in temporal reality, this wave, 235, is defined in terms of "unit" of time. Therefore the number of complete waves occurring per unit of time is the "frequency of vibration" and is measured in cycles per second, or Hertz. The distance "a", 237, is the "amplitude of vibration", 240, as shown in FIG. 13. Referring to FIG. 12, the frequency "f" of a string, 225, is defined by its length "L" in meters, stretched at a tension "T", measured in Newtons.

Another part of the equation, which deals with mass "m", in kilograms per meter of length, is expressed as follows:

$$f = \frac{1}{2L}\sqrt{\frac{T}{m}}$$

From this relationship it can be seen that if the tension and mass of a string remain constant, the frequency will rise as the length of the string is reduced. Strings and most other vibrating systems, however, generally vibrate in several modes simultaneously. In the case of strings, these modes consist of harmonic-vibration-based segments shorter than the total length of the string. This points directly to the bandwidth of this string by virtue of its dynamic frequency range. An octave pulse also possesses a dynamic frequency range, for similar reasons.

A key element that relates to octave pulse performance is expressed as pulse to host system resolution (PSP). Mathematical formulas may be derived by simply knowing the resolving rate of a selected digital traffic channel, its serving system base site radios and VTT filter; anti-aliasing coefficients and PSTN PCM channel performance parameters. Octave pulse signature resolving or resolution rate is based upon a pulse per second (OPS) rate. A host telecommunication system's PSP rate thus reflects how efficiently a network node processes, discriminates, and fully transports from an origination point, such as the VTT, to the VHS portal located at the invention's NOC via a host PLMN and PSTN network. At this point it is still necessary to understand additional "string dynamic" parameters.

In terms of considering string harmonics, strings can vibrate in many modes or states at once, called halves, thirds, fourths and so on. Referring to FIG. 18, the illustration shows the first three vibrations. In any single, double or triple mode of vibration, 281, 282 and 284, all of the vibrating segments are of equal length and called "loops", 280a-c, respectively. The points "N", 283a-c, are "nodes" and remain stationary. Because each mode of vibration results from a division of the string at a "node point", 283a-c, into some integral number of segments of equal length called "loops", 280a-c, it follows from the mathematical expression for frequency previously disclosed, that the modes of vibration will produce frequencies that are integral multiples of the fundamental frequency. Thus, when the string vibrates in halves, the frequency produced will be twice the fundamental, when in thirds the frequency will be three times the fundamental. Octave pulse signature structures are based upon these laws of vibrating frequencies, in order to perform optimally in a selected digital traffic channel and PCM space. Each octave pulse is generated at the point of origination, in such a way as to achieve the best "harmony" with selected host network element, filter coefficient settings and other related aspects. These important octave pulse performance related aspects have further relevance with respect to specific codec-vocoder sampling rates, frequencies normally detected, and levels of octave pulse signature complexity features, that are allowed to pass from one conventional network element to another network element.

Octave pulse signature complexities relate to the extent of holographic data bit pattern differentiation's that a given host network element will recognize during a traffic channel subframe, PCM frame and subframe coding and channel coding procedural event. Octave pulses are holographic data bit patterns that are sampled and stored in special databases. Octave pulse signatures are "whole pseudo-octave-harmonics" that are based on the manipulations of octave "pseudo-harmonic fundamentals", halves, thirds and special beat patterns. Therefore, each single octave pulse signature can produce specialized layered signature constructs, and still be accurately resolved by conventional PLMN and PSTN network elements. The invention's octave pulse sampling and data conversion engine (OSE) is designed to be set well above the resolving rate of sampling engines that resolve at 8,000 bits per second. Each octave pulse 5 ms "waveform" must be shaped in such a way as to match conventional codec filter coefficients that further facilitate passage through conventional filter frequency limitations. Octave pulses need to coherently match the "octave ranges" of human speech, within reason. Specialized octave pulse beat signatures, coupled with "signature-fundamental-tones" result in a full range of new arbitrary conventional characters being transported. A series of frequencies consisting of "fundamental" and integral multiples is called a harmonic series. In a sense, the fundamental produces additional waves, in series with the same amplitude and duration. This process is much like photons interleaving as electron packets in an electromagnetic space with respect to any modulated radio and PCM channel space.

The fundamental is called the first harmonic, in terms of a specific "single tone" octave pulse. The "fundamental" in an octave pulse signature application relates to the "primary" wave. The frequency that is twice the fundamental is called the second harmonic, and so on. Frequencies above the fundamental in this series are also sometimes called overtones, the first overtone being the second harmonic. In practice, a single string, or other vibrating system used in music, produces a series of discrete frequencies, called partials, simultaneously and thus produces a series of discrete pitches simultaneously. However, since the fundamental usually has much the greatest intensity, the ear, while assimilating all of the frequencies present, recognizes only the fundamental. In terms of octave pulse system design, all frequencies of a selected octave pulse are recognized, read and "weighted for its character value. The presence or absence of the remaining harmonics and their relative intensities contribute to what the ear perceives as the timbre or tone color of the fundamental pitch. The vibrations that produce each of these remaining harmonies can be represented as a wave of a certain length and amplitude, and the waves representing all the frequencies present in a steadily sounding tone can be added together to produce a single complex waveform. Therefore, a complex waveform that describes the tone with respect to what is heard has both pitch and timbre. In terms of an octave pulse, it is not what is heard, it is what is digitally detected, resolved and processed at each end of the virtual network.

Referring to FIG. 13, shown here is a complex harmonic waveform, 313, as derived from an acoustic source. This complex waveform, 313, is comprised of a fundamental or "primary articulated waveform" (PAW), 241, a second harmonic, or "second articulated waveform" (SAW), 242, and a third harmonic, or "third articulated wave" (TAW), 243. In this novel complex wave, all harmonics generate equal amplitude, 240. This complex wave with its three waveforms can be construed as a "spectrum" each line, 241, 242 and 243, represents the intensity of each harmonic, or waveform, each with its own signature. This layered spectrum relates directly to one octave pulse that possesses a signature value of one, two or three 8 bit byte characters arbitrarily attributed and translated into a conventional ASCII, numeric, or holographic graphic character. Thusly, each spectral line represents a character value with an arbitrary interpretation and therefore creates a coherent language value all its own. The "static value" of one octave pulse equates with one to three eight bit bytes. This core value never changes only how each "harmonic signature" value is assigned to a unit of information such as a letter, number, graphic increment or a whole hieroglyphic character with respect to traditional Asian language construct. For example, a selected application may require the use of a Chinese written hieroglyph as a discrete unit of value interpreted on either end of the "octave pulse data" communications event. The character value is completely arbitrary. Each octave pulse can possess specific arbitrary application specific related interpretations in systems that are designed to communicate in terms of octave-pulse harmonic language constructs. In FIG. 13 the concept of "time", 244, in this case relates to an octave pulse with a 5 ms duration.

With reference to FIG. 18, once the string begins to vibrate, the string is manipulated into three different harmonic iterations, 281, 282 and 284. The relative wave-position of the three harmonic loops, 280*a-c*, relates to the harmonic emphasis, 265*a-c*, and de-emphasis paradox, 266*a-c*. This motion is created in such a way as to emphasize one or another of the harmonics in a measured phenomenological context. For example, if a string, 282, is plucked at its midpoint node "N", 283*a*, the first harmonic or "primary articulated wave" will by emphasized, 265*a*. and the "second articulated wave" will be de-emphasized, 266*a*, since the midpoint is at node "N", 283*a*, for the "second articulated wave". Similarly, plucking or bowing the string closer to the end will tend to emphasize one or more of higher harmonics with respect to the "primary articulated wave" or fundamental. Differences in the point at which the string is plucked or bowed, i.e., at "Node points", 283*a-c*, are heard as differences in timbre or tone "color". In a related concept, the frequency and thus the shape of a "primary articulated wave" and a "complex wave" of an octave pulse signature perform differently in different "codec constructs", PCM circuits, and digital traffic speech channel environments. Proper channel coding and quantizing configurations can reduce and reshape channel noise. Critical quantizing noise can certainly effect the performance of a plurality of octave pulse signatures. The quantizing noise generated at the output of PCM decoder can be categorized into four types depending on operating conditions. The four types are overload noise, random noise, granular noise and hunting noise. Because of the exacting design of octave pulses as they are generated within 5 ms subframes, much of the noise inherent with respect to real-world digital traffic channel and PCM channel space environments is eliminated. Channel noise phenomenon also includes a plurality of detected ambient noises this type of noise is also produced by inferior user equipment. The octave pulse engine (OPE) designed for the VTT, in the form of an intelligent sleeve, and the invention's virtual host system (VHS) is directly integrated with digital traffic channel codec algorithms, coding modules, and PCM encoder/decoder and channel coding input and output systems that process speech through codecs. The octave pulse system is designed to eliminate as much origination noise that is possible.

The level of the analog waveform at the input of the PCM encoder needs to exceed the design amplitude peak of the host channel. Octave pulses must be carefully configured in order to generate proper amplitude levels, complex wave pitch, timbre, and wave shape. Octave pulses use digital sampling as the only resource for octave pulse signature generation. During an octave pulse data communications event, there is no direct speech sampling and encoding by the VTT on the network input side, and no digital bitstream to analog decoding conversion on the network output side. Digital octave pulse data is specially coded, synchronized and transported from an origination point in speech frames within a digital traffic channel, converted to PCM frames at the base site, and relayed through the channel space of a PSTN environment to the invention's VHS serving as portal to the Internet world wide web. When the octave pulse data arrives at the VHS no digital to analog conversion is necessary. The PCM digital voice frames and subframes are detected and the contained octave pulses are retrieved and stored in a digital medium, such as a storage area networks (SAN), for further processing and use for messaging. In a system perspective, octave pulse data communicates from point of origination to point of termination in complete digital form. By eliminating analog to digital conversion and visa versa, most of the noise associated with conventional speech processing is eliminated. Therefore, octave pulse data communicates over digital wireless speech channels and PCM channels in the form of a "digital bitstream" during an end-to-end OPD communications event.

Figure 19:
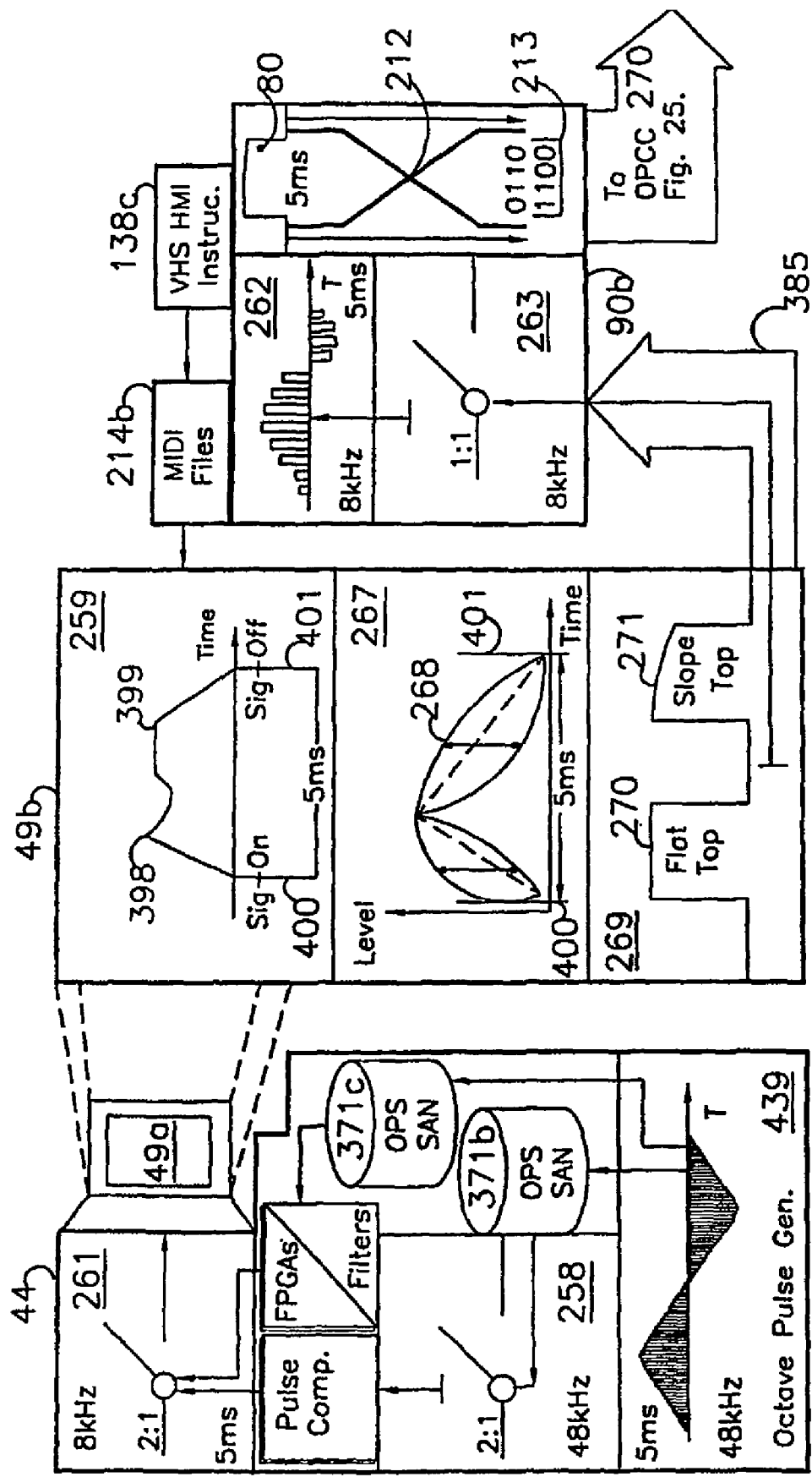
FIG. 19, is a depiction of Octave Pulse sampling processes and waveforms, according to the invention.

Referring to FIG. 19. Even though octave pulse data is a complete digital solution, certain critical performance problems may occur while transported in selected digital air interface and PCM channel space. At point of input the peak amplitude level of one or a plurality of octave pulse signature waveforms transmitted through a selected traffic or PCM channel, may exceed the amplitude levels that a selected digital speech channel or PCM channel is designed to resolve. Referring to FIG. 18, once the string begins to vibrate, the string is manually manipulated during a hypothetical musical session into three different harmonic iterations 281, 282 and 284. The relative wave-position of the three harmonic loops, 280*a-c*, relates to harmonic emphasis, 265*a-c*, and de-emphasis paradox, 266*a-c*. This paradox closely relates to how a "standing" or "traveling" wave is animated by the paradoxical force of electrical force and magnetic force at the particle level.

This motion is created in such a way as to emphasize one or another of the harmonics in a measured phenomenological context, in much the same way as low power digital impulse radio transmits huge amounts of data across a wide spectrum, yet produces a low power signal. This data is read as a pattern of data essentially convoluted in background cosmic noise. Octave pulse data pulses must compete with the dynamics of amplitude, phase and frequency, with respect to relatively high power signals in air interface radio propagation environments, and PCM channel space. In a metaphorical sense, an octave pulse traveling in a digital traffic channel speech subframe, and PCM frame, is like a passenger in a fast moving automobile down a city street with a leaky exhaust and holes in the floorboard. In this colorful example the passenger is certainly moving forward, but a stationary observer standing on a street cannot see who is in the car because it is filled with exhaust smoke.

Octave pulses that are transported within PCM signal constructs must contend with noisy switch exchanges and E1/T1 repeaters while traveling through selected PLMN and PSTN networks. The invention creates a "harmonic paradox", as discussed in FIG. 18. Referring to FIG. 19, entire octave pulse message/bit streams must have a "global" frequency response that generates octave pulse complex waveform constructs as a group that combat host channel noise by maintaining frequency response levels that reside right below peak amplitude levels, yet well above detected channel noise levels. Octave pulses must be detected through this window of clear recognition. Conversely, each octave pulse is essentially calibrated to achieve the highest resolving signature when it is initially generated with complex harmonic coding, channel coded, and synchronized at point of input. Therefore it is much more likely that an octave pulse bitstream will be read accurately at a selected termination point, such as the VHS, 256, or the VTT. All elements of an octave pulse message are intended to operate in electromagnetic spectral harmony from generation to termination.

In order to achieve performance harmony at the point of pulse output, the recovered octave pulse waveform, 269, will have near "flattops", 270, suggesting a close proximity of host channel peak level values, as shown in FIG. 19. Flattop waveforms represent a peak signal level, and further relate to the production of overload noise as a result. When peak values are generated with no amplitude ceiling the absolute bandwidth of flattop waveforms reaches theoretical infinity. If these waveforms are filtered improperly as they pass through channel space, they will distort and spread in time and the waveform for each octave pulse as a "subframe bit-symbol" may be smeared into adjacent time slot-frames and cause intersymbol interference (ISI).

Octave pulse data and its virtual transaction data network (VTDN) topology is designed to minimize the imperfections of public digital air interface cellular channels, and PCM/PSTN network elements. During an octave pulse data communications event, the data spends more time in decompression and compression circuits, PCM circuits, switching matrixes, line repeaters, than digital air interface channels. Certainly, an octave pulse-stream that originates from a VTT through a "dirty", narrowband GSM speech channel, and which is corrupted at the point of, and within the medium of generation, will not perform in optimum ranges through PCM circuits.

Figure 11:
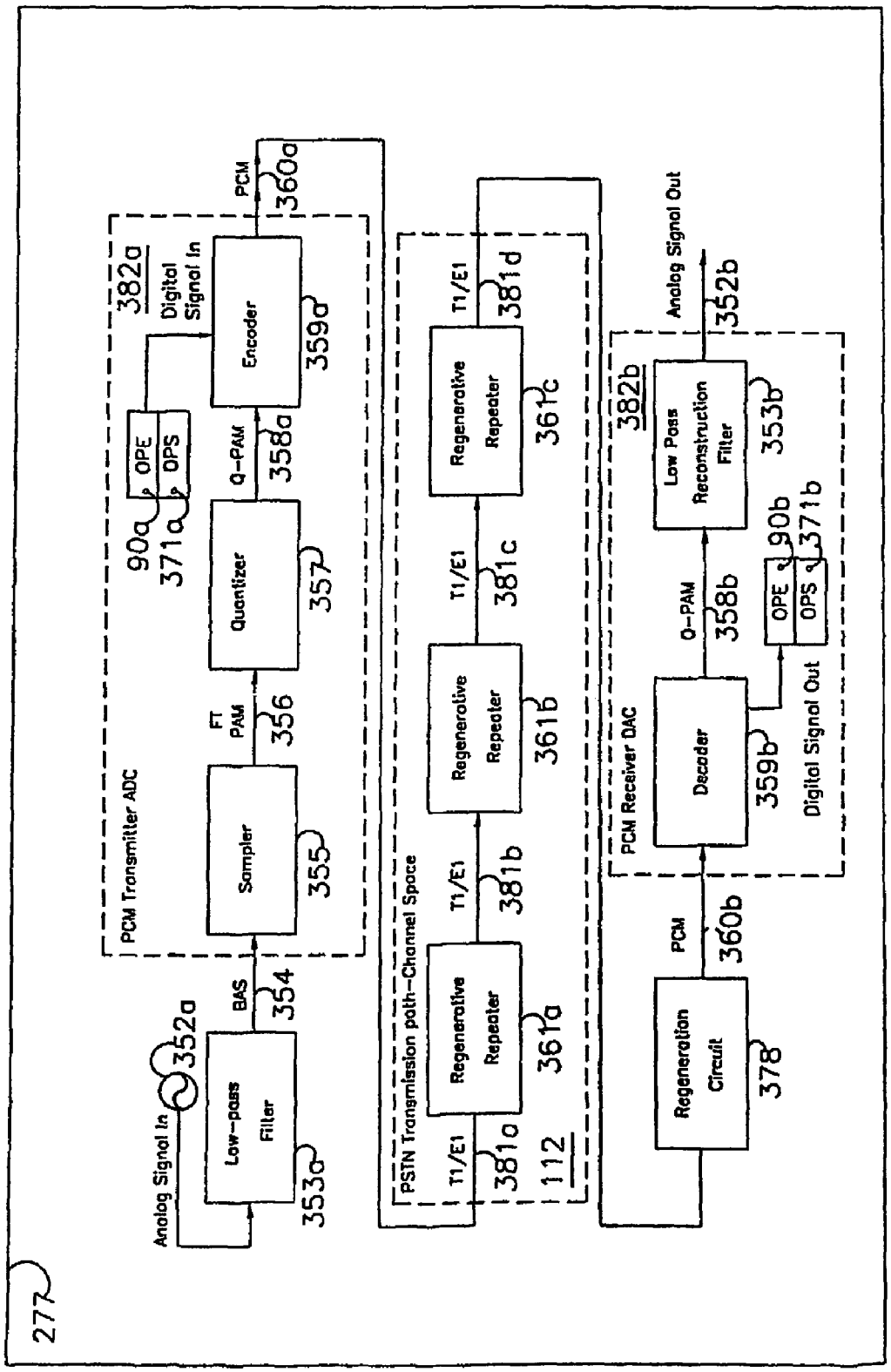
FIG. 11, is a diagram depicting selected coding and modulation structures, according to the invention.

Depicted in FIG. 11 is a conventional PCM circuit used in PSTN channel space, 277. This PCM circuit conforms to a PCM 24 or PCM 30 format, that reflects either a T1 or E1 based PSTN network topological standard. In one scenario the analog waveform is distorted since the flat topping, 270, pattern, as shown in FIG. 19, produces unwanted harmonic components. For example, this type of distortion can be heard on a PCM telephone system when there are high amplitude levels produced by common dial tones, busy signals, DTMF tones, central office tone generation, and off-hook alert signals. The second type of noise, called "random noise, is produced by random quantization errors that appear in a PCM system under normal operating conditions when the input level is properly set. The process of converting a sampled acoustic sound into a digital value is termed the previously described process of quantization. The number of distinct sound levels that may be represented is determined by the number of data bytes used to store the quantization value. Quantization errors occur between the sampled discrete values and a measure of the actual continuous sound. This is referred to as the signal-to-noise ratio (S/N).

If the analog sampling process is eliminated at the channel input and nothing but digitally derived octave signatures are generated/inserted during subframe generation, then that process occurs simultaneously with channel coding procedures. Because digital octave pulses are devoid of the inherent issues attributed to direct analog to digital sampling, most of the initial derived noise is eliminated. Typically, it is the condition of the original analog signal that sets the resultant precedent for the quality of the post-sampled digital signal. Therefore, the octave pulse generator (OPG) must produce the original signature source for octave pulse complex waves with the highest resolution possible. With reference to FIG. 11, this PCM circuit, 277, is comprised of a PCM analog to digital conversion process, 382*a*, that embodies a conventional analog signal, 352*a*, conversion starting the a low-pass filter, 353*a*. Next the signal. 354, is sent to the conversion sampler, 355 next 356 a quantizer, 357, and to, 358*a*, a channel encoder, 359*a*. The PCM circuit extends the signal physically and algorithmically into PSTN transmission path channel space, 112. Within the network element constructs there are regenerative repeaters 361*a-c*. At every interval these regenerators amplify and balance multiple T1/E1 circuits, 381*a-d*. Once an OPD message stream, for example, is regenerated, 378, and the PCM circuit, 360, is decoded by the decoder, 359*b*, via the PCM receiver digital to analog DAC, 382*b*, process for digital signal out. For conventional out signals such as delivery to telephony conversations to customer premise equipment (CPE) via the low pass reconstruction filter, 353*b*. FIG. 11 also shows that an octave pulse engine (OPE), 90*a* and 90*b*, and Octave Pulse Storage (OPS), 371*a* and 371*b*, may be adapted directly to the PCM circuit inbound conversion process and the PCM circuit outbound process, respectively. These PCM based octave pulse processes and procedures function in accord with the detailed description embodied with respect to the body of this disclosure.

Random noise generates a "white", hissing sound and thus produces its own unwanted harmonic. Octave pulse signatures are harmonically formatted to cancel the negative effects of noise, while maintaining a high level of signature discrimination "above" the noise. Conversely, if the originating amplitude level at point of input is not sufficiently large, the signal to noise ratio S/N will deteriorate as well and octave pulse resolving levels will "sink" into the noise. When this happens, sufficient pulse discrimination will be more difficult on the terminating end. If the input level is reduced further to a relatively small value, with respect to the optimum octave pulse-transmission value, all potential errors will be emphasized. This particular noise effect is called granular noise. Granular noise can be randomized in order to diminish noise levels. Additionally, this process involves increasing the number of quantization levels, and consequently increasing the PCM channelization bit rate and overall data throughput rate.

The fourth type of quantizing noise that may occur at the output of a PCM system is "hunting" noise. This type of noise is generated when the input analog waveform is nearly constant; including where there is no signal. For the no signal case, the hunting noise is also called "idle channel" noise.

The pitches produced by the frequencies in the harmonic series form intervals with the fundamental that are said to be "natural" or harmonically pure, except for the octaves thus produced, whose frequencies are related to the fundamental or "primary articulated waveform" by powers of 2. What is important in terms of octave pulse signature generation is that the waveform must represent a "steady" harmonic. In a musical context an ideal "steady" tone might be produced on some perfect string free of the effects of stiffness and friction or on a continuously played wind instrument. In practice, however, musical sounds have beginnings and endings of distinctive characters, in much the same way a waveform generating data bits "stops and starts" in a selected digital channel space. The physical characteristics of instruments and the medium in which they operate make it impossible for the vibrations that characterizes the steady tone to begin or end instantaneously. A digitally generated octave pulse signature that is derived from digital samples of selected harmonic waves is entirely predictable. Octave pulses are originally generated from pure digital sampled sources, are structured for specialized uses, and do not suffer from the absence of generated tone control predictability. Each octave pulse is originally produced from high-resolution 48 kHz sampling sources and then compressed in accord with the 8 kHz sampling rate that is specific to digital cellular speech codec parameters, OP-CODEC parameters and telephony based PCM speech sampling coders.

Plucked or struck instruments, such as the piano, in fact produce no steady harmonic waveform at all. From the moment they are first produced, the sounds made by these instruments begin to dissipate or decrease in amplitude. This decrease in amplitude is called "decay" of a sound and can be represented by a "decaying acoustic waveform", 316, as illustrated in FIG. 16, where the amplitude of the wave, 245*a*, decreases with each cycle, 246. The rate and character of decay is then illustrated by the curve, 247, connecting the peaks of successive cycles from the beginning of the wave, 245*a*, to the end of wave duration, 245*b*. Depicted in FIG. 17 is an acoustic waveform, 317, that is an "envelope of sound", 253. This envelope, 253, has full temporal duration, 252. Yet for octave pulse purposes only a 5 ms portion, 250, at maximum, is used for octave sampling during the initial generation process and procedure. During a 5 ms-octave pulse transmission event, a consistent duration of complex harmonics must be maintained in order to realize a high level of pulse signature resolution and recognition differentiation. A curve can be drawn to illustrate the build up or attack, 249, of a sound from the point at which the system is first put in motion to the point at which the steady harmonic is reached. Applied together, the attack and decay, 251, characteristics of a given harmonic are called its "envelope", 267, as shown in FIG. 19. The envelop shape, 268, reflects a calculated approach to pulse generation. The shape is greatly determined by the pattern of attack, 398 and decay 399, of a specific octave pulse signature-waveform, 259. The speed of attack and decay has to be carefully considered with respect to pulse signal "on", 400 and "off", 401, time domain increments, for this action determines how preceding and following octave pulses are read and resolved at each end of the OPD-VTDN. An entire octave pulse message stream must be balanced in order to achieve the best resolution. In order to produce a recognizable message comprised of octave pulses, sharply defined intervals that occur between successive octave pulse bit streams must be generated. Otherwise the harmonics produced by each octave pulse will sink into any channel noise that may exist. See FIG. 17. Therefore "crisp" octave pulse constructs depend on a minimum of attack, 249, and decay, 251, dynamics, along with intervals that do not "blur" each octave pulse signature as they travel within the constructs of a selected octave pulse bit stream.

Figure 21:
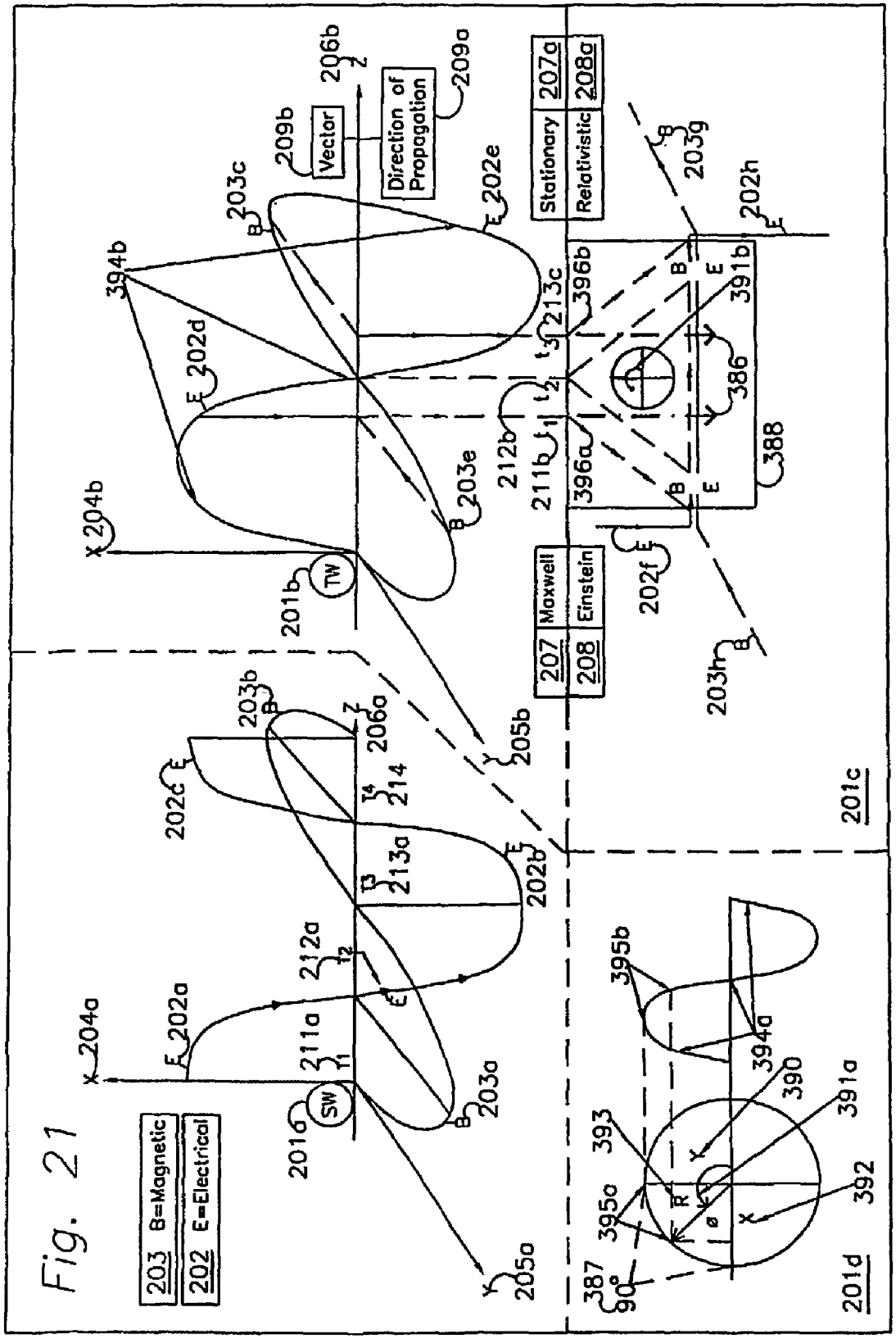
FIG. 21, is a graphic representation of the VTDN WAP architecture using MSMS messaging, according to the invention.

Depicted in FIG. 21 is a schematic example of a "standing wave", 201*a*, and a "traveling wave", 201*b*, comprised of singular atomic photonic structures. These fundamental structures comprise all matter and energy, including "plucked" and generated acoustic waves, and generated octave pulse complex waveforms. The "stuff" of waveforms, i.e., the charged photon, is the source for electromagnetic phenomenon. A photon is a fundamental particle which has a rest mass of 0, and that is regarded as the quantum of radiant energy. The "standing wave", 201*a*, and the "traveling wave", 201*b*, are essentially two "fundamental states" of the photon. Photons comprise the structures of all coherent energy that produce modulation methods, i.e., analog, pulse and digital, which are derived from these fundamental key elements. Interestingly, each photon has "spin". Photon spin is known as polarization. All radio waves travel through time and space in some form of a three-dimensional polarized pattern, as do acoustic harmonic waves in three-dimensional constructs; i.e. X, Y, and Z, with respect to the new theorem called Applied Vortice Physics (AVP). AVP encompasses a new range of implementation strategies that enable holographic manipulation of various system constructs without causing radical change with respect to conventional communication system protocols and other algorithmic procedures. If one understands the dynamic characteristics of the "standing wave" and the "traveling wave" then the task of grasping ideas such as amplitude, digital waveform generation, and harmonic resonance with respect to viewing this phenomenon from a holographic perspective becomes much easier. In a fundamental sense, octave pulse signatures are comprised of specially arranged constructs that mimic conventionally generated digital speech frame waveforms. Each conventional subframe is essentially "harmonically bit-stuffed" using the invention's novel harmonic signatures. The invention furthermore manipulates conventional codec filter coefficients, in order to cause an "unchoking" of existing codec filter configurations, in order to enable an increased level of octave pulse signature flexibility. However the invention manipulates these conventional codec filter coefficients without disrupting conventional host network base sites (BS), base transceiver stations (BTS), or base site node (BSN) speech coders and decoders.

Referring to FIG. 21, Maxwell's equations describe electric fields, 202, and magnetic fields, 203. A changing electrical field "E" is comprised of, 202*a-c*, representative of energy existing in different states in time perceived as a whole. This electrical phenomenon produces a magnetic field comprised of "B", 203*a&b*, existing in different states in time, also perceived as whole. This is the symmetrical counterpart of Faraday's Law, i.e., a changing magnetic field produces an electric field. Thus, electrical fields and magnetic fields are mutually dependent and inseparable, each owing its existence to the time-rate of change of the other. Thus a photon exists as result of the perpetual cyclical interplay of "electromagnetic" fields operating at different states in perceived time. Each electrical field "E", 202*a-c*, and magnetic field "B", 203*a&b*, produces an amplitude, which at any instant is proportional to the time-rate of change of the other. In this example amplitude level is indicated by the behavior at peak "B", 203*a*, "B", 203*b*, and "E", 202*b*, of each wave.

The standing wave, 201*a*, at "Z" axis, 206*a*, existing at perceived time increment T1 point, 211*a*, indicates that the electric field, 202*a*, is stationary at top dead center (TDC). In this example the term "stationary" means there is zero rate of change. At point T1, 211*a*, the magnetic field "B", 203*a*, produces no amplitude. Conversely, at time increment "T2", 212*a*, the electric field "E", 202*a*, passes at its maximum rate of change, from the negative or "static" state quadrant to the positive quadrant of the wave, that is from T1, 211*a*, to T2, 212*a*, accordingly. This atomic progression produces a maximum amplitude in the magnetic field "B", 203*a*, point T2, 212*a*. In yet another paradox, at time increment "T3", 213*a*, magnetic field "B", 203*b*, is at a maximum rate of change, producing a maximum amplitude for electric field "E", 202*b*. At time increment "T4", 214, the magnetic field "B", 203*b*, reaches top dead center, thus producing zero rate of change, and electric field "E", 202*c*, has zero amplitude. This traveling wave, 201*b*, schematic depicts a single cycle of a traveling wave of electromagnetic energy. An energy field is made up of a large number of photons. An energy field arises because two polarizing elements attract and simultaneously oppose each other at the same moment in time, thusly producing a construct that comprises an energy field or a single photon. There are two seemingly paradoxical aspects of about the traveling wave, 201*b* that reflect upon how octave pulse complex waveforms behave in digital traffic channel and PCM circuit channel space. For example, electrical fields "E", 202*d&e*, and magnetic fields "B", 203*c&e*, are in phase. From the perspective of Maxwell's equations, they should be ninety degrees out of phase in order to be mutually dependent and insepa-rable as is the case with the "standing wave", 201*a*. Referring back to the "traveling wave" construct, 201*b*, the harmonic effect of charged movement, thus produces a traveling wave that from the act of observation changes a Maxwell constant, 207*a*, into an Einstein relativistic construct, 208*a*. Thus, applying relativity leads to understanding a vector model that reflects a "cyclical harmonic structure". In 201*c* we can deduce the photon's structure from within its own relativistic frame of reference. Interestingly, energy cannot disappear without being replaced with matter. Thus, irradiated and modulated energy cannot disappear without being replaced by cosmic noise or other forms of channel noise, heretofore disclosed, that arise in selected channel space under different conditions.

The photon's deduced harmonic structure explains the apparent attraction and repulsion paradoxes that exist within the constructs of the traveling wave, 201*b*. First, the time coincidence, at time increment "T1", 211*b*, results from the coupling of conjugate electrical field "E", 202*d*, and magnetic field "B", 203*e*, with magnetic field "B", 203*c*, and electrical field "E", 202*e*, as resonance's in the photon's structure. When "viewed", this effect produces a fundamental paradox in how we view the nature of energy and matter. Thus the postulate of this fundamental paradox in all of nature including human consciousness is also the basic model construct of all waveforms, and points directly to how energy and matter interrelate in selected radio, optical and metallic channel space. In support of Einstein's relativistic view, lateral events are not affected by relativity, thus we see from the actual electrical "E", 202*d*, and magnetic "B", 203*c*, fields, a fundamental paradox in terms of time coincidence at "T1", 211*b*, in terms of the constructs of 201*b*. The second paradox, electrical fields "E", 202*d&e*, with magnetic fields "B", 203*e&c*, both simultaneously disappearing from our stationary frame of reference, at time increment "T2", 212*b*, is the result of some key equations. One equation is called the "Lorenz Fitzgerald contraction". This contraction occurs when photons travel at an extreme relativistic velocity, such as the speed of light. It is similar to the way the "Doppler effect" causes one to perceive different sounds emanating from objects moving towards us or away from us at various speeds. At time increment "T3", 213*c*, the lateral electrical field "E", 202*e*, from one conjugate, and the magnetic field "B", 203*c*, from another conjugate resonance wave emerges, once again, into our stationary frame of reference. The photon's deduced structure explains the apparent paradoxes in terms of the traveling wave, 201*b* constructs. Thus the "photon energy model", 201*c*, suggested here takes on the characteristics of a dynamic vector producing measurable torque, also known as a "magnetic moment".

This vector model therefore is an effect of the cyclical conjugations of the traveling wave. A particular resonance quality is detectable at a singular atomic level as expressed here. A magnetic moment occurs cyclically within complex waveform constructs that generate the invention's octave pulse. Both the traveling wave and its cousin the octave pulse creates a communicative act based on a "periodic symbolic constant". The period symbolic constant is a paradoxical construct that expresses the idea that a pulse traveling in time through a selected channel space is accompanied by other pulses thus creating an octave pulse stream. Thus the argument that the codified, formatted, and shaped construct of a specialized octave pulse signature waveform is completely novel with respect to its application is based on manipulation of photonic structures. In fact an octave pulse signatures form and function is as a result of unique manipulation of fundamental physical laws, right down to the atomic level.

An octave pulse does not exist alone. An octave pulse only has resonate value based on octave pulses leading and octave pulses following a specific octave pulse being measured in a selected message stream. When observing waveforms emanating from the screen of an oscilloscope, each pulse disappears and reappears after an interval of time passes in between. John Henry Poynting, a physicist, was the first to point out the vector properties of the rate of energy transport. Energy transport vectors are proportional to the cross product of electric field "E", 202e, and magnetic field "B", 203c. Stated in another way, the Poynting vector represents the flux of energy density per unit of time, as it travels through a selected space occupied by a space, as observed in a specified time increment. The unit of measure of the Poynting vector is its radiance, i.e., its' measured output of a simple harmonic wave. The "photon energy model", 201c, thus takes on the characteristics of a "dynamic, cyclic Poynting vector", 388. Understanding dynamic vector constructs is essential to inherent understanding of how octave pulses behave in any electro-magnetically charged channel space medium.

It is important to understand that this traveling wave, 201b, is a three-dimensional construct, which exists in three-dimensional space. Note, that the wave travels within the "X", 204b, "Y", 205b, and "Z", 206b axis. The standing wave, 201a, also is based on "X", 204a, "Y", 205a, and "Z", 206a, axis, and occupies three-dimensional space. However it does not produce a dynamic vector. The traveling wave is a holographic three-dimensional wave possessing a direction of propagation, 209a. It is the force of direction through time and space that creates the dynamic photon vector model, 388. This oscillating vector is actually stationary twice each cycle as the lateral electrical "E", 202e, and magnetic "B", 203c, vectors both reach top dead center and are at maximum amplitude. This stationary interval occurs between equally separated lobes of energy. Motion is achieved within a conducting medium in part because of the generated energy produced by the medium itself, i.e., the electromagnetic radio medium of modulated and projected air interface channel space, in part by the electromagnetic medium of metallic channel space, and also in part by due to optical circuit channel space. The dependence upon the velocity of a wave with relation to the frequency of the wave is known as dispersion. The phenomena of dispersion relates to a construct of propagation with respect to charged photons and their behavior in any selected natural or constructed environment, such as electromagnetically charged channel space.

Complex waves traveling within the waveform signaling constructs of a selected channel space, i.e., traveling in a direction away from its point of origination to its point of termination, collection and storage, are dependent on a selected frequency. Without such dispersive mediums, photonic motion is achieved by the single photon extending itself from one stationary point, to another "time-space increment", inchworm style. In terms of a metallic, optic, or radio medium, a photon's velocity is guided by the "electromagnetic pull and push" of other waves traveling in front and behind, respectively. In a sense a selected wave is therefore guided by its purpose to perform work within the constructs of a communicative act. This pushing and pulling effect is a fundamental feature that relates to Heisenberg's "strange attracters", in terms of atoms attracting and repelling one another simultaneously. The atomic interplay of the electrical "E", 202e, and magnetic "B", 203c, fields illustrate the same effect. As previously disclosed, both "sides" of the wave cyclically interact, by virtue of the act of simultaneously attracting and repelling one another.

Any form of harmonic wave from the particle level of the traveling wave, 201b, to an octave pulse signatures complex harmonic wave can be broken down into a combination of simpler waves which are sinusoidal in very much the same way. As depicted in FIG. 13, a complex harmonic wave, 313, is comprised of three waves, 241, 242, and 243, expressed in musical terms of fundamental, first harmonic, and second harmonic, all of which irradiate an equal amplitude, 240. Sine and Cosine are used as representative measurements of simple harmonic waves, each vibrating in a different phase. In FIG. 21 a schematic of a "wave", 201d expressed as a "sinusoidal projection", 395a, from a complex plane, 394a and 394b, expressed as an equal area representation, 395a, of the sine curve, 395b. The orthogonal vectors of "X", 392, and "Y", 390, projections from a rotating phasor "R", 393, in the complex plane where "Y", is the sine and "X", is the cosine function of the projection. The phasor "R", rotates counter clockwise, 391. In this model the "X" and "Y" functions are equal within the construct of an ideal waveform. The concept of "cosine" is expressed as a measure of the magnitude of an angle shown here as the constant ratio of the side adjacent to the angle and the hypotenuse in a right angled triangle. The concept of "sine" is expressed as a measure of the magnitude of an angle further expressed as the constant ratio of the side opposite the angle in a right-angled triangle and to the hypotenuse. In 201c a vector model, 388, is expressed in terms of cosine and sine interrelationships of generated energies, 386, that fluctuate between electric energies, 396a, and magnetic energies, 396b. These electromagnetic forces are the animating principle within all waveforms, expressed here in the traveling wave as "intervals" between time increment "T1", 211b, "T2", 212b, and "T3", 213c, in a cyclical pattern.

This fluctuating electromagnetic energy example suggests the creation of a rotating vector, 391b, with magnitude, and torque of direction, 391b. Expressed in yet another way, this wave is a quantum force vector, 209b, with a direction of propagation, 209a. Time increment "T2", 212b, is produced as each polarity changes from magnetic to electric, and/or from being positively charged to negatively charged between 396a and 396b. These energies, 386, fluctuate equally, thus creating a magnetic field expressed electrically as "E", 202f, 202h, and magnetically as "B", 203g and 203h. Octave pulse constructs are based upon the fundamental dynamics of traveling waves and the vectors they produce. Referring to FIG. 10, the Nyquist Effect schematic, 271, is yet another expression of a sine wave fluctuating with reference to the sampling process. The invention manipulates this seminal sampling algorithm at the encoding point of the speech-coding interval. The invention also manipulates the digitized speech sample-subframe-signatures at the decoding point of the speech-decoding interval. This unique process creates a new algorithmic procedure that causes the generation and simultaneous insertion and retrieval of digitized sampled information in the form of an octave pulse resonant signature, directly into and from a selected channel frame and subframe.

The aforementioned generation and simultaneous insertion and retrieval procedure is provided without causing disruption to, or circumvention of, conventional sampling procedures endemic to speech codec algorithms used in digital traffic channel speech frames, subframes and PCM circuit speech frames and subframes. The invention provides a completely novel means and method for providing separate octave pulse based high-speed digital data services, and separate digital voice services from the same VTT, as a stand-alone unit, when configured as an intelligent sleeve. As disclosed, both voice and data service protocols are designed for integration with, and transported through selected digital speech channel frames and subframes separately or simultaneously.

Figure 5:
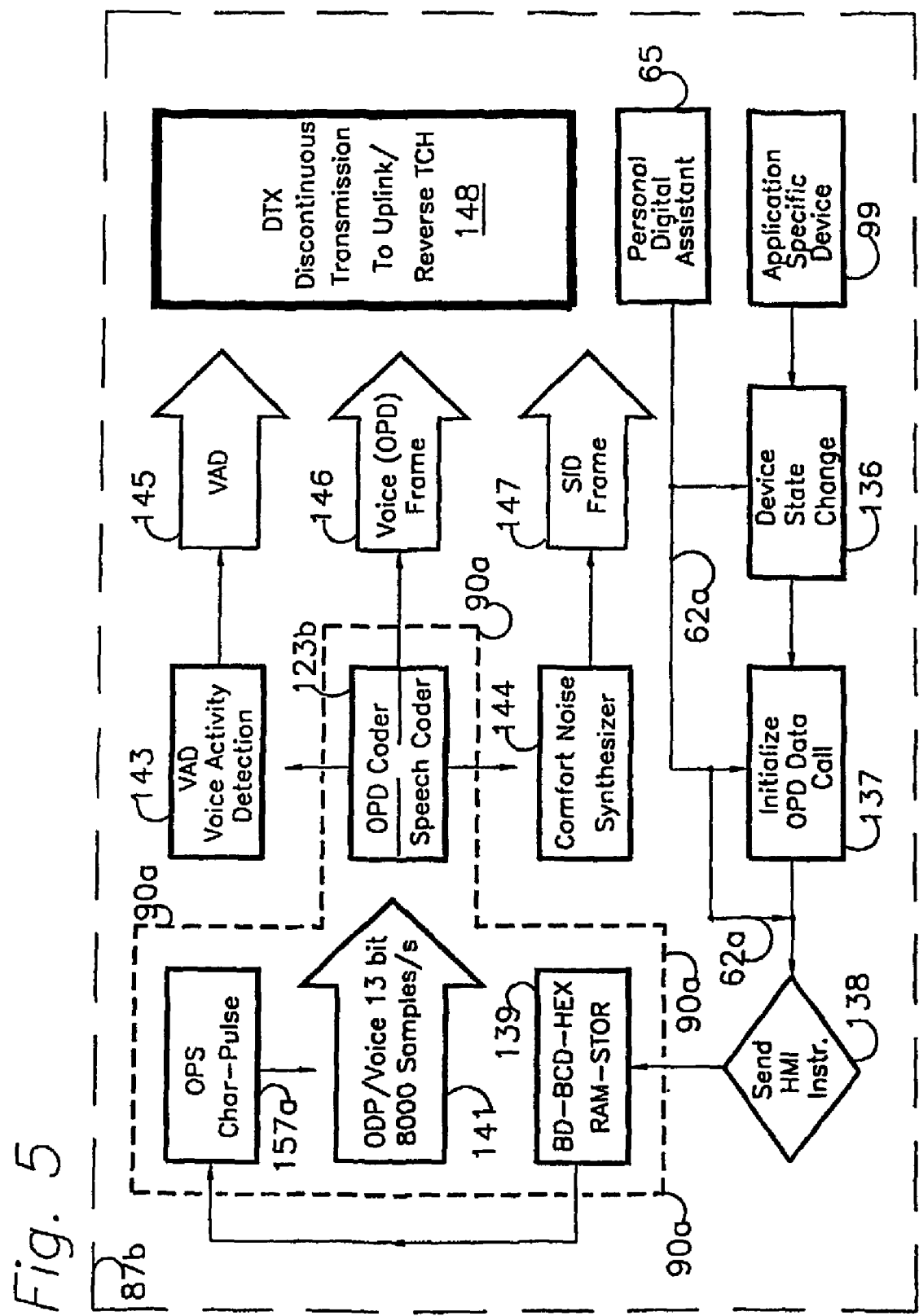
FIG. 5, is a logical block diagram depicting the VTT OPD encoder, according to the invention.

The invention provides another important feature, simultaneous voice and data services, voice and data dispatch, speech to text and text to speech protocols and procedures that can transpire during one combined octave pulse data communications event that occurs within a selected digital cellular or digital satellite public network. The data coming from the speech codecs are channel coded before they are forwarded to the modulator in the transmitter. The channel coder adds some redundancy back into the data bitstream, but does so in a very careful and orderly way so that receiver on the other end of a noisy transmission path can correct bit errors caused by the channel. The receiver needs the extra bits the channel coder ads in order to perform this important management function. Speech channel coding almost doubles the data rate to 22 Kbps. OPD provides algorithmic modalities that enable expanded narrow band and wideband, air interface channel throughput rates, while utilizing OPD protocol, data word transfer, and octave pulse engine (OPE) coding constructs. Octave pulses are generated at the CODEC output level, and inserted within the constructs of channel coding that occurs before the selected modulation processes that transpire in the transmitter. Depicted in FIG. 5 is a schematic of the virtual transaction terminal (VTT) with its integrated octave pulse engine (OPE), 90a, as data encoder with a transmitter, 87b. The VTT/transmitter configuration is comprised of conventional CODEC and other voice processing and channel management modules VAD, 143, and the SID frame insertion module, 147 that perform standard operating procedures for conventional digital speech transmission. Therefore, this component architecture provides a synthesis of conventional voice, simultaneous voice and octave pulse data, and octave pulse data algorithmic procedures. In one operation, the invention suspends standard CODEC processes when an OPD communications event is created. Also included with the conventional bus-logic modules is an interface for a personal digital assistant (PDA), 65, and another application specific device, 99, that comprise telemetry-specific message management constructs or web-clipping, e-mail management constructs and the like. When an application specific device, 99, for example a power meter, changes its "state of condition", 136, an OPD call, 137, is initialized. When a user enters instructions with a PDA, 65, stylus, 404, as shown in FIG. 23, and "taps" the send icon, 465b, he is directly causing a device state change, 136, which initializes an OPD call, 137 via data instruction sets, 62a, that can take the form of MIDI instruction files, 214a, as shown in FIG. 4. Once the instruction sets are sent from the presentation layer of the device, these "human machine instruction sets", 138a, are sent and compiled within the random access memory storage, 139, of the OP-CDODEC, as shown in FIG. 5.

There is much in terms of understanding how conventional source coding, and speech processing occurs in the transmitter side of the radio terminal, coupled with how the invention's protocols, processes and procedures provide this revolutionary integration of octave pulse signatures without causing disruption to host network processes and procedures. Today, simple and direct conversion of analog-to-digital converters (ADC), and digital-to-analog converters (DAC) are available at low cost, and their implementation, within normal technical ranges and applications, is a skill that no longer intimidates most designers and engineers. Also the task of modifying ADC and DAC processes for the generation and simultaneous insertion of octave pulse signature constructs into speech frames and subframes is not overly complicated. Conversely retrieving octave pulses from speech frames and subframes is enabled with a rather a straightforward protocol as well. The invention combines octave pulse generation and insertion, with speech pulse sampling and insertion with respect to utilizing an elegant interleaving methodology in order to provide an efficient simultaneous voice and data (SVD) geometric pattern. Each octave pulse 5 ms subframe is joined in series with a conventional speech 5 ms subframe. Therefore, an SVD 20 ms frame is comprised of two octave pulse subframes, and two speech subframes. Octave SVD does slow the octave pulse data rate, and speech quality also diminishes somewhat. However, the benefits derived from providing true SVD in one transmission path data event for out weigh the detriments. Octave pulse SVD is especially useful when considering various mobile telemetry applications such as providing 911 services, and other services that involve simultaneous voice and data over the Internet worldwide-web for example. Of paramount importance is understanding the functions of specialized coding, and protocols involved in octave pulse signature generation, insertion, and extraction procedures.

Figure 6:
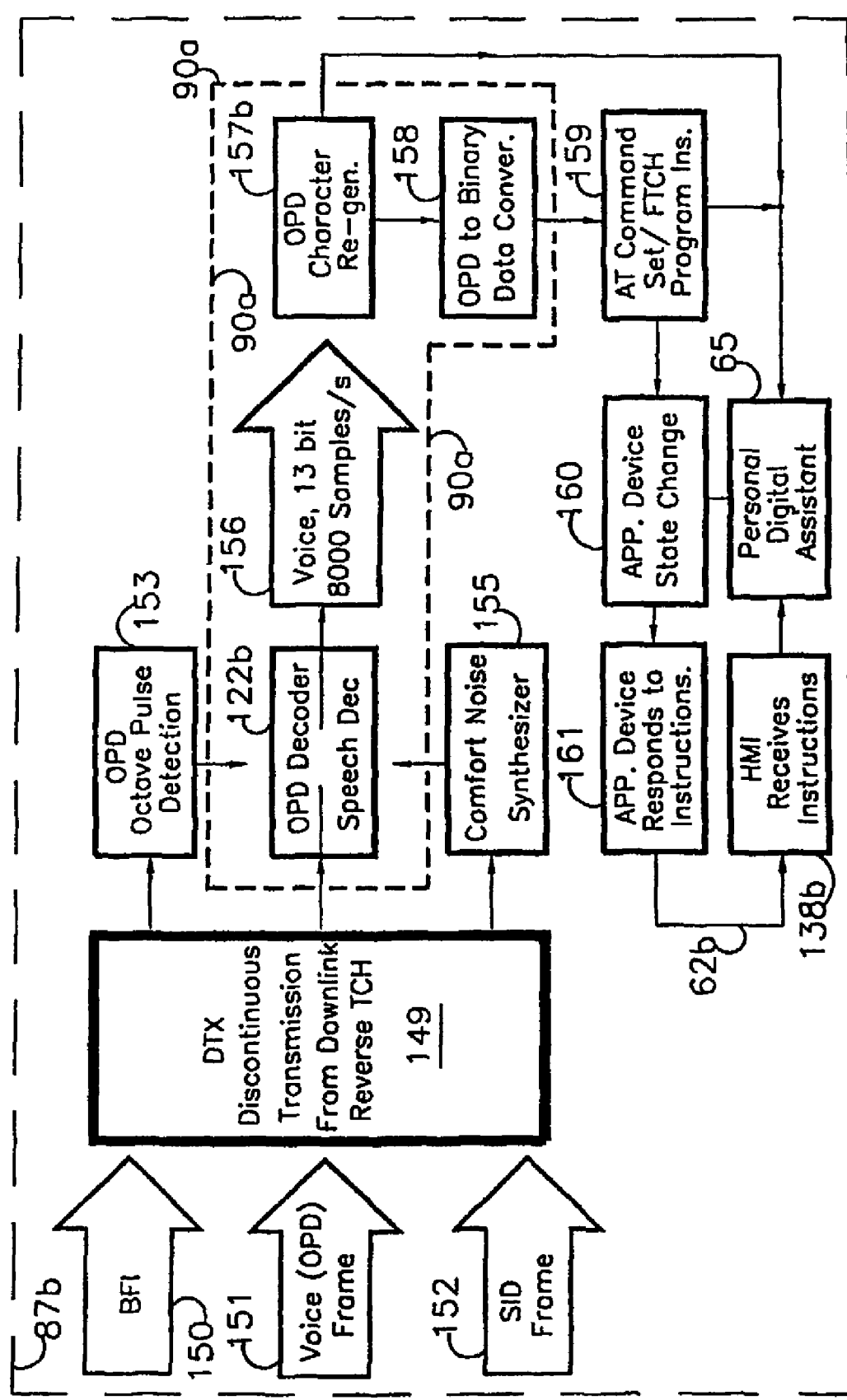
FIG. 6, is a logical block diagram depicting the VTT OPD decoder, according to the invention.

Referring to FIGS. 4, 5, and 6, at the transmitter, 87a, and receiver, 87b, level, octave pulse insertion and extraction procedures occur within the algorithmic protocols that are endemic to conventional codecs, without disrupting the intended processes and procedures therein. In a "conventional" codec context, source coding is a process that is used to reduce redundancy in the speech signal, which results in signal compression. This specific type of reduction causes a significantly lower bit rate generation, while still reproducing an acceptable digitized "copy" of the original speech signal. The "speech" coder, 123a and b, and decoder, 122a and b, are the central part of the speech processing function, in both the transmitter and receiver module the VTT. The invention modifies the speech coder, 123a and b, and decoder, 122a and b, in order to provide a "dual mode" voice and data subsystem protocol. In some digital cellular radio environments the standard CODEC is replaced with an octave pulse data hybrid application specific OP-CODEC.

The dual mode OP-CODEC protocol provides conventional speech processing, and octave pulse coding for insertion into, an extraction from, selected digital speech frames and subframes that are generated by digital cellular, satellite air interface channels, and PCM E1/T1 circuits, respectively. Conventional PCM systems reproduce the original quantized analog sample value by generating binary code words. In terms of octave pulse signature constructs, these binary code words are octave pulse signatures. Octave pulse signatures are inserted ahead of the analog, but before the digital conversion at the codec. The OP-CODEC operates like a conventional codec so when necessary, its algorithms may produce conventional speech frames and subframes. By simply bypassing the analog sampling part of the algorithm, and generating/inserting octave pulse signatures at the exact point of digitally sample insertion, an incredibly high-resolution octave pulse value can be realized that makes the most out of conventional resolution values of individual speech frames and subframes. This transparent procedure simply adds a high-speed data capability, while eliminating any need for conventional data modems to be integrated into VTT constructs.

There are numerous codec subsystems and associated processes known in the art today. Each is designed with its own creative algorithmic procedures and resultant data bit rates. Each one of these disclosed codec subsystems may be utilized in parallel with the invention's OP-CODEC, which is really a set of algorithms that incorporate octave pulse engine (OPE)

and octave pulse storage system (OPS) algorithms, coupled with standard codec constructs, in order to maintain integrity with host network channel coding and modulation standards. The OP-CODEC is a virtual overlay with respect to integrating seamlessly with standard codec algorithmic constructs. Therefore the invention provides virtual OP-CODEC means and methods for modifying codec algorithms that involve encoding and decoding air interface speech channels and PCM channels, so that conventional speech processes are not adversely effected, nor are conventional channel coding and modulation schemes adversely affected. The OP-CODEC operates transparently with respect to octave pulse signature generation and simultaneous insertion into 5 ms subframes. In all actuality when 5 ms subframes are generated, octave pulses are simultaneously generated. In fact, the octave pulse signature becomes the subframe in tandem with subframe/sub-block channel coding for error correction purposes and the like, before being sent to the transmitter modulator.

Conventional codec subsystems include, but are not limited to, Subband-Codec-Adaptive Delta PCM (SBC-AD-PCM) which produces a 15 Kbps rate, Subband-Codec-adaptive PCM (SBC-APCM) which produces a 16 Kbps rate, Multi-Pulse Excited LPC-Codec-Long Term prediction (MPE-LTP) which produces a 16 Kbps rate, Regular-Pulse Excited LPC-Codec (RPE-LPC) which produces a 13 Kbps rate, Regular-Pulse Excited LPC-Codec-Long Term Prediction (RPE-LTP) which produces a 13 Kbps rate, and Adaptive Delta Modulation-Pulse Code Modulation (ADM-PCM) which produces a 32 Kbps rate. The functions of most of speech coders and decoders are usually combined in one "algorithmic building block", called the "COder/DECoder" (codec). As disclosed a central aim of the invention is to virtually modify key "algorithmic building blocks" in order to include an "alternative" octave pulse insertion/generation step, with respect to the coding and decoding process. This critical moment occurs when conventional digitized voice subframes are generated and inserted in the voice frame, following the sampling process that involves A/D conversion. In fact, the invention provides a means and method of eliminating the speech encoder and decoder all together in order to provide octave pulse data only services. The invention may replace these components or adds the OP-CODEC with specialized octave pulse engines (OSE), 90*a*, and Octave Pulse Storage (OPS), 371*a*, subsystem modules with respect to certain application specific implementations as shown in FIG. 4. This configuration is perfect for data only telemetry, personal digital assistant (PDA) web-clipping applications and the like where voice service is not required. However, with many application specific configurations it is desirous to maintain optional voice services. In FIG. 6, the ODP signature-character regeneration module, 157, also performs a dual mode function. If conventional speech processing is involved, this module, 157, simply routes speech information to components that regenerate and amplify voice signals for conventional speech related codec processing.

Referring to FIGS. 4, 5, and 6, as previously disclosed, speech coding of the analog speech signal at the transmitter is sampled at a rate of 8000 samples with a 13 Kbps resolution rate, 141, in accord with the Sampling Theorem and the "Nyquist Effect". The samples are also quantized, 328, at the same resolution rate, 329, as shown in FIG. 10. Referring to FIGS. 4, 5, and 6, this 13 Kbps rate corresponds to an over all bit rate of 104 Kbps for the digital traffic channel speech-frame signal. At the input to the speech codec, a speech frame, 146, containing 160 samples, which encompasses four subframes, each containing 40 samples of 13 bits, arrives every 20 ms. The conventional speech codec compresses this speech signal into a source-coded speech signal of 260 bit blocks at a bit-rate of 13 Kbps. Thus this GSM speech coder with a virtual OP-CODEC modification, 123*a* and *b*, achieves a standard compression ratio of 8 to 1. A further component of conventional speech processing at the transmitter is the recognition of speech pauses by a module that performs voice activity detection (VAD), 143, and which sends its compensation bits, 145. All digital cellular standards manage conventional speech information in essentially the same manner, whether its GSM, IS-95-CDMA, IS-136-TDMA-EDGE, CDMA 2000, IMT-2000, G3-W-CDMA, or UMTS. For example, the voice activity detector (VAD) algorithmically determines, based on a set of parameters delivered by the speech coder, whether the current 20 ms speech frame contains speech or speech pauses. In FIG. 5, This decision is used to turn off the transmitter amplifier during speech pauses, under control of the discontinuous transmission mode (DTX) module, 148.

The discontinuous transmission mode (DTX), 148, takes advantage of the fact that during a conventional voice conversation, both participants rarely speak at the same time, and thus each directional transmission path has to transport speech data only half the time. In DTX mode, the transmitter is only activated when the current frame carries speech information. This decision is based on the VAD signal of speech pause recognition. In one respect, the DTX mode can reduce the power consumption and hence prolong the battery life, in still another aspect, the reduction of transmitted energy also reduces the level of interference and thus improves the spectral efficiency of the GSM system, for example. The missing speech frames are replaced at the receiver by a synthetic background-noise signal generator called the comfort noise synthesizer (CNS), 144. The algorithmic parameters for the comfort noise synthesizer are transmitted in a special silence descriptor frame (SID), 147. The SID is generated at the transmitter from continuous measurements of the conventional acoustic background noise level. It represents a speech frame that is transmitted at the end of a 20 ms speech frame burst, i.e., at the beginning of a speech pause. In this respect, the receiver recognizes the end of a speech burst and can activate the comfort noise synthesizer with the parameters received in the SID frame.

The generation of this artificial back ground noise prevents the problem that may occur while in active DTX mode when the audible background noise transmitted with normal speech bursts suddenly drops to a minimal level at a speech pause. This process is similar when a user chooses automatic gain control (AGC) when recording music or speech with respect to a conventional tape recorder and its processes. This modulation of the background noise would have a very disturbing effect on the human listener and may significantly deteriorate the subjective speech quality. Insertion of comfort noise is an effective countermeasure to compensate for this noise contrast effect. However, during an octave pulse data event comfort noise synthesizer algorithms are suspended.

Referring to FIGS. 5, 6, and 23, As previously disclosed, VAD module, 143, or VAD algorithms, 145, and discontinuous transmission (DTX), 148, are not used during an octave pulse data event, in terms of the conventional means. First of all octave pulse data (OPD) transmission events have an average event duration of 7 to 15 seconds from origination to termination with the exception of extended session based wireless internet access. Statistically most voice calls average about three minutes worldwide. When an octave pulse message stream of data is transmitted from a VTT, 120*a*, in the form of an intelligent sleeve, which enables novel PDA applications, to the virtual host system (VHS), about two to six kilobytes of data payload will typically be transferred before either the VTT, 120, or the VHS terminates the instant OPD event.

During the air interface-digital traffic channel portion of an OPD payload transfer, the aggregate average of measured amplitude levels with respect to each single pulse, combined with multiple pulses that comprise a octave pulse message stream, remains at a consistent level. Therefore no (DTX) managed speech pauses 148, 149, need to be compensated for. Additionally, the VTT that is operating a data only OPD event does not sample analog voice information. The octave pulse engine (OPE), 90*a*, as part of the virtual OP-CODEC, as shown FIGS. 5, 6 and 7, does not process any speech information in data only mode. Octave pulse signatures are directly retrieved from the octave pulse signature (OPS) storage database, 371*a*, and are directly generated/inserted into the speech frame and subframe accordingly. The comfort noise synthesizer (CNS), 144, 155, and silence descriptor (SID) frame, 147, 152, are also muted for any octave pulse (OP) data only event transmission during both transmission and reception. With an OPD transmission there is no need to initiate speech pause algorithms during an OPD only event. Also there is no need to generate artificial background noise initiated by the comfort noise synthesizer (CNS) 144, 155, simply because ambient background noise modulation management and SID frame insertion is not necessary for OPD short burst data only transmissions. However these conventional components and algorithms are needed during a PDA initiated digital voice call, and during an octave pulse simultaneous voice and data (SVD) event.

The invention does use DTX algorithms in a unique way. For example when a VTT has completed an OPD message transfer to the virtual host system (VHS), and expects a response message to be transmitted from the VHS over the forward digital traffic channel, it turns off the transmitter and awaits the incoming octave pulse message stream. Conversely the currently serving base transceiver station (BTS) turns off its forward digital traffic channel when it no longer detects voice-octave pulse data as it is transmitted to a selected VTT. Another conventional type of speech frame loss can occur, when bit errors, caused by a noisy transmission channel, cannot be corrected by the channel coding protection mechanism, and the block is received at the codec as a speech frame in error, which must be discarded. The channel decoder, using bad frame indication (BFI) algorithms, 150, as shown in FIG. 6, flags bad speech frames. In this case, the respective speech frame is discarded and the lost frame is replaced by a speech frame-which is predictively calculated from the preceding frame.

This technique is called "error concealment". Simple insertion of comfort noise is not allowed. If 16 consecutive 20 ms speech frames are lost, the receiver is muted to acoustically signal the temporary failure of the channel. 16 speech frames equates to 16 OP data words. Each OP data word contains four octave pulse signatures, or two, three octave pulse signatures, and two regular speech subframes, arranged in an interleaved pattern in order to provide simultaneous OP voice and data (SVD) services. An OPD "pulse" stream cannot withstand any sustained speech frame losses. As previously stipulated, OPD messages are relatively short bursts of digital data information formatted in 2 kilobyte concatenated and 4 kilobyte concatenated Full ASCII text and numeric messaging constructs. Therefore the possibility of receiving or transmitting bad frames is minimized. However because of the nature of radio signals, frame or octave pulse signature word faults will occur. When there is an virtual OP-CODEC (OPE), 90*a*, engine reception of "unreadable" octave pulse signature 20 ms burst-word-frames from a selected forward digital traffic channel, (FDTC) the OP-CODEC octave pulse engine (OPE), 90*a*, responds with a simple automatic repeat request (ARQ) algorithmic procedure.

Figure 22:
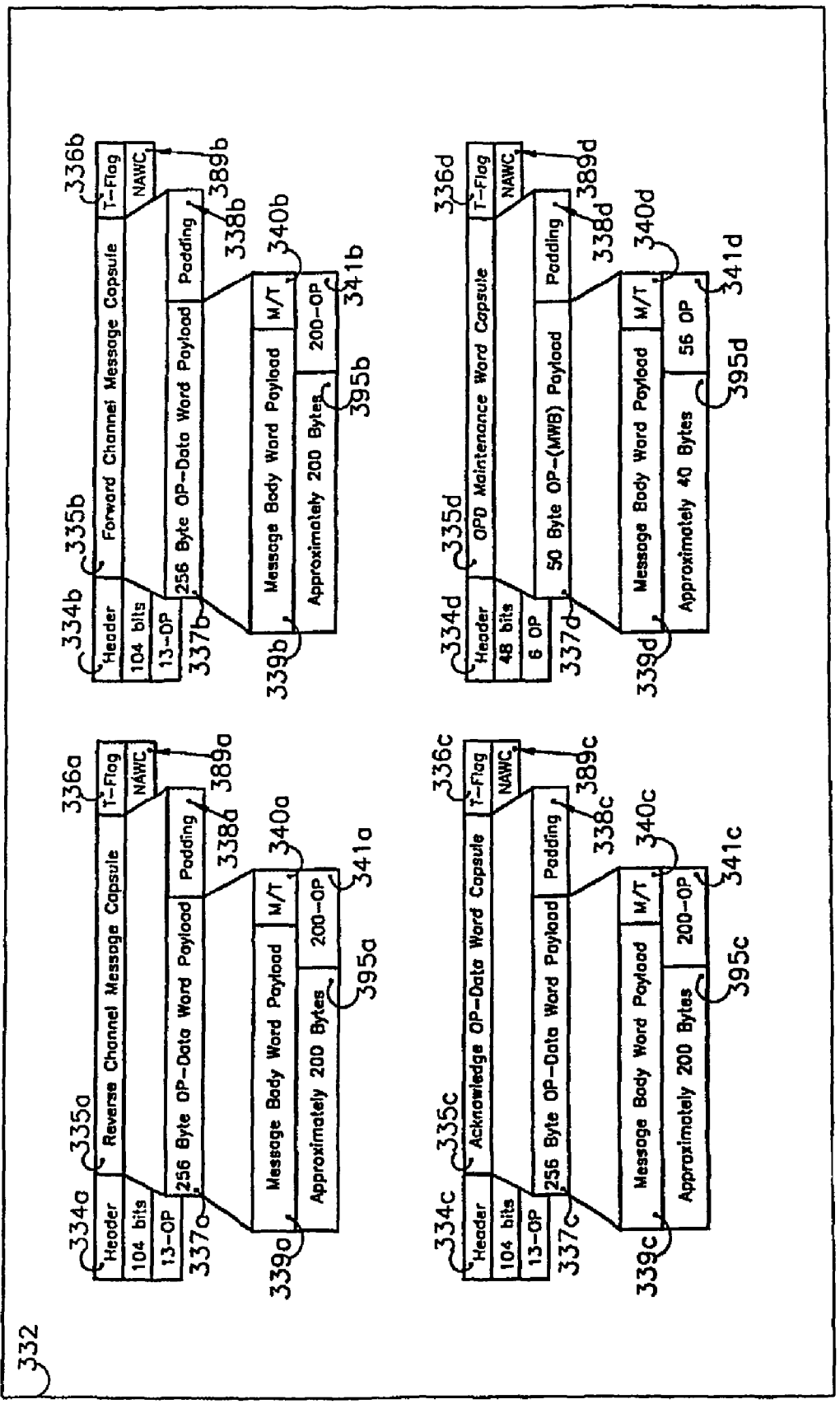
FIG. 22, depicts a block diagram that illustrates the processes and procedures that link octave pulse processing from the VTT and the Virtual host, according to the invention.

This procedure causes the VTT to transmit an OPD maintenance word capsule, 335*d*, as shown in FIG. 22, which may contain; (1) a specific OP data 20 ms four byte word, or (2) a 256 byte message capsule, or (3) a complete OPD message stream "resend" order via a serving transmission path to the VHS, which is further facilitated by the currently serving GSM-PLMN and PSTN. This OPD event reorder is digitally incorporated within the bit structure comprising the "message body" word payload, 339*d*. This action causes the re-transmission of a duplicate OP data word, word capsule, or message stream that contains the same character arrangement, and content value of the previously failed message stream increment. In some instances this word capsule, 335*d* contains a reorder that causes an entire OPD message stream to be re-transmitted with additional information. A VTT may send this capsule, 335*d*, to the serving VHS, or the VHS may send this capsule, 335*d*, to a selected VTT using its currently serving transmission path via a selected PLMN. Maintenance word capsule orders encompass a wide range of useful functions, from VTT and attached application specific device programming, PDA software updates and the currently serving host PLMN transmission path management.

Referring to FIGS. 4, 5, and 6, as previously disclosed OPD message transmissions require no data modem on either end of the event spectrum for rapid execution of maintenance word capsule orders. Sometimes a selected OPD communication event will encompass only a unidirectional, or bi-directional exchange of maintenance word capsule related orders. The process is as simple as performing a "quick connect and disconnect", as is the case when a wireless voice caller enters a directory number on his keypad, hears standard ring cycling, detects a busy signal and abruptly terminates the call. Aggregate airtime consumption is approximately two seconds with incomplete mobile to land cellular calls. All OPD message events are based upon quick connect and disconnect algorithms. These novel protocol means and methods are accomplished by a plurality of processes provided by the invention detailed through out this disclosure.

Figure 7:
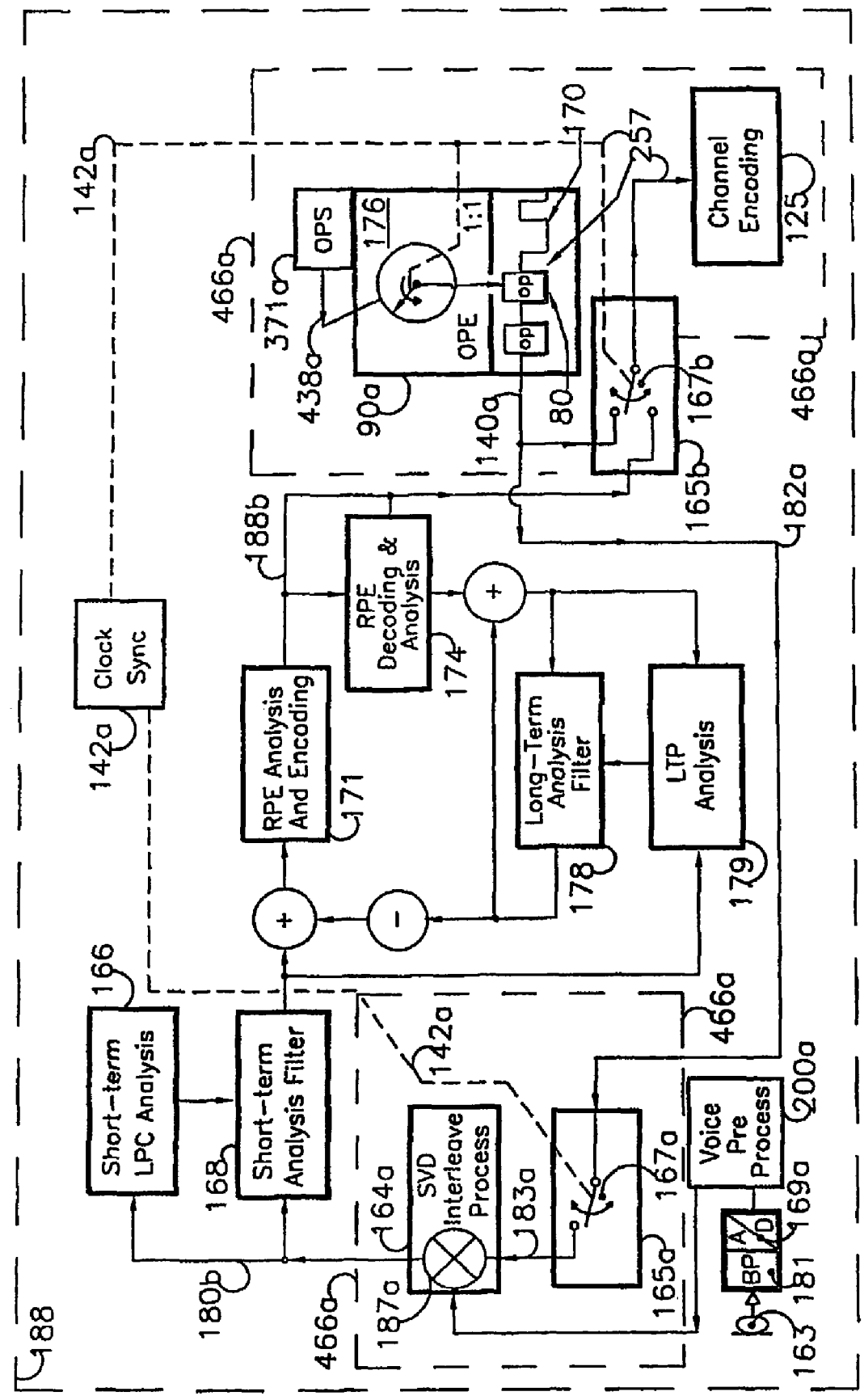
FIG. 7, is a schematic diagram depicting the VTT OPE pulse encoding analysis process, according to the invention.

Referring to FIG. 7, speech compression is yet another feature that transpires in the conventional speech coder, 188. OPD-CODEC virtual protocols are designed algorithmically to cause the generation and simultaneous insertion of octave pulse signatures into selected speech frames and subframes by the octave pulse engines (OPE), 90*a*, specialized protocols without the need to pre-compress from a raw acoustic audio source. Octave pulse signature "bit content" is formatted to be fully generated and synchronized to "fit" within the user data bit capacity of 5 ms subframes as they are generated right before burst transmission, in accord with conventional speech encoding, channel coding, burst generation and the like. The is accomplished without disruption of collocated channel coding and other error correction related data bits that exist within each 65 bit sub-block, that in fact comprises each subframe, and thus each 5 ms octave pulse signature. For example the standard GSM-900/1800/1900 speech coder uses a procedure known as "regular pulse excitation, long-term prediction" (RPE-LTP), or "linear predictive coder" (LPC). This particular "coder protocol" belongs to the family of hybrid speech coders. This hybrid procedure transmits part of the speech signal as the amplitude of a signal envelop, a pure wave form encoding, whereas the remaining part is encoded into a set of bit control and bit back-up parameters.

The receiver reconstructs these signal parts through speech synthesis using a vocoder technique known by those of skill in the art. Examples of envelop-encoding are pulse code modulation (PCM), adaptive delta code modulation (AD-PCM), and octave pulse signature encoding at the time of original generation and storage. For example, a pure vocoder procedure is linear predictive coding (LPC). The GSM procedure RPE-LTP as well as code excited linear predictive coding (CELP), represent mixed-hybrid approaches. This filtration and compression process does not adversely effect octave pulse signatures in fact these conventional processes tend to protect octave pulse signature integrity because of the way the invention exploits these conventional parameters. The invention provides an important variant of this RPE-LTP procedure with its OP-CODEC. Whereas the invention does not circumvent RPE-LTP procedures, the OPE, as the "heart" of the virtual OP-CODEC, generates/inserts octave pulse signature data that is "pre-compressed" in accord with conventional coding procedures.

Referring to FIG. 7, with respect to important details, the encoding, 188, portion of the octave OP-CODEC algorithm is comprised of conventional codec procedural constructs including, but not limited to, short term linear predictor analysis, 116, short term analysis filter, 168, regular pulse excitation analysis and encoding, 171, regular pulse excitation decoding and analysis, 174, long term analysis filter 178, and long-term predictor analysis process, 179. In addition to these conventional algorithmic constructs the invention adds the OPE, 90*a*, and the OPS, 371*a*, that are configured within the operational procedures of an specialized intelligent chipset, 176, that in fact generates a 1:1 interleaving, 167*b*, function with respect to constructing, 170, and simultaneously inserting octave pulse signatures, 80, into conventional codec encoding constructs with respect to channel encoding, 125. Also the interleaving generator, 167*b*, acts as a gating function with respect to selecting octave pulse "only" insertion, 140*a*, speech subframe, 188*b*, insertion, and the like, as the octave pulse signature is loaded, 438*a*, from the octave pulse storage, 371*a*.

This initial loading procedure is instigated by the human machine interface (HMI) constructs, 138*a*, as shown in FIG. 5. These HMI constructs can take the form of MIDI instruction protocols, 214*a*, as seen in FIG. 4. In FIG. 7, the OPD gating, 165*b*, function is synchronized, 257, by the host network channel burst cycling process, and with the VTT clock synchronization, 142*a*. This synchronization is also shown in FIG. 4, with respect to channel encoding, 125, ciphering, 127, modulation, 129, and amplification of the octave pulse formatted speech frame signal. Also shown in FIG. 7, the invention provides simultaneous voice and data (SVD) protocols with an elegant SVD interleaving process, 187*a*. The SVD gating module function, 165*a*, is also interfaced logically to a fully synchronized clock reference, 142*a*, with respect to octave pulse interleaving functions, 167*b*, and channel encoding synchronization, 125, that is based on host network digital traffic channel modulation synchronization, primary reference signaling (PRS), and the like. During an SVD event, the OP-CODEC encoding function, 466*a*, extends into speech subframe processing.

Figure 20:
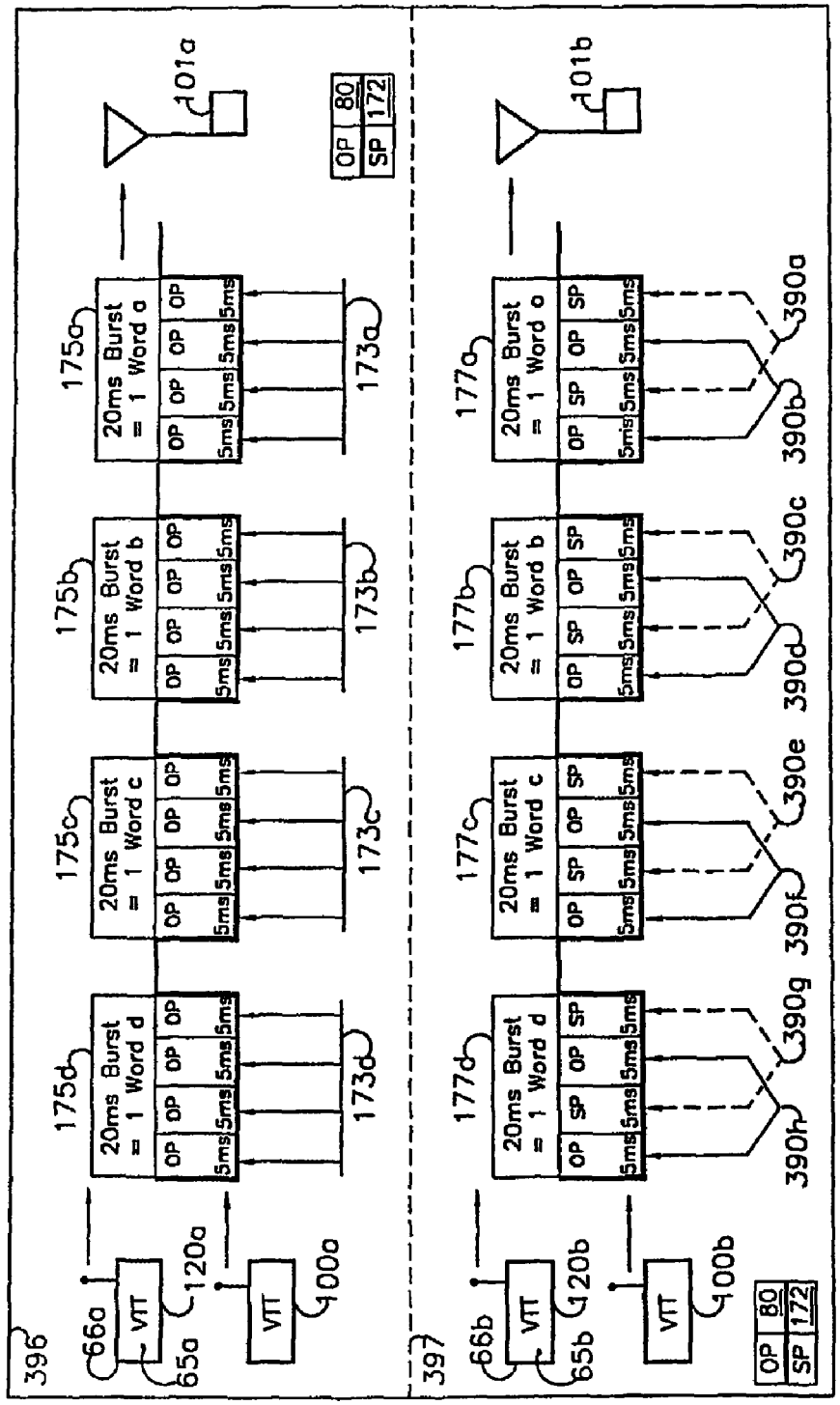
FIG. 20, depicts three generate data packets utilized within the means and methods if specialized virtual circuit fast packet switching (VCFP) according to the invention.

When a user initializes and sends appropriate HMI instructions for an octave pulse simultaneous invocation, the resultant action involves sending relevant blanking intervals to the SVD multiplex module, 164*a*. As the user talks into the microphone capsule, 163, of the headset, 405, as shown in FIG. 23, and referencing FIG. 7, his voice is band pass filtered and then is further subjected to analog digitization, 169*a*, during the voice preprocess, 200*a*. The voice preprocess involves PAM soft-sampling and is know to those of skill in the art. The speech subframes are generated and simultaneously inserted in an interleaving function. Simultaneously, the invention's octave pulse signatures, 80, are generated and inserted, 170, as the SVD gating function, 167*a*, is activated and synchronized, 142*a*. 20 ms "speech-OP bursts", comprised of simultaneous speech and octave pulse signature message streams, 397, are the result of this process as shown in FIG. 20. Each 20 ms SVD word, 177*a-d*, are comprised of two octave pulse signatures 390*b*, 390*d*, 390*f*, and 390*h*, interleaved with human speech frames 390*a*, 390*c*, 390*e*, and 390*g* in a geometric pattern.

Figure 8:
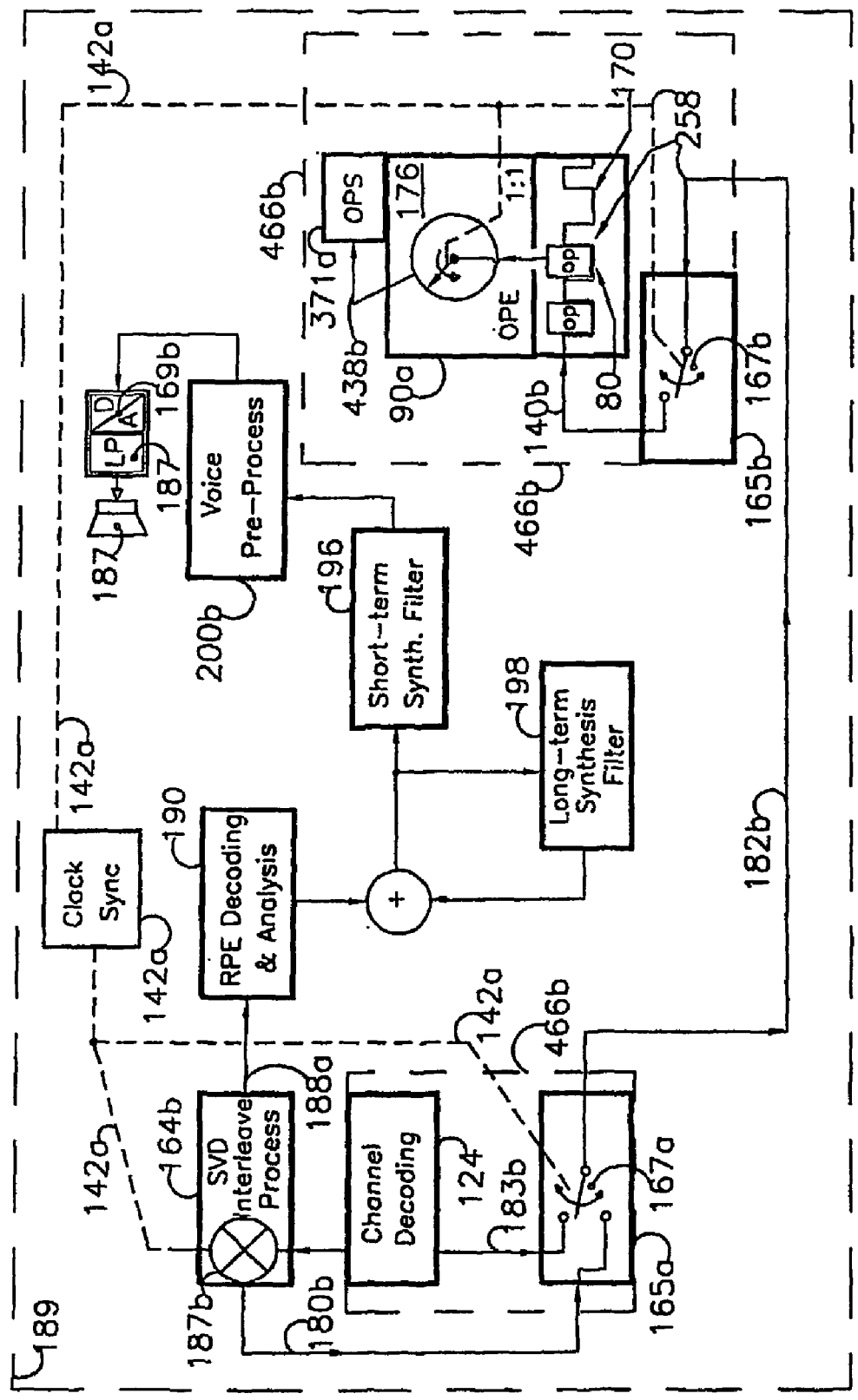
FIG. 8, is a logical block diagram depicting the VTT OPE pulse decoding analysis process, according to the invention.

Shown schematically in FIG. 8 is a simplified block diagram of the RPE-LTP decoder, with the OP-CODEC, 466*b*, decoder algorithmic modification, 189. As previously disclosed, speech data digitally regenerated with a sampling rate of 8000 samples per second, and 13 bit resolution arrive in blocks of 160 samples at the input of the coder, which then become channel encoded, modulated, and are finally transmitted to another virtual network node via the speech frames and subframes of the traffic channel. For example, assume the invention's VTT, 120, as shown in FIG. 4, is receiving (1) octave pulse signatures, (2) speech frames, and (3) receiving and processing simultaneous voice and data (SVD) subframe increments. With respect to the RPE-LTP decoder and its analysis process, 190, the speech signal is decomposed into three components when received; (1) a set of parameters for the adjustment of the short-term synthesis filter (STF), 196, also called "reflection coefficients", (2) an excitation signal for the regular pulse excitation (RPE) decoding and analysis process, where irrelevant portions are removed and highly compressed, and (3) sets of parameters that enable the control of the (LTS) long-term synthesis filter, 198.

The speech decoder essentially deals with the reconstruction of the speech signal from the RPE decoding analysis procedure, 190, as well as the long-term analysis filter, 198, and short-term synthesis filter, 196. In principle, at the receiver site, the functions performed are the inverse of the functions of the encoding process. The irrelevance reduction only minimally affects the subjectively perceived speech quality, since the main objective of the GSM codec, as well as other similar codecs, is not just to achieve the highest possible compression ratio but also to attain solid speech quality. The OP-CODEC, with respect to decoding, 466*b*, octave-pulse signatures also operates as inverse function of the octave pulse decoding and speech subframe decompression processes shown here. When octave pulse subframes and speech subframes are demodulated, 128, deciphered, 126, and detected by the channel decoder, 124, as shown in FIGS. 4 and 7, the following novel decoding processes transpire. Referring to FIG. 8A, the first decoding process involves an octave pulse signature stream, as a data only event, emanating from the OP-CODEC, 466*b*, based decoder, 124. The decoded octave pulse stream, 183*b*, is gated, 167*a*, by the octave pulse gating algorithmic module, 165*a*.

The gating process of the decoded octave pulse stream is fully synchronized, 142*a*, with the VTT clock synchronization. This clock synchronization is also interlinked with host network channel burst cycling, 258, synchronization. Accordingly, once the decoded pulse stream is gated, 182*b*, the stream is sent to the octave pulse engine (OPE) 165*b* gating module function. The signal is then gated with respect to octave pulse retrieval, 140*b*, is processed with a simple 1:1 procedure, 176, and reinserted, 438*b*, into the OPS database, 371*a*. Referring to FIG. 6, from the OPS, the octave pulse stream is further processed, 157*b*; (1) either for display on a PDA, 65, "stylus tablet screen" after post processing performed by the HMI interface 138*b*, or (2) such that it is converted to AT command set data bits, 159, that may cause an application specific device to affect a state change, 160, that in fact causes the application specific device to operate in accord with the received embodied instructions, 161. A simultaneous voice and data (SVD), 164*b*, event is disclosed in FIG. 8*b*. If the octave pulse message stream is interleaved with speech subframes, the OP-CODEC, 466*b*, decoder, 124, detects speech and octave pulse subframes, and sends the entire message stream in multiplexed form, 187*b*, by the SVD decoder interleave process, 164*b*.

The SVD multiplexer, 164*b*, sends the speech frames, 188*a*, directly to the RPE decoding and analysis algorithmic module, 190, whereby it is processed in accord with conventional functions until it is received at the voice pre-process stage, 200*b*, that adds the final steps of DAC conversion. >From there it is sent through a low pass filter and replayed on the headset, 409, speaker, 187, as shown in FIG. 23. Simultaneously the SVD multiplexer sends octave pulse signatures, 180*b*, to the SVD gating module, 165*a*, whereby the octave pulse stream is gated, 167*a*, and sent, 182*b*, to the OPE gating module, 165*b*, as shown in FIG. 8. After gating, the octave pulse signature message stream, 140*b*, is reprocessed, 176, and sent, 438*b*, to the OPS, 371*a*, module where it is forwarded to previously disclosed HMI and other application specific procedures.

For the purposes of conveying a complete understanding of a bi-directional octave pulse data event, a description of a VTT originated octave pulse data event that is terminated at the invention's virtual host system as portal to the Internet will be disclosed. Additionally, a VHS originated octave pulse data event that is terminated at the VTT will also be illustrated. Both types of octave data event origination are transported, and routed through a currently serving digital cellular PLMN. The host networks include, but are not limited to, a GSM compatible network, an IS-95-CDMA network, a CDMA-2000 network, a W-CDMA-3G compatible network, or an IS-136-TDMA-EDGE compatible PLNM network. Once the VTT originated octave pulse message arrives at the invention's VHS, which is located at the network operation center (NOC), the event is terminated. Once VHS receives the octave pulse data message, the VHS converts the OPD message accordingly and relays it to an appropriate application service provider (ASP) that either is a web-content, PDA service support and update center, or a telemetry-telematics monitoring station, using a TCP/IP compatible message via the Internet world-wide-web.

Upon receiving the message, the application service provider (ASP) evaluates it accordingly. Once the message is properly analyzed, the ASP initializes and originates an octave pulse data message request, and sends it to the VHS that is an Internet portal located at the NOC, via the Internet World Wide Web. Once the VHS receives the message from the serving ASP, it reformats the message that was originally sent in TCP/IP based wireless application protocol (WAP), and converts it to an ODP compatible message stream. Once converted, the VHS system initializes and originates a call to the designated VTT via a selected PLMN and PSTN. Once the PCM circuit is stabilized, the OPD message is sent via selected transmission path to the currently serving PLMN whereby the VTT receives the message and the OPD event is terminated by either the VHS or the VTT, depending upon the type of OPD event.

OPD will operate as easily within CDMA network standards and topologies just as it will within GSM networks. For example, IS-95 CDMA payload speech data is generated from a variable-rate speech encoder with four possible output data rates: 9,600, 4,800, 2,400 and 1,200 bps. The rate depends on the speech activity. Typical speech activity for this CDMA speech encoder tends to operate at its lowest rate about half of the time. The CDMA base station and the CDMA compatible VTT OP-CODEC encoder is sensitive to the amount of speech activity present at the input. At output, the rates change in proportion to how active the speech input may be at any time. The rate is subject to change every 20 ms, or every 20 ms octave pulse word. The speech encoder's output is convolutionally coded at a half rate, thus doubling the data to 19.2 kbps when the input is 9,600 bps. OPD rates and activity rates do not alter until an OPD event has completed. An OPD event will always cause a 9,600 bps data rate to be sustained from origination to termination. Also, the OPD will increase the effective octave pulse data output rate to 16 Kbps utilizing single signature octave pulses, without showing any visible increase beyond the specific 9,600 bps data rate, or without causing any undo performance problems with respect to air interface modulation amplitude levels, and the like.

Figure 2:
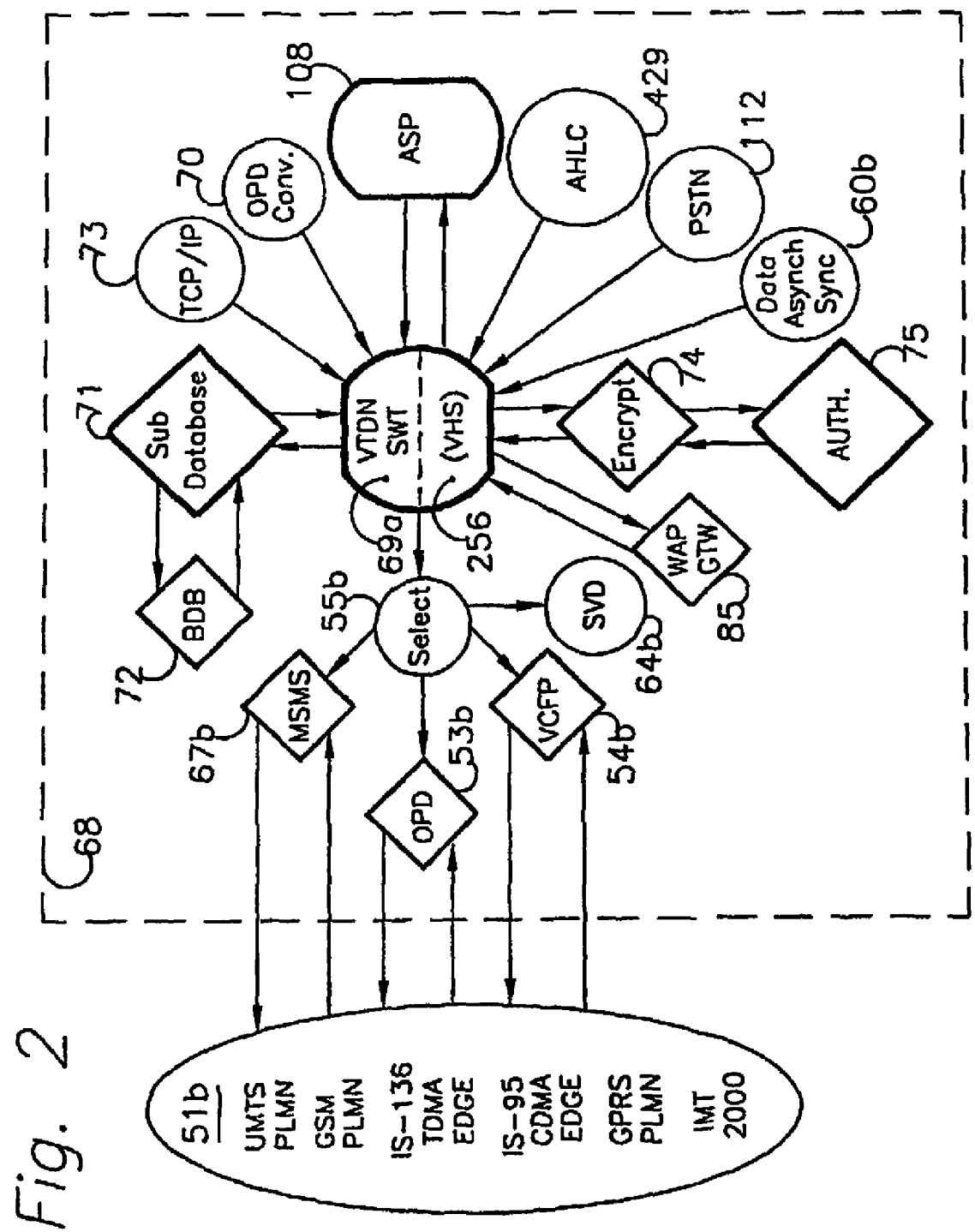
FIG. 2, is a logical block diagram of the VTDN Network protocol, causing an OPD transaction event, transmitted from a Virtual Host according to the invention.

Therefore, for the purpose of disclosing and fully describing the octave pulse data (OPD) virtual data communication system in detail, a GSM 900/1800PCN public land mobile network (PLMN) is the selected wireless and networking communications medium, which virtually supports octave pulse data protocols, processes and procedures. Depicted in FIG. 1 is a block schematic of the VTT's functional protocol features, service sets and layered iterations, 50. The user chooses a specific OPD message type that is to be sent to a selected application service provider (ASP), 108, as depicted in FIG. 2. The user may manually select a VTT that is designed and configured as an intelligent sleeve, 66, that supports ergonomic and algorithmic interface to any personal digital assistant (PDA), 428, as shown in FIGS. 1 and 23. The user may select a manual function, or an unmanned VTT may automatically select a message type that originates from an application specific device, 99, that is configured as a vertical market telemetry application specific device, 99*d*, or is configured as a horizontal market application specific device, 99*c*, for example a Palm VII PDA, 65, and the like.

In some instances a single VTT can be provided with application system monitoring for a motor vehicle such as an automobile, a truck, or an offshore marine vessel. For example, global positioning system (GPS) longitude and latitude information is collected, and can be transmitted via an OPD call message. Other information including engine diagnostics, security related information with respect to unauthorized ingress, and the like, can also be transmitted using OPD. The same VTT, configured as an intelligent sleeve, 66, interfaced with a PDA, 65, can collect and provide concierge information, stock market reports, weather reports, airline flight information, news reports, and the like, for the benefit of the occupants within a selected automobile, truck, bus, or marine vessel via an OPD call forward digital traffic channel (FDTC) message bitstream. The user may cause the same VTT to originate and send an OPD Internet query message that causes a selected ASP, 108, as depicted in FIG. 2, to respond with specific information. This query message may be regarding an airline flight schedule, a PDA software update, and intelligent sleeve software update and the like. Regardless of the message type, the fundamental OPD messaging protocol and network protocol remains essentially the same with respect to transmission transport through forward digital traffic channel (FDTC), reverse digital traffic channel (RDTC) and PCM circuit PLMN-PSTN channel space.

Consider a scenario in which a model message query involves a combined message that contains OPD bits that comprise (1) a query for an airline flight, (2) an automatic telemetry report of an automobiles global positioning derived location in order provide the most efficient route to a selected airport, and (3) an engine status fuel consumption report. Referring to FIGS. 1 and 23, an OPD wireless data communications event is initialized in the following protocol means and methods. A user scrolls, 415, the menu of his PDA, 65, inserted into the VTT configured as intelligent sleeve, 66, and selects an OPD call query message to be sent to airlines reservation web site concerning his pending flight. Once he scrolls to the proper graphically represented icon, the user enters specific flight information into the airlines web based menu, via keypad or stylus, and presses the GUI based "send button", 465*a*, on the virtual keyboard, 367*b*, of his PDA. This terminal is configured as a combined wireless PDA and a mobile telemetry device. The VTT firmware, 120, and software, 52, responds by selecting, 55*a*, and initializing a OPD call, 57, set up, which uses a standard GSM voice call routing scheme in this example.

Figure 24:
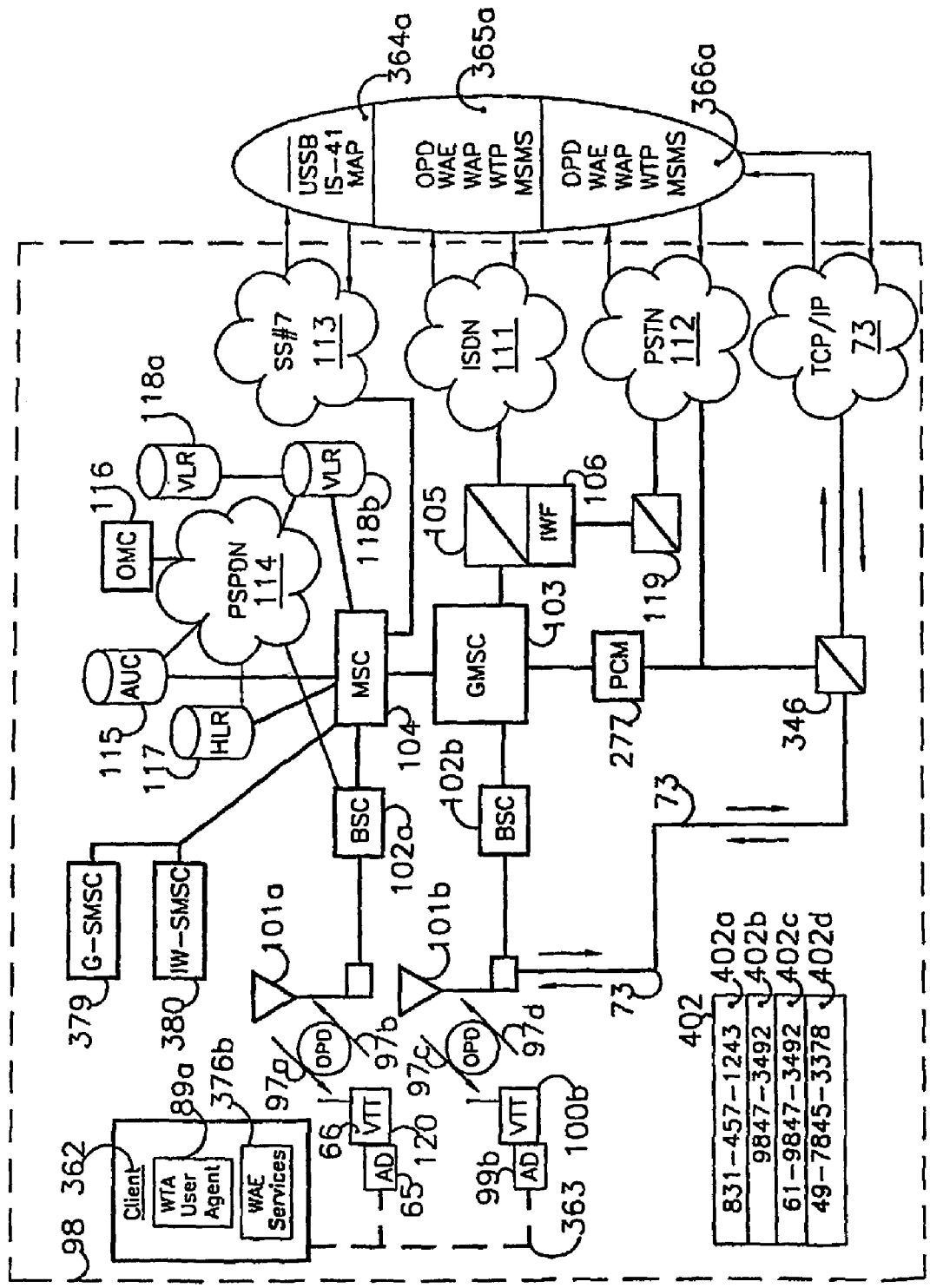
FIG. 24, block diagram of a host virtual transaction based network (VTDN), according to the invention.

Depicted in FIG. 24 is a GSM-PLMN, 98, with a VTT, 120*a*, designed and configured as an intelligent sleeve, 66, that contains a selected PDA, 65, as depicted in FIG. 23. Referring to FIG. 24, there is also provided a virtual telemetry terminal, 100*b*, which is configured to manage and control an application specific telemetry device, 99*b*. Examples of telemetry devices range from a utility power or gas meter to traffic control modules, and they can be located anywhere in the world. Each VTT configured as an intelligent sleeve, 120, or configured as virtual telemetry terminal, 100*b*, is assigned a subscriber identity module (SIM) card module, 133, as shown in FIG. 4. The SIM contains a large amount of information, however for the purposes detailed here, only certain stored data information has direct relevance to the operation and performance of octave pulse data network protocols, MSMS route protocols, or other novel protocol variants the invention produces. Such information including, but not limited to, subscriber data, roaming data, PLMN data, or mobile subscriber ISDN (MSISDN; the mobile identification number (MIN) is the equivalent of a conventional directory number for wireless services in North America) has direct importance to the successful operation of the present invention. Conventional GSM mobile stations may be assigned many MSISDN numbers in parallel. Different MSISDN are used to address different services. For example, with respect to conventional GSM-900/1800PCN services, one MSISDN number is used for voice, another for fax, another for PAD data, and the like. The invention modifies this parallel modality. A VTT, 120, or 100*b*, for example, uses one number for conventional voice, another number for OPD and simultaneous voice and data (SVD). Both VTT's, for example 120, and 100*b*, use a different number for MSMS synchronous service routing, and yet another for novel PAD data service routing. The invention utilizes this multiple MSISDN feature in a novel and unique way.

First an MSISDN number is designated as a conventional voice call number, in terms of host PLMN network identification, authentication, and the like. Secondly, an international mobile subscriber identity (IMSI), is utilized by the GSM version of the VTT, 120 and 100*b*, respectively. Thirdly, the international mobile equipment identity (IMEI) (the equivalent of the electronic serial number (ESN)), is used by AMPS, CDMA and TDMA mobile stations in North and South America. Referring to FIG. 24, upon initialization, the VTT, 120, transmits a conventional voice call request signaling increment that contains one of the invention's specialized routing numbers, 402. The invention's OPD, MSMS, and other manipulated and modified voice and data call service constructs use special non-dialable routing numbers, 402, that essentially "point" the OPD call the invention's selected NOC, via a currently serving GSM, CDMA, TDMA or UMTS PLMN. This number, 402, is algorithmically expressed in different international directory number format iterations. One such example is "831-457-1243", 402*a*, which is assigned to a North American telephone exchange specific to a Santa Cruz Calif. NOC. The data call can then be routed to a NOC anywhere in the world using a local directory number "9847-3492", 402*b*, for example, which specifies a local gateway node to a NOC in Sydney Australia.

International routing numbers, 402*c*, can also be used to direct data calls to a NOC anywhere in the world. Examples of international routing numbers are given in 402*c*, and 402*d*. When an OPD event is initialized, originated, and transmitted, it goes through a selected PLMN digital air interface channel, a mobile switching center (MSC), and a PCM transmission path, 277, within the constructs of a private link or a PSTN, 112, transmission path to a selected NOC. In some instances an OPD call route request is pointed to a specialized PCM-Internet gateway node, 346. This specialized gateway node, 346, converts PCM bitstream, 277, OPD calls with respect to TCP/IP, 73, packetization. After conversion the gateway node 346, then routes the OPD call to a selected NOC, 68, via the Internet World Wide Web (WWW), 110, as shown in FIG. 25.

Depicted in FIG. 24 is a VTT, 120, which is configured as an intelligent sleeve, 66, integrated with a PDA, 65. Accordingly, upon a manually or automatically initiated command, the VTT, 120*a*, initializes an OPD call to the invention's virtual host system (VHS), 256, that is collocated with a selected NOC, 68, as shown in FIG. 25. With reference to FIG. 24, the VTT, 120*a*, transmits a traffic channel burst to a currently serving base site, 101*a*. This call request, is an access burst that contains the call destination routing number, for example a NOC access number in Melbourne Australia, 61-9847-3492, 402*c*. With respect to a GSM PLMN, the Random Access Channel (RACH) facilitates an OPD call request between the VTT, 120*a*, and the serving base site (BS), 101*a*. The RACH is a logically defined up-link common control channel (CCCH) that a VTT, 120, or any other conventional mobile station uses to send a connection request to a base site. The only two messages that are sent with respect to a GSM RACH are CHAN_REQ and HND-ACC, with a net length of eight bits and a transmission rate of 34 Kbps. GSM also provides a standalone dedicated control channel (SDCCH). The SDCCH is used for up-link and down link of the air-interface to transmit signaling data for connection set up, call routing and location update (LU). The transmission rate is relatively slow at a 779 bps. However this slow data speed has no effect with respect to an OPD event cycle and its desired performance parameters. The SDCCH typically contains the OPD call routing number, 61-9847-3492, 402*c* for example, the VTT's MSISDN, IMEI, IMSI and other pertinent network access data.

Once the currently serving BS, 101*a*, receives the OPD call request embodied within the logical frame and subframe structures of an SDCCH invocation, it is forwarded to the associated base site controller (BSC), 102*a*, which in turn is forwarded to its associated mobile switching center (MSC), 104. The MSC performs a rapid analysis of the received SDCCH data in order to determine whether or not the instant VTT, 120*a*, has previously registered with this PLMN, 98, as a "home" subscriber or a visiting "roamer". During this registration analysis the associated MSC detects and examines the received MSISDN contained within the SDCCH registration increment. The MSC, 104, determines its registration status by comparing the received subscriber information with its own home subscriber MSISDN range and call routing tables. If the VTT, 120*a*, is deemed a home subscriber the MSC forwards the VTT, 120, registration increment to its associated home location register (HLR), 117. Sometimes the same registration increment is sent to its associated authentication database (AUC), 115. The AUC is the physical part of the HLR. In today's GSM PLMN topological structures the HLR and AUC are one in the same with respect to most PLMN implementations. If it is determined by the HLR that the VTT is a valid home subscriber, it responds to the associated MSCs registration interrogation with a form of "authentication authorization notification. If the VTT, 120*a*, has been classified as a roamer by the serving MSC it forwards the registration increment to its associated visitor location register (VLR), 118*b*.

If the VTT, 120, has not previously registered as a roamer, it sends a registration increment to the HLR associated with the MSISDN via the SS#7 or SS7 network, 113. In this particular case the associated HLR, 109, is collocated within physical constructs of the selected NOC, 68, as shown in FIG. 25. With reference to FIG. 24, if the HLR interrogates its own subscriber database and detects that the MSISDN represents a valid and current subscriber, it forwards a form of "registration authentication" to the currently serving MSC, 104, and its collocated VLR, 118*b*. Upon reception the serving MSC, 104, sends a form of "successful registration" contained within the frame structures of a forward channel SDCCH to the VTT, 120, via the forward traffic channel that transports the SDCCH registration increment via traffic channel signaling frames. Upon detection of this received registration authorization, the VTT, 120*a*, prepares to transmit an octave pulse data message to the VHS, 256, via the currently serving PLMN network, 98, as shown in FIGS. 24 and 25, respectively.

Referring to FIGS. 24 and 25, OPD processes and call flow algorithms are disclosed. GSM call establishment, channel synchronization, timing, channel measurements that transpire during a connection, and other such details are not deemed necessary for the purposes of this disclosure, therefore further details with respect to these matters are omitted. Once the VTT, 120, authentication procedures are complete, a logical speech channel is assigned between the currently serving base site, 101*a*, and the VTT, 120, by the currently serving MSC, 104, and a base site controller (BSC), 102*a*. Simultaneous with the traffic channel assignment is the assignment of this OPD call route topology. This OPD call route geometry occurs between the currently serving MSC, 104, the Gateway mobile switching center (G-MSC), 103, an assigned PCM circuit, 227, the PSTN, 112, and VHS, 256, that is collocated with the invention's NOC, 68. Once the VTT, 120, has requested service, is registered successfully, and has sent its MSISDN and the call destination number via the assigned digital traffic channel, a PCM circuit is now initialized. This PCM circuit, complete with call route path, is established by the out-of-band signaling mechanism provided by the serving SS#7 network, 113, to the HLR, 109, via a TCAP/MAP message.

The call destination number, for example 61-9847-3492, is a number assigned to the invention's NOC, 68, in Melbourne Australia, as depicted in FIG. 25. This route number, or any "route to NOC number" is permanently assigned to each VTT, 120*a* or 100*b*, as shown in FIG. 24. All OPD calls are routed to the VTDN NOC when an OPD event is initialized and originated within the footprint of any digital cellular PLMN. An OPD call route number, 402, as shown in FIG. 24, can include route numbers in California "831-457-1243", 402*a*, local Melbourne Australia access "9847-3492", 402*b*, or Frankfurt Germany "49-7845-3378", 402*d*. The user of a VTT, 120, used for horizontal market applications or on site with respect to a VTT, 100*b*, configured for vertical market telemetry applications, cannot change these special OPD route numbers. An OPD call route number may only be changed remotely via the invention's VHS, 256, which is collocated with its NOC, 68. The VHS system originates a forward channel OPD call, and transmits "administrative program update" and changes the VTT, 120, user profile. This OPD call event, and all such OPD events are routed to the programmable telephony switch, 69, collocated, interconnected, and transported by host PLMN and PSTN, 112, PCM circuit route path constructs with respect to the invention's VHS, 256, means and methods.

OPD call routing, in fact any conventional speech call routing is performed by out-of-band signaling system seven (SS7) in the U.S., and signaling system number #7 (SS#7) constructs via TCAP/MAP protocols in Europe, Asia and Australia. The means and methods of transaction capabilities application part (TCAP), mobile application part (MAP), interim standard 41A-D, and other such specifications and protocols are widely known to those of skill in the art. Therefore further disclosure with respect to these conventional out-of-band signaling protocols and procedures are omitted. Once routed and connected the VTT, 120, prepares to transmit an application specific OPD call message stream from the serving PLMN, via the PSTN, 112, to the VHS. Referring to FIGS. 1, 23 and 24, depicted in FIG. 1 are the VTT's functional constructs, 50. When a user manually initializes an OPD call event, or when an automatic control program contained within a remotely located unmanned VTT, 120, initializes an OPD call, the following processes and procedures transpire. Within the substrate layers of the VTT's firmware and software operational protocols, 52, are control algorithms that manage many high level functions. High-level functions include but are not limited to OPD call set up, tear down, type of event selection, and the like.

For example, with respect to manual user functions there is provided a "human machine interface" (HMI) capability, 62, expressed ergonomically and algorithmically here as an intelligent sleeve, 66, as shown in FIGS. 1 and 23, a PDA-Palm VII interface, 65, or any personal digital assistant, 428, including but not limited to, the Phillips Velo PDA(s), Avigo PDA(s), Clio PDA(s), Hewlett-Packard PDA(s), IBM WorkPad PDA(s), Casio's Cassiopeia PDA(s), Palm III PDA, Palm V PDA, Apple Newton PDA(s), Poqet PDA(s), Psion PDA(s), REX PDA(s), Visor PDA(s), and the like. In terms of VTT functions this HMI, 62, interface can take the form of a regular mobile station (MS) keypad, PDA stylus tap pad, mini computer keyboard, and the like. Other HMI interfaces include a Palm VII "type" PDA stylus tap-table screen, an audio speech to text interface, text to speech interface, Palm VII graffiti to speech means and methods, and the like.

In one embodiment the user chooses an event type that utilizes the heretofore-disclosed OPD call set up to the invention's NOC and VHS, heretofore disclosed. The user's VTT is configured to operate in a multilevel capacity, i.e., the VTT, 120*a*, is configured as an "intelligent communicative sleeve" that slides over a conventional PDA, 65, with a stylus screen as its primary HMI, 62. Additionally this PDA coupled with the invention's OPD based intelligent sleeve, 66, is voice service capable, as shown in FIG. 23. In this particular configuration, the VTT is designed to provide simultaneous voice and OPD call services, e-mail, Internet web clipping, automatic voice call dialing, OPD Internet content transmission and retrieval, and the like. For some applications the VTT, 120*a*, may be configured with a GPS receiver, 426, and display capabilities, 367*c*, as shown in FIG. 23. Depicted here is a modified Palm V or Palm VII PDA, 65, and an OPD VTT "intelligent sleeve enclosure", 66. Contained within this sleeve enclosure is the virtual telemetry terminal, 120*a*, with all the functional operation component constructs such as the octave pulse engine (OPE), 90*a*, and the octave pulse signature storage (OPS), 371*a*, configured as a dual function chipset, 90*a*, and 371*a*, respectively, as depicted in FIG. 4. Contained within the integrated circuitry constructs are an ARM processor, 333*a*, a boot ROM chip, 33*c*, and a DRAM chipset 333*b*.

Referring to FIG. 23, the modified Palm V or Palm VII, 65, when combined with the OPD intelligent sleeve, 66, is transformed into an improved wireless PDA that adds many new application specific functions, including but not limited to, wireless telephony digital voice, video image streaming, speech to text, text to speech, speech compression, voice recognition technology, and access to the automatic human language conversion (AHLC) server database, 429, as shown in FIG. 25. Referring to FIG. 23, when the invention's VTT is configured in this application specific example as an intelligent sleeve, 66, for any selected PDA, it provides a new level of communication management construct sets, including, but not limited to OPD, internet access, web-clipping, GPS tracking-map display, 367*c*, and digital voice services that utilize, in a virtual manner, conventional public wireless communication network modulation schemes and network protocols that are compatible with GSM 900/1800/1900, IS-95-CDMA, CDMA-2000, IS-136 TDMA-EDGE, GPRS, UMTS terrestrial PLMNS, Globalstar, Inmarsat Broadband, ICO, Moetius, Teledesic, and other satellite PLMN networks, and the like. The invention's OPD intelligent sleeve, 66, is designed to enable any and all PDAs to "fit hand in glove like", when inserted within the ABS or plastic construct, 418 or 421, that comprises this versatile enclosure, 66. The bottom section, 411, of the Palm VII PDA, 65, contains a multi-pin port, 412, that is used to connect the PDA to a "Hot Sync Docking Station", which is connected by metallic cable to a computer. This connection enables digital data communication between the Palm VII operating system (OS), user information database, and a personal desktop or laptop computer that is loaded with Palm VII software versions for either PC and or Macintosh compatible terminals.

Referring to FIG. 23, the user purchases the invention's VTT, configured as an intelligent sleeve, 66, from any retailer. The user may also have a previously purchased PDA, 65. If so, the user simply inserts, 418, or 421, his PDA, 65, into the interior space of the intelligent sleeve, 66. Once secured the user presses the power button, 430*a*, of the PDA, 65, and the power button, 430*b*, of the intelligent sleeve, 66. In a preferred embodiment, the invention provides intelligent sleeve software that enables one button to power up both the PDA and the intelligent sleeve. In most cases the preferred power up embodiment is the power up button, 430*b*, located on the intelligent sleeve, 66, housing, will in fact provide cogent power up access. In fact, the invention's intelligent sleeve provides its own long life battery, 431, which serve to power both the VTT and the PDA. Once both units are powered up the user inserts the hands free headset, 405, mini plug, 406, into the intelligent sleeves headset mini-plug jack, 407. The intelligent sleeve contains resident software that provides a series of graphical user interfaces (GUI). Upon power up the intelligent sleeve's firmware and software detect the presence of the PDA, determines its type and then automatically loads appropriate GUI kernels and plug in modules that provide a useful selection of human interface graphics (HIG). Such software modules include but are not limited to, a virtual cellular phone keypad display, 367*b*, or a GPS map display, 367*c*, are but a small example of the list of useful GUI to operating system interface modules.

There will be instances when the user needs to update his PDA software. The user chooses either to request new software or software updates from the invention's VHS via the currently serving digital cellular PLMN while operating in wireless mode via forward channel space. The user may also take his PDA, and place it in his docking station at home or office to access the invention's octave pulse data virtual transaction data network (OPD-VTDN) service web site to download the desired software updates. If the chosen software also improves and/or updates the intelligent sleeves software operations, the user simply inserts the PDA into the intelligent sleeve powers up both units and performs a reverse download from the PDA to the intelligent sleeves internal database commensurate with normal download procedures. Once the software is loaded into the PDA, 65, and/or the intelligent sleeve, 66, the user is ready to utilize any one of the useful functions accordingly. For example if the user wants to place a digital wireless voice call he simply takes his stylus, 404, taps the PDA screen, 367*a*, and the appropriate icon, and the invention's virtual cellular phone key pad, 367*b*, appears. Next the user takes the stylus and "tap dials" the displayed icons, 427*a*, which look like conventional cellular phone key characters. As described previously, the user has plugged in the intelligent sleeves headset, 405, placed the ear piece, 409, in his ear, attached the microphone, 408, to his shirt lapel and now "taps" out his selected directory number. Once the user is finished "tap-dialing", he taps the "send" icon and makes a connection in accord with conventional digital cellular, PLMN and PSTN voice call connection protocols. In still another variation of this process, the user may look up a directory number that has been previously stored in the PDA address database, which is controlled by an address database access button, 414, located on the PDA, 65. Once the address list appears, the user scrolls to the desired number using the PDA's scroll button, 415. Once the desired is located, 419 or 420, as shown on the tablet screen, 367*a*, he simply taps the number, 419, and the PDA, 65, in conjunction with the invention's intelligent sleeve, 66, automatically dials the selected number. In still another embodiment, the user may examine his current position with respect to GPS information and its related map display, 367*c*. In order to access this information, the user simply taps the icon specific to GPS services located on the PDA screen, 367*a*. Once initialized the user can tap the icons, 427*b*, that cause the GPS map display to; (1) change relative focal perspective, (2) cause a desired zoom in or zoom out action, or (3) pick and tap a specific location when utilizing the invention's GPS map display to augment concierge services, and the like.

Located on the body of the PDA is a button for accessing the "appointment database", 413. The invention offers a unique feature, which accesses the PDAs appointment database. For example, the user views his appointment list and desires to change or cancel an appointment. Using the PDA/intelligent sleeve, he can simply tap the "appointment change icon" and select an automatic dial out for a voice call to his secretary or directly to the party in question. In another embodiment, the user can tap out a short e-mail message and send it via the OPD-VTDN protocols means and methods. In still another embodiment, the user can press the "to do" list button, 416, access the menu and make changes in accord with the automatic voice call out and e-mail scenario, with respect to communicating changes in the user's "to do" list that may effect other people directly and thus must be contacted immediately. When the user decides by which medium he will make a call or send an e-mail simply uses his stylus, 404, to "tap-out" an instruction. For example, the user may decide to send a small e-mail message of about one thousand characters to his secretary instructing her to change an appointment time with a client. The user presses the combined "e-mail-memorandum" button, 417, and the "e-mail memorandum menu", 367*d* with virtual message page appears. The user then taps the "graffiti writing and alphanumeric screen", 368. The user first chooses "alpha-English characters" and taps out the "e-mail message", 427*c*, as shown in "e-mail memorandum" menu, 367*d* that is composed with and comprised of 1000 thousand characters. Each e-mail character equates to an eight-bit byte, or one octave pulse possessing one resonant signature value. The intelligent sleeve 66 also contains an optional video camera 624*a* that enables wireless video conferencing. The invention provides the heretofore-disclosed video burst protocol that enables real time video streaming. The intelligent sleeve in conjunction with a video image capable PDA 65 also provides reception of full color and black and white video images that are compatible to 525 line NTSC video signaling, 625 line PAL video signaling and the like.

A central component to the invention's video burst protocol is the novel compressed video full ASCII messaging that is displayed on a received video image 367*e* that is displayed on the screen of the PDA 367*a* respectively Video burst comprises Full ASCII messaging constructs, and compressed Full ASCII messaging capsules and the like. In fact, the invention provides a million to one video compression construct that enables high resolution ASCII messaging from a unique text character embedding process, that inserts full video raster or other such video source files. The compressed video messaging ASCII text files are generated as single video frames that are comprised by a plurality of video lines. The invention is the first of its type to provide full ASCII messaging via highly compressed video based messaging in 2.8 kbps data rates through digital cellular, satellite, and land based ADPCM optical speech circuits. In fact the invention provides the video burst messaging protocol as primary means and method of transmitting compressed video based full ASCII messaging through digital cellular, satellite, and ADPCM circuits without the need of modifying or replacing any host network element that support digital speech traffic.

This novel video messaging construct may be originated and thus transmitted from the Intelligent sleeve to the invention's virtual network operation center (NOC). And conversely originated and transmitted from the NOC to the Intelligent sleeve operating in a conventional GSM PLMN network or other such digital cellular or satellite network that is based upon digital narrowband or wideband CDMA, TDMA and the like.

Referring to FIGS. 20, 22, and 23, depicted in FIG. 22, are OPD word capsules, 332, each formatted for a particular function. A one thousand character octave pulse based e-mail message is comprised and transported by one thousand octave pulse resonant signatures. With respect to the protocol construct of a digital air interface channel and a PCM circuit, an octave pulse bitstream is comprised of a 256 byte OPD word payload, 337*a*, and 337*b*, contained within word capsules 335*a* and 335*b*, configured as the reverse channel message capsule, and the forward channel message capsule, respectively. Formatted within the octave pulse constructs that generate the OPD payload are message stream management, and capsule management constructs that comprise capsule header data bit increments 334*a* and 334*b*. These capsule header increments, 334*a-d*, belong to the reverse channel message, forward channel message capsule, the acknowledgement data word capsule, 335*c*, and the maintenance word capsule, 335*d*, respectively.

Each capsule header is comprised of 13 octave pulse resonate signatures, which equate to approximately 104 bits of capsule management information. This capsule management information also identifies octave pulse message capsule placement with respect to its linear position within the structural complex of a complete octave pulse message stream an example of which is the 1000 character e-mail message, 427*c*, as shown in FIG. 23. With reference to FIG. 22, the message body word payload 339*a*, and b, contains all application specific octave pulse signature information. Each message capsule contains a "number of additional words coming" (NAWC) field. The NAWC field is comprised of three 8-bit byte octave pulse signature characters that indicate how many additional words are expected to arrive, which follow the message capsule in question. The octave pulse data capacity for each of the three message capsules, 335*a-c*, is equivalent to a conventional data payload value of 256 bytes. With respect to this particular example, a 1000 character e-mail message is comprised of four message capsules. The last message capsule will indicate there are no additional words coming by the three zeros "000" appearing in the NAWC field.

Depicted in FIG. 20 are octave pulse data words, 396 and 397, respectively. Each octave pulse word, 175*a-d*, is comprised of four 5 ms duration octave pulse resonate signatures, 173*a-d*. The user's e-mail message is comprised of four 256 byte-message capsules. Each message capsule is comprised of 64 octave-pulse 20 ms bursts, 396 and 397, respectively. Therefore, one 20 ms octave pulse data burst, 175*a-d* and 177*a-d*, equals one octave pulse data word respectively. Therefore, the user's 1000-character e-mail message is comprised of 256 octave pulse data words (OPDW) that are contained within four octave pulse message capsules, as shown in FIG. 22. With reference to FIGS. 20 and 23, the invention provides for simultaneous digital voice and data services that can be initialized by the user selecting a directory with his stylus, 404, and originating the octave pulse e-mail event from the PDA, 65, that is inserted and integrated into the intelligent sleeve, 66, which contains the invention's OPD and voice capable VTT 120. The invention provides for simultaneous voice and data (SVD) services. Accordingly, there are provided octave pulse, 80, data words, 177*a-d*, that contain a staggered interleaved array of octave pulse signatures 390*b*, 390*d*, 390*f*, and 390*h* and conventional speech, 172, subframes, 390*a*, 390*c*, 390*e*, and 390*g*.

With reference to FIG. 22, each OPD message capsule has 256 bytes of OP data word capacity. Each byte contains eight bits that means each OPD message capsule has 2,048 bits of data word payload. Approximately 200 bytes of each OPD message capsule are allotted to OPD message use. The remaining 56 bytes are taken up for authentication, channel maintenance, and overhead.

With reference to FIG. 20, each 20 ms burst of CDMA, TDMA or GSM radio signal carries approximately 260 bits of information, of which approximately 40% is taken up by network overhead. This leaves approximately 156 bits of information per 20 ms burst, or 39 bits per 5 ms subframe. Of the 39 bits per 5 ms subframe, 24 bits (or three 8 bit bytes) are taken up by numerous filtering coefficient bits. This leaves 15 bits or, 1 8-bit byte with seven bits remaining. Eight bits, or one 8-bit byte, is also equivalent to the amount of information needed to represent one ASCII character. Thus, each 20 ms burst can carry 4-octave pulse characters converted from ASCII via the OP message codec. The remaining seven bits from each 5 ms subframe represent a combined 28 bits of message codec information that is used to identify each 20 ms burst (OPD burst identification number). This allows OPD messaging to resend only those bursts identified as "corrupted" as opposed to resending the entire message, which further increases the efficiency of OPD messaging. The OPD burst identification number is also used in conjunction with the MS-ISDN Electronic Identification Number (EIN), Electronic Serial Number (ESN), and Equipment Identity Register (EIR), to form the authentication/encryption algorithm that is housed in the OPS/SAN.

For instance, if an OPD user chose to send a message which read, "Hello World!" the message would be converted to a series of musical notes, or octave pulses, using the OPD messaging codec contained in the OPD NOC or the VTT, 120, configured as the intelligent sleeve, 66. An example of this is provided below. This message is provided strictly as an example for this disclosure and is in no way meant to be construed as limiting the invention.

The message "HELLO WORLD!" contains 12 user entered data characters. Each character is represented by an 8-bit byte ASCII character. Thus, the entire message represents 96 bits of ASCII character information. As mentioned above, each 20 ms burst can carry the equivalent of four ASCII characters. Thus the message "HELLO WORLD!" would require three 20 ms bursts to transmit the message. Each complete OPD message capsule consists of 8 20 ms bursts (256 bytes×8 bit/byte=2,048 bits, 2,048 bits/256 bits/20 ms pulse=8 20 ms bursts). Each message capsule also contains at least 2-header containers and a tail flag. The headers contain information such as the MS-ISDN EIN, EIR, ESN, and the like. A 10 digit MS-ISDN EIN number, 0418 622 944 for example, would represent 12 characters (including spaces) or 96 bits, or 3 20 ms bursts.

Since many compression algorithms do not work efficiently on short messages, short messages sent via the OPD enabled VTT through the OPD NOC, would be duplicated to fill the unused portions of the message capsule. This filling or padding will enable more efficient compression, as well as allow an additional mode of error correction. Thus in this example, the message will repeated at least once if not more times to fill up the entire 256 byte message capsules. Since, the message will require 3 20 ms bursts for MS-ISDN EIN number authentication/encryption identifier, and at least 6 20 ms bursts to send the message in duplicate, the message will encompass at least two OPD message capsules.

The user composes the message using the GUI interface on the VTT and presses the send icon. This causes the OPD message codec to be engaged. The message in the example might be converted from "HELLO WORLD!" to the musical notes C, B sharp (BS), D, D, F, G (for the space), A flat (AF), F, B, D, E, E sharp (ES, for the exclamation point). Each musical note would have a specific harmonic signature identifying it as a particular ASCII character.

With reference to FIG. 20, since each 20 MS pulse can carry the equivalent of 4 ASCII characters worth of information, a 20 ms pulse could carry C, BS, D, D, or what would be converted back into the ASCII text as HELL. The next 20 ms pulse would carry F, G, AF, F or 0 WO. A third 20 ms pulse would carry B, D, E, ES, or RLD! The message travels through the NOC and is converted back to normal ASCII text. As mentioned previously, the message would be repeated to allow compression that is more efficient in addition to error correction, and as such a minimum of 3 more 20 ms bursts would be used to convey this particular message. This message was provided strictly as an example in this disclosure and is in no way meant to be construed as limiting the invention.

Figure 26:
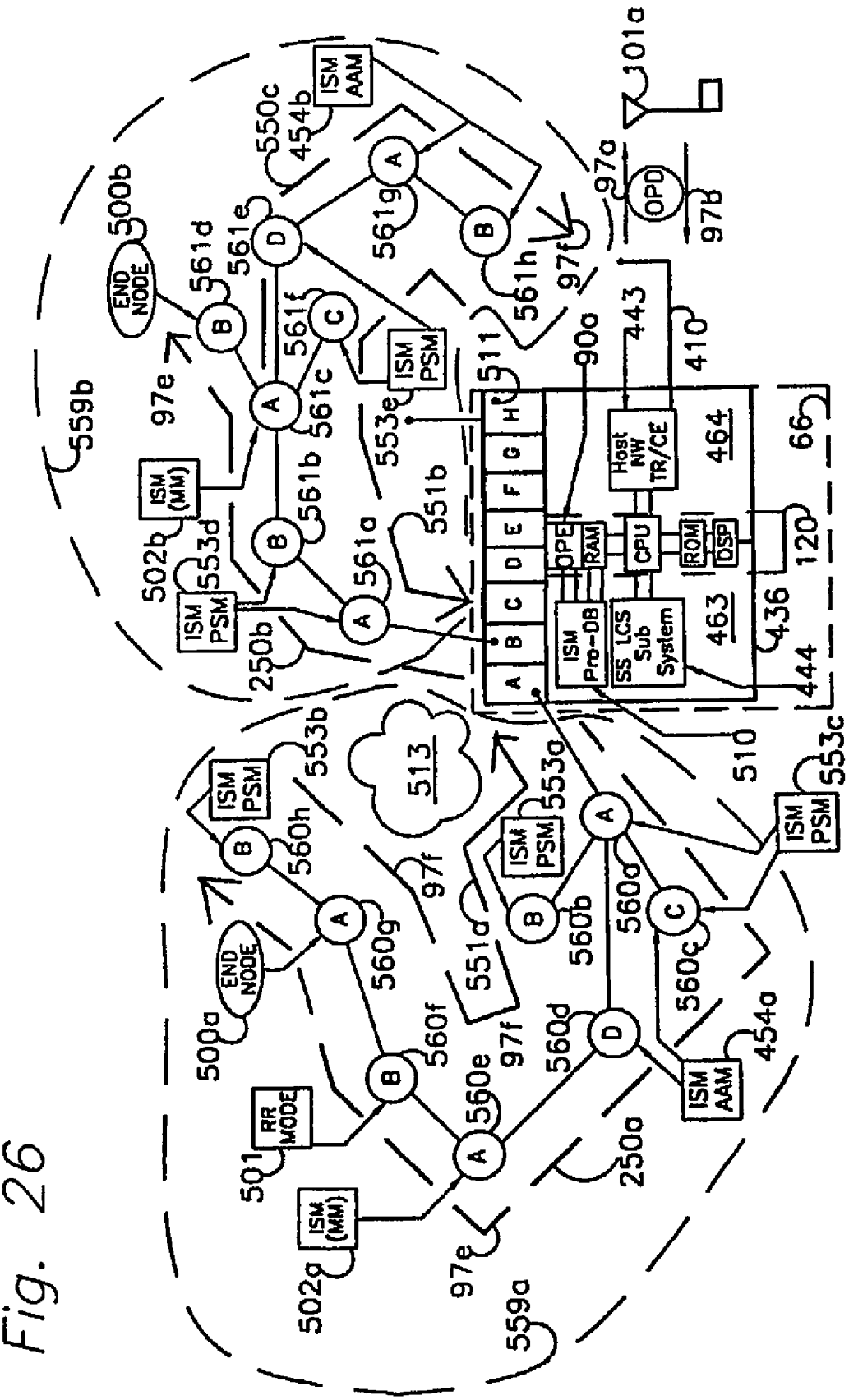
FIG. 26, is a schematic representation of the VTT as wireless server controlling a plurality of ISM radio nodes, according to the invention.

With reference to FIGS. 23, 24, and 25, once the user has completed compiling his desired e-mail message, 427c, he then taps the "send" GUI icon, 465b, on the PDA. Once the "send" GUI icon, 465b, is tapped, the heretofore disclosed OPD connection initializes, and originates the data call flow through the network elements of the GSM PLMN, 98, and further routed to the invention's NOC, 68, and VHS portal, 256, via the PSTN, 112. Once the circuit is established an OPD message can be transmitted. Referring to FIGS. 3 and 4, FIG. 3 depicts the basic conceptual constructs of octave pulse data, 76. The musical harmonic value, 81a-b and 84, of each depicted octave pulse construct and each corresponding alpha numeric character, 77, 78 and 79, are all depicted. Depicted in FIG. 4 is a schematic of the VTT's, 120, transmitter, 87a, and receiver, 88a, with respect to its integrated circuit board (ICB) and its integrated octave pulse engine (OPE), 90a, and octave pulse storage (OPS) chipset, 371a, configuration. Referring to FIG. 3, when a manual user enters conventional alpha, 79, and numeric, 77 and 78, via his PDA, or when a telemetry device changes its state due to internal system state changes, or when connected external telemetry sensors change their respective states, corresponding octave pulse signatures are retrieved from the OPS sample database. The octave pulse retrieval process is similar to the process that transpires when a digital musician chooses a sampled sound that is stored in his music workstation or uses instructional "MIDI file constructs" in a personal computer. The MIDI data stream is a unidirectional asynchronous bitstream that has a data rate of 31.25 Kbps, with 10 bits transmitted per byte: start bit, 8 data bits and one stop bit. The MIDI data stream is usually originated by a MIDI controller, such as a musical instrument keyboard, or by a MIDI sequencer. A MIDI controller is a device that is played like an instrument, which translates the performance into a MIDI data stream in real time. Referring to FIGS. 4 and 26, a users PDA, 65, in one respect can be used as a MIDI controller interface that can facilitate the transport of MIDI File, 214a, instructions to an OPS module, 371a, in order to send specific resonate signatures to the OPE, 90a. This process occurs when the OPE is generating octave pulse signatures during a channel encoding, 125, event.

The Musical Instrument Digital Interface (MIDI) protocol has been widely accepted and utilized by musicians and composers since its conception in the early 1980's. MIDI data is a very efficient method of representing musical performance information and this makes MIDI a robust protocol not only for musicians but also for computer music workstations, computer games that produce sounds, and in some applications for OPD storage and instructional data constructs. MIDI was originally developed to allow musicians to connect synthesizers together, the MIDI protocol is now finding widespread use as a delivery medium to replace or supplement digitized audio in games and multimedia applications. There are several advantages to generating sound with a MIDI synthesizer rather than using sampled audio from disk or CD-ROM. The first advantage is storage space. Data files used to store digitally sampled audio in PCM format such as ".wav" files tend to be quite large. This is especially true for lengthy musical pieces captured in stereo using high sampling rates.

MIDI data files, on the other hand, are extremely small when compared with sampled audio files. Octave pulse signatures are stored in very small files contained within OPS databases. However when cost and overall VTT OPS space must be optimized, MIDI files make perfect sense for some application specific variants. Not all octave pulse signature applications will require MIDI protocol interfaces. Some applications will use small sampled octave pulse signature files without the need of utilizing MIDI protocols. Since octave pulse signature files possesses a 5 ms-time duration value or less, storage within the modular constructs of a VTT, 120a, should not be a problem. With reference to FIGS. 3 and 25, examples illustrating how a few of the user's e-mail message characters are initialized, generated, channel encoded, transmitted, transported and then received, processed and/or stored at the invention's VHS, 256, collocated at the NOC, 68, as shown in FIG. 25. Referring to FIG. 3, and using some characters randomly from a 1000-word e-mail message a user has transmitted. Shown here are ten random numeric characters, 78, "6193750482", 82a, and ten alpha characters "BGKHLURESX", 82b, in a random sequence, 79, respectively. Each of these character sequences has octave pitch values assigned, 81a and 81b, respectively. Each of these twenty characters was randomly extrapolated from the body of the user's e-mail message. When he entered each character with a stylus by sequentially tapping out the complete on the screen of his PDA, and then tapped the "send" icon as previously disclosed, an unique octave pulse data communications processes, means and methods transpires.

Depicted in FIG. 25 is the invention's NOC, 68, which is comprised of a modified short message switching center (SMSC), 377, that comprises a specialized router, 373a, that simultaneously routes MSMS messages, Internet based TCP/IP messages, 110, and SS7/SS#7, 113, TCAP/MAP/USSB messages, 364b, to selected proxy servers, 384, and other data storage elements with respect to the VHS portal, 256. There is provided a programmable telephony switch, 374, that also serves as an SS7 IS-41, or SS#7 MAP based Service Switch Point (SSP), 69. Interconnected with SW/SSP, 69, is a specialized home location register (HLR,) 109, telephony database. There is provided a master hub switch router, 96, that switches Ethernet 803.2 TCP/IP for internal NOC communications with respect to intercommunicating with the VHS, 256, portal elements and octave pulse character conversion (OPCC), 270, elements, including octave pulse generation and compression (OGC), 44, and the main octave pulse engine (MOPE), 90b. The master hub router, 96, also routes wireless session protocol (WSP) traffic, wireless data gram protocol (WDP) traffic, PSTN modem circuit traffic such as digital subscriber line (DSL).

This router also manages various "V." modem based PPP-Slip account data protocols that operate over conventional twisted pair telephone circuits. This switch/router, 96, is also interfaced the Wireless Internet Service Provider (WISP), 383, and routes Internet TCP/IP data packets, and octave pulse streams embedded in PCM frames and subframes, 360a. The master hub switch and router matrix, 96, routes all traffic with respect to incoming, 370, and outgoing, 369, (I/O), 375, NOC and VHS related messages, and all user related messages. All switching and routing is managed by the master hub switch and router, central processors, and programming modules. Within the network elements of the WISP, 383, is the Wireless Transaction Application (WTA) to OPD gateway, the OPD to WTA gateway, the Wireless Application Environment (WAE) to OPD gateway, and the OPD to WAE gateway, 376b. Further comprising the VHS, 256, is the OPS storage area network (SAN), 371b. The OPS is a large data storage array that collects and distributes octave pulse signatures. There is provided a specialized Wireless Application Protocol (WAP) proxy/server, 211, that receives and sends air interface specific, 372, WAP scripts with the Internet after conversion from octave pulse signatures originally send from selected VTT's configured as intelligent PDA sleeves or telemetry-telematic wireless communications terminals.

There is also provided a Wireless Transaction Application (WTA) server, 89b. This server manages commercial business CGI scripts and merchant related application content. This WTA server, 89b, acts as a managing conduit between OPD credit card verification terminals, specific OPD telemetry terminals, and other commercial business transaction activity that requires an Internet to wireless and wireless Internet gateway. There is also provided a VTT origination server, 91, that manages OPD specific maintenance, terminal maintenance and program script. This special server manages maintenance, word, capsule, block, and or complete message resend invocation orders.

There is provided an octave pulse character conversion (OPCC) system, 270. The OPCC has an input OPD conversion, 94, an inbound database-gateway process "A", 40, and process "B", 41. Process "A", 40, receives 45 octave pulse signatures, 92, such as "A natural" or "B flat" complex wave signatures, respectively. Process "B", 41, receives various CGI scripts, application content scripts, wireless markup language (WML) scripts, ASCII-alphanumeric scripts with respect to direct octave pulse to script and script octave pulse conversion. There is provided an out bound OPD post conversion, 95, database-content router process "C", 42, and process "D", 43. Process "C", 42, sends octave pulse signatures to selected PSTN, 112, based PCM circuits, 360a. Process "D", 43, sends selected content script to, 89b, 211, and 91, and to routers, 373a.

Housed in the NOC, described in FIG. 25, are the logical constructs of the OPS./SAN. 321b, which comprise the OPD Enigma-encryption-key message encryption system which acts in conjunction with VTT origination server, 91. Upon origination, the VTT, 120, is interrogated by the VTT origination server, 91, which identify the VTT by scanning the OPS/SAN user Enigma-encryption key database for information contained in the interrogation response. Information in the forms of MS-ISDN Electronic Identification Number (EIN), and Electronic Serial Number (ESN), and Equipment Identity Register (EIR) are compared to the Enigma-encryption key system managed authentication/encryption algorithm, housed in the OPS/SAN. Said authentication/encryption algorithm also makes use of the 28 bits of OPD message codec specific to 20 ms burst identification. In a comparison using the VTT ESN, MS-ISDN EIN, and EIR the authentication/encryption algorithm is able to assign an authentication/encryption key to an OPD 20 ms pulse based on the 28 bits of OPD message codec which identify each OPD pulse.

Depicted in FIG. 26 is a schematic representation of a VTT, 120, structured as an OPD enabled, virtual radio organism (VRO) wireless server, that is configured as an intelligent sleeve, 66, managed by a PDA, 65, as shown in FIG. 23. In FIG. 26, the VRO server, 436, configured as an intelligent sleeve, communicates with, and manages a plurality of ISM/DECT/IEEE802.11 a-e compliant, application specific data only or octave pulse data (OPD) enabled wireless 2.4 Ghz-5.8 Ghz nodes. VTT, 120, component and protocol constructs combined with the VRO server, 436, and additional components and protocols create a unique multilevel data communication system. The VRO server is comprised with up to eight "A-H" 511 inter-nodal transceivers. Each transceiver is octave pulse enabled in addition to other non-OPD communication packet protocols that are specific to ISM, Bluetooth 80C51, DECT and other asynchronous and synchronous data topologies. There is provided a backend module, 465, which comprises a digital cellular or a digital satellite transceiver, 443, that is configured like the OPD enabled VTT, 120, respectively. The front end module, 463, is comprised of an ISM-DECT pro-logic database, 510, that is interfaced with a spread spectrum link control system (LCS), 444, that is octave pulse compatible. The front-end module, 463, is integrated with the eight "A-H" inter-nodal transceivers, 511, that are master control nodes that communicate with and control all application specific nodes operating within these selected ad-hoc pico-nets, 559a and b, respectively. The OPD enabled VRO server backend, 464, communicates through the selected host wireless network base site, 101a, via the reverse channel, 97a, and the forward channel, 97b, via OPD message capsule constructs.

Octave pulse data means and methods are compatible with Bluetooth 80C51, ISM and DECT compliant nodes that provide audio and speech services from the wireless server, 436, to each node. The invention also enables node-to-node communications using octave pulse signatures. Each node is operating in a topographically arranged geometric pattern, with respect to an ad-hoc pico-net topology, 559a and b. For example the VRO-Server, 120b, has been instructed by the invention's VHS that all spread spectrum ISM/802.11 2.4 GHz nodes, 560a-h, and each application specific device must perform an application specific function, and then report the results of the ordered function. Accordingly, while ISM/802.11 2.4 GHz nodes 560a-e have sufficient line-of-sight signal strength, ISM/802.11 2.4 GHz node 560f has marginal radio path integrity and node 560g and 560h have no direct radio link path connectivity. Therefore, ISM/802.11 2.4 GHz node 560e is designated as the master mode operant, 502a, that will act as the route/relay point for nodes in the group or pico-net during the instant data paging, ISM/802.11 FMC, and ISMI/802.11 RMC event that do not have direct line-of-sight with the VRO-Server, 120b. For this event, ISM/802.11 2.4 GHz node 560e in master mode, 502a, acts as the event controller for nodes 560f-h. Because of the physical topography of a particular application area as depicted, the isolated ISM/802.11 2.4 GHz nodes will have to relay ISM/802.11 exception reports to nodes in the same group that have sufficient line of site radio signal strength to the VRO-Server, 436.

The initialization phase of a planned synchronous data telemetry event involves the transmission of concatenated ISM/802.11 FMC pages to some nodes, and simultaneously transmission of asynchronous ISM/802.11 broadcast pages to still other nodes. There are three page message types, each with its-own group of embodied command/action codes. VRO-Server global page causes all spread spectrum ISM/802.11 2.4 GHz nodes to respond in accord with contained instruction sets, commands and action codes. This particular page message is an amalgamation of the conventional ISM/802.11 inquiry message and the connecting page-invoke. The invention uniquely modifies and significantly improves on the conventional means and methods and optimizes wireless data telemetry application usage of ISM/802.11 2.4 GHz 80C51 technology and other spread spectrum based protocols. Since the VRO-Server, 436, always knows its 10-16 I.D. address and physical location of any selected spread spectrum ISM/802.11 2.4 GHz node under its control, the conventional ISM/802.11 node search function of the Bluetooth 80C51 inquiry message is deemed not needed by the invention. Simply if a selected spread spectrum 2.4 GHz node is paged and does not respond as ordered, the node is deemed none operational and is either repaired or replaced in the field by qualified personnel.

This forward page message has four spread spectrum 2.4 GHz node Command/Action codes: (a) set to this designated ISM/802.11 FMC (SS) hopped frequency, receive, recognize and wait for the next concatenated forward ISM/802.11 FMC telemetry "boomerang route/relay protocol" or simultaneous distributed data packet stream via the VRO-Server, (b) set to this designated ISM/802.11 hopped frequency for next Reverse Channel exception report, (c) set this ISM/802.11 hopped frequency and respond with an optional ISM/802.11 acknowledgement report, in accord with received time coded instructions, and (d) set selected ISM/802.11 node to master mode (MM), as a route/relay point for down stream nodes that are operating adjacently and can detect the hand over channel signal but cannot detect direct link transmission power emanating from the VRO-Server ISM/802.11 transceiver.

Another page message type is a nodal group(s) specific or pico-net(s) specific page that serves the same utilitarian functions as the full VRO-Server global page albeit on a smaller more localized scale. A third page message type has all the features of the first two described, but is only sent to one ISM/802.11 2.4 GHz node at a time. Unlike other ISM/802.11 80C51 based wireless technologies one of the fundamental means and methods of the invention is that all VRO ISM/802.11 based data packet messages are coded with unique identifiers. Also, like conventional one way and two way pagers, each of the invention's ISM/802.11 2.4 GHz nodes are designed to only recognize messages that contain a 10-16 and in some cases a 10-64 character identifier that resides in the node designated page/polling packet header.

The invention provides complete hopped frequency assignment flexibility because it is coupled with flexible time coded (TC) ISM/802.11 packets and ISM/802.11 node reporting instruction sets. Because of this there is little possibility of interference from other adjacent application specific telemetry data nodes. In addition, the invention is designed to avoid interference from other conventional ISM/802.11 80C51 communications, or cause interference to other non-VRO spread spectrum 2.4 GHz nodal communications. With the exception of asynchronous broadcast pages and asynchronous ISM/802.11 reverse channel exception reports, all ISM/802.11 RMC, ISM/802.11 paging responses and ISM/802.11 RMC route/relay packet transmission activity is driven and governed by ISM/802.11 FMC originated time coded spread spectrum ISM/802.11 2.4 GHz node response assignment. This works in conjunction with ISM/802.11 hopped frequency management, all governed by the selected VRO-Servers ISM/802.11 front end and selected ISM/802.11 transceiver. There are for example 16 different hopped frequencies available for paging 2.4 GHz nodes. There are 32 hopped frequencies designated for each ISM/802.11 2.4 Ghz nodes. The invention's ISM/802.11 baseband technology supports two link types; (1) Synchronous Connection Oriented Concatenated (SCOC), used primarily for ISM/802.11 concatenated FMC packet streams, and route/relay paging packet streams that are managed in a node to node "spiral-hand-forward-and-return" route/relay fashion, and (2) Asynchronous Connectionless Exception (ACE) report packets, and simultaneous ISM/802.11 Asynchronous Connectionless Paging (ACP) type broadcast messages used for ISM/802.11 2.4 GHz node broadcast paging and status response exception report packet data. In conventional 80C51 SCO protocols this link type is used for connection based voice communications that the invention modifies and provides octave pulse data via modified PCM procedures. The invention radically modifies this feature for more efficient and predictable concatenated application specific data connections and packet stream communications whereby an OPD event connection is necessary.

Different 2.4 GHz nodes can operate in master mode (MM), boomerang-handover (RR) mode, asynchronous receive broadcast mode, or transmit asynchronous packet mode. The same nodal group or piconet can use different link types during a selected event, and the link type can change depending upon the communicative need determined by the VRO-Server during the same instant event. Each link type supports ISM/802.11 FMC, ISM/802.11 RMC, ISM/802.11 paging and ISM/802.11 exception report concatenated and singular packet types. Both link types use a time division duplex (TDD) scheme for full duplex transmissions. The SCOC link type is symmetric and supports timed bound ISM/802.11 FMC and ISM/802.11 RMC, and synchronous "spiral-hand-forward-and-return" code driven concatenated ISM/802.11 paging packets. The invention's spread spectrum 2.4 GHz nodes must be first paged and ordered to report ISM/802.11 RMC concatenated packet streams. ISM/802.11 RMC concatenated status reporting packet streams cannot be transmitted autonomously. However, ISM/802.11 node reverse channel exception report packets can be transmitted autonomously without the ISM/802.11 2.4 GHz node being paged first.

The VRO-Servers ISM/802.11 2.4 GHz transceiver controls the dynamically assigned channel or link, and it also controls link bandwidth and determines how much nodal group or piconet bandwidth is given to each node on a per event basis. The determining factor is governed by what type of event is transpiring; i.e., ISM/802.11 FMC, ISM/802.11 RMC, exception reporting, ISM/802.11 FMC paging, or ISM/802.11 broadcast paging. Error correction is based upon automatic repeat request (ARQ) scheme for all communications. An ARQ scheme is applied in which data transmitted in one hopped frequency slot is directly acknowledged by the recipient in the next slot. For an ISM/802.11 data packet transmission to be acknowledge both the header error check and the cyclic redundancy check must be right.

The VRO spread spectrum ISM/802.11 2.4 GHz wireless node baseband provides nodal protection and telemetry data encryption mechanism at the physical layer. Authentication and encryption is implemented in the same way in each ISM/802.11 2.4 GHz node, appropriate for the ad hoc VRO ISM/802.11 network topological footprint characteristics. Link connections may require one-way polynomial check, two-way nodal challenge, or no authentication. Whether or not ISM/802.11 2.4 Ghz nodal authentication is used is based upon the type of application enabled by the VRO network. There is a high degree of authentication processes and procedures built in to the VRO-Server and its octave pulse data (OPD) communications with the NOC via the selected host wireless and wireline networks. Authentication is deemed not necessary for paging events.

The invention sets up route/relay connections from the VRO-Server to all selected spread spectrum 2.4 GHz nodes under its control and management dynamically on a per event basis like a two way TDD "domino effect" embodied in the invention's novel wireless data communications boomerang-handover mode (RR). This domino effect causes all selected spread spectrum 2.4 GHz nodes to receive on the dynamically assigned forward ISM/802.11 FMC hopped frequencies. These nodes then report back on the dynamically assigned ISM/802.11 RMC assigned frequencies, all are set in accord with time coded assignments during the heretofore disclosed ISM/802.11 FMC procedures. All of this unique activity is controlled by the invention's VRO-Server in the field, and by the NOC via the selected host wireless and wireline network that is utilizing OPD protocols, processes, procedures and message capsule topologies.

Figure 27:
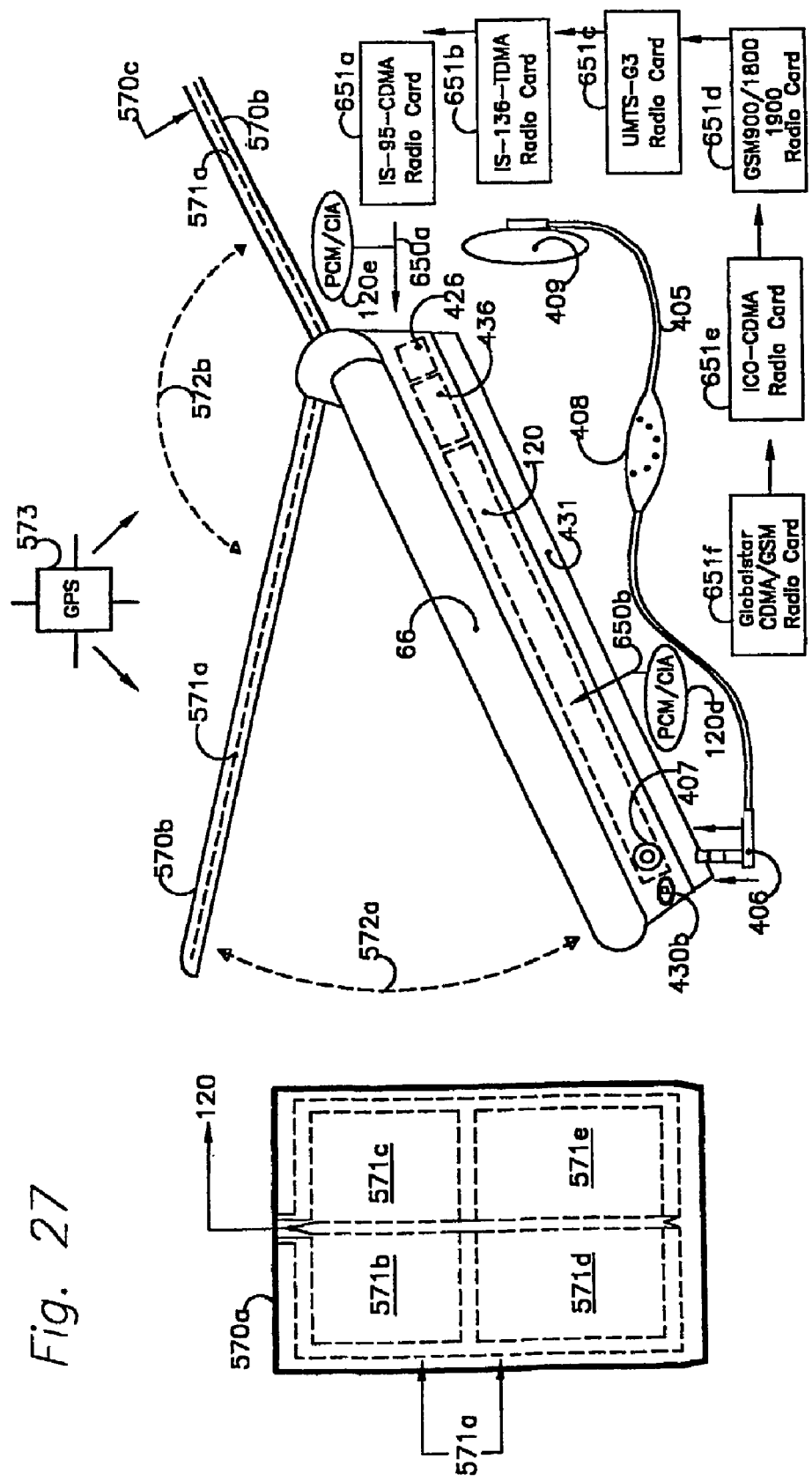
FIG. 27, is a schematic representation of the intelligent sleeve with embedded flat plane antenna, according to the invention, and hot swappable radio cards.

Depicted in FIG. 27 is the intelligent sleeve fitted with a specialized hinged two way PDA cover, 570*a* and *b*, shown in different positions. The antenna is structured in four geometrically derived sections, 571*b-e*, as depicted, and is embedded in the substrate layer of the PDA cover, 570*a*, that is comprised of plastic or a layered polymer-ABS composite construct that also acts as a self-contained printed circuit board (PCB). The PDA cover, 570*a*, is manually opened and closed 572*a* and *b*, in the functional-formation of a 180-degree half radius, 572*b*, pattern. The invention's specialized embedded antenna, 571*a*, is able to receive and transmit radio signals from the top of the PDA cover, 570*b*, and the bottom of the PDA cover, 570*c*. The invention's specialized embedded flat plain antenna is able to transmit and receive the relatively high emitted power of digital cellular frequencies including, but not limited to, 900 Mhz GSM, 1800 Mhz GSM, 1900 Mhz GSM, 1800-1900 Wideband CDMA, narrowband 800/900 Mhz CDMA, and the like. In addition, the antenna, 571*a*, is able to receive the relatively low power of L-Band global positioning system (GPS) signals simultaneously that emanate from a plurality of serving LEO-Navstar satellite space craft, 573, that currently circumnavigate the Earth's Equator.

The Intelligent Sleeve 66 also enables a multi-platform digital cellular and or satellite based digital messaging communications paradigm. The invention provides for a "hot swappable, radio card exchange capability. Disclosed in the body of this disclosure are the means and methods of providing OPD messaging constructs that are compatible with a vast plurality of wireless digital speech modulation schemes, and host network topologies. Therefore, the Intelligent Sleeve 66 is designed to enable easy access to the radio card slot 120*e* that in this case is PCM/CIA compatible 650*a* and 650*b* accordingly. In any given operational scenario, the user may choose to utilize any selected host wireless network that OPD messaging and voice service is activated. For example, the user has traveled from one host wireless PLMN network that is GSM 900/1800 or 1900 compatible, and is now operating in a host digital cellular network that is IS-95-CDMA-800 Mhz he simply swaps OPD radio cards. The invention provides for an IS-95-CDMA-800 Mhz radio card 651*a*, a IS-136-TDMA radio card 651*b*, a UMTS-G3 Radio card 651*c*, a GSM 900/1800/1900 radio card 651*d*, ICO-Satellite-CDMA radio card 651*e*, and a Globalstar-Satellite-CDMA-GSM hybrid radio card 651*f* respectively. The user will benefit from uninterrupted OPD messaging and voice service no matter where he or she travels within an OPD compatible service area. This enclosed radio card change method is much more cost effective than attempting to deploy an Intelligent Sleeve 66 with a dual mode or tri-mode radio card. All forms of OPD enabled radio cards must be provided in order to truly offer a global Wireless Internet messaging capability.

Figure 28:
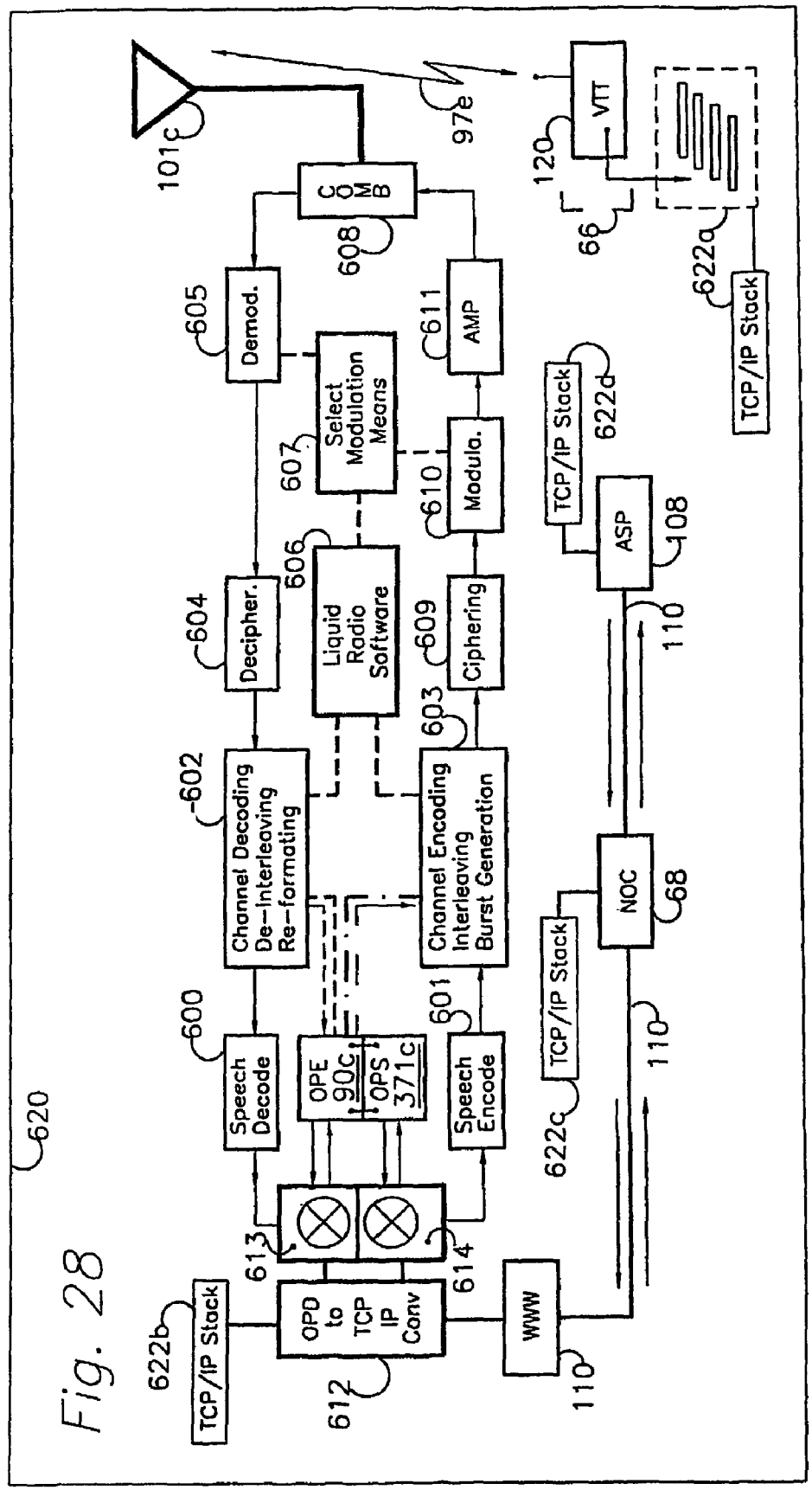
FIG. 28, is a schematic-block diagrammatic representation of the OPD cellular base site radio, according to the invention.

Depicted in FIG. 28 is the invention's novel OPD-TCP/IP Internet compatible digital cellular base site radio system, 620. This novel OPD-base site-systems platform (BSP) enables an innovative hybrid system approach that allows OPD message capsule transport via radio transmission emanating from a VTT, 120, that is configured as an intelligent sleeve, 66, as shown in FIG. 23. With reference to FIG. 28, in addition to the disclosed specifications, the VTT, 120, contains a database that is configured as a TCP/IP message-protocol firmware-software stack, 622*a*. This specialized message stack enables immediate transcoding of OPD speech frame compatible message capsules while simultaneously containing "pre-formatting" or "preparation formatting", in terms of TCP/IP message content formats that have limits such as TCP/IP message packet bit capacity, and the like. The OPD air interface compatible message capsule, 332, as depicted in FIG. 22, allows for an unencumbered "fit" of the TCP/IP stack construct that is resident in the firmware and software data base registers of the VTT TCP/IP stack, 622*a*, illustrated in FIG. 28. This novel formatting construct in fact completely enables immediate transcoding of an OPD air-interface specific speech-frame compatible message capsule format to TCP/IP compatible message packet format within the hardware, firmware, and software means endemic the OPD-base site radio system accordingly.

In reference to FIG. 28, when a selected VTT, 120, transmits OPD-TCP/IP message capsules, 97e, to a currently serving digital cellular base site that utilizes the invention's OPD-TCP/IP compatible base site radio system, 620, the following novel processes and procedures apply. The integral VTT TCP/IP stack, 622a, contains properly formatted message capsule constructs that in fact act as templates and essential data bit containment constructs that utilize full ASCII-text based OPD message formats. These familiar message constructs are similar to conventional e-mail message templates that serve web specific horizontal and vertical market transports for a wide range of information exchange in wireless web environments and content providers using application server pages (ASp) hypertext messaging constructs. Such message formats containing data bits representative of ASCII text messaging may be highly compressed at point of origination, such as the invention's VTT ASIC suite that contains a plurality of data bit compression algorithmic constructs. The invention's NOC also mirrors data bit compression via ASIC and software means, which enable a wide range of VTT specific message capsule constructs that are used to transmit and thus route OPD-TCP/IP packet formats that are compatible with ADPCM 32 kbps, 2 Mbps, 56 kbps and 64 kbps E1/T1 multi-channel speech circuit enabling fiber optic networks, accordingly. Loss less compression means can range from 5-1 to 10:1 ratios or better. These ratios are consistent with public domain compression algorithms such as Lempel-Ziv dictionary algorithms, Huffman Coding, Long-Run Length Coding, Arithmetic Coding, and the like.

Referring to FIG. 28, the OPD-TCP/IP compatible radio system is designed to process and manage OPD-TCP/IP compatible message capsules. The specialized message protocol type detecter (MPTD) is an embedded instruction set construct that resides within the firmware and software of the "liquid radio" module, 606. Module, 606, detects an OPD-TCP/IP compatible message capsule stream and selects for conversion from OPD-TCP/IP compatible air interface-digital speech frame compatible message capsules that operate in accord with the invention's (1) harmonic construct manipulation including musical-octave construct utilization with respect to ASCII character cross protocol processing and formatting relevant to OPD transport and data file storage, (2) complex waveform manipulation, both processes combined constitute a specialized level of OPD messaging that delivers a form of abbreviated ASCII text and numeric character transfer across a selected digital cellular speech channel, satellite speech channel, and ADPCM speech circuits without the need of utilization of conventional data compression and circuit switched modernization, (3) embodiments which use data compression manipulation, and (4) embodiments that encompass novel constructs of Turbo Coding manipulation, and the like, which create another level of OPD messaging that is based upon specialized data compression over digital speech and data channels, and ADPCM circuits that enable full ASCII text messaging, full numeric, full hexadecimal data formats and the like.

Figure 29:
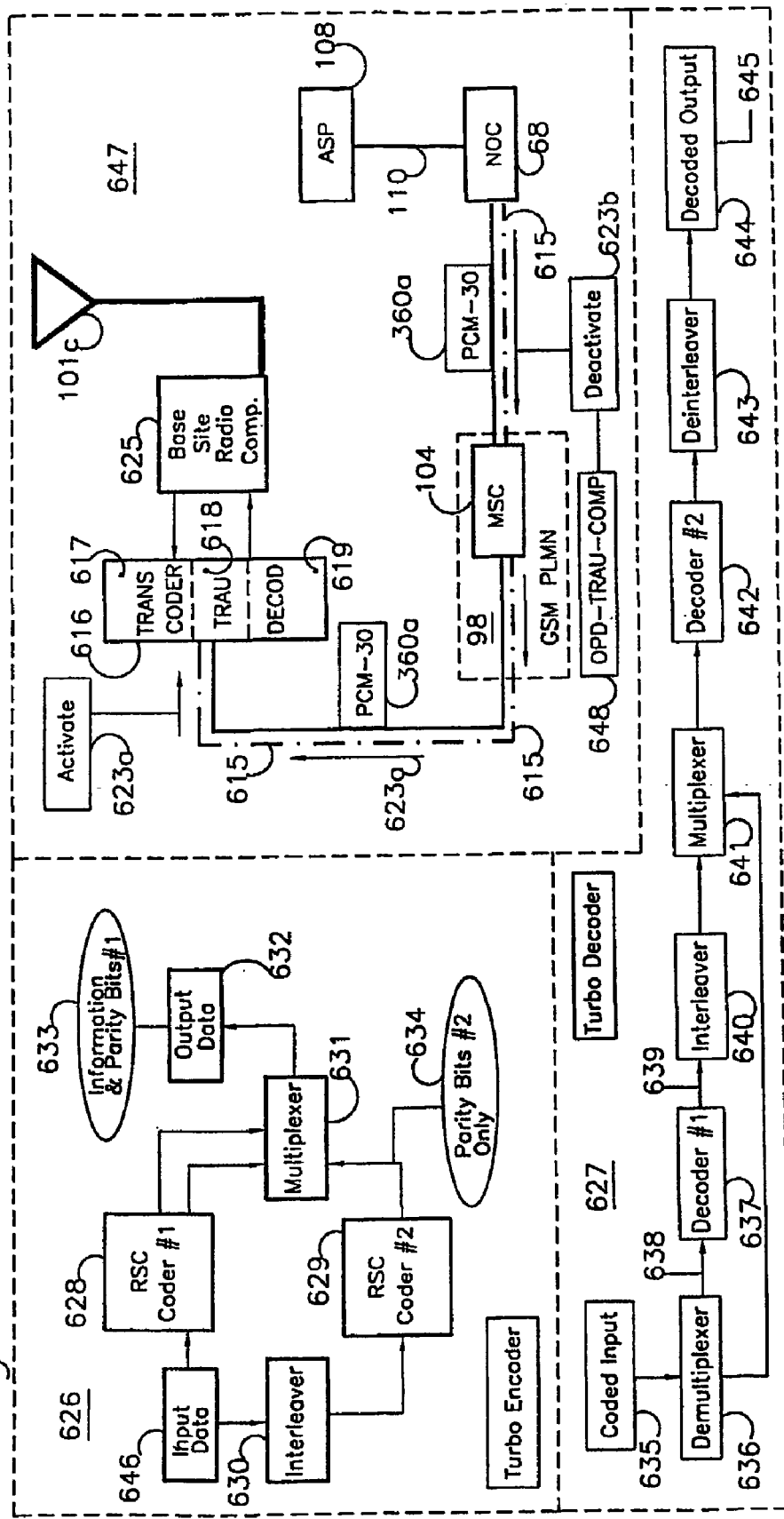
FIG. 29, is a schematic-block diagram of OPD-Turbo Coding, and dynamic TRAU unit management according to the invention.

Referring To FIG. 29, depicted in this drawing example are block diagrams that illustrate the central constructs of a Turbo Code encoder, 626, a Turbo Code decoder, 627, and an off site TRAU unit management protocol sub-system, 647. Detailed description of intricate Turbo Coding constructs is not deemed necessary for the purposes of this disclosure. This broad description encompasses the fundamental novelty of utilizing Turbo Coding in any construct combination as an integrated component of octave pulse data within the essential framework its harmonic messaging constructs. A typical Turbo Code encoder 626, consists of two or more constituent Recursive Systematic Convolutional (RSC) coder(s,) 628 and 629, respectively. Each of the RSC encoders operates on the same input data, 646, but in a different order as specified by the interleaver, 630. A multiplexer 631 selectively combines the encoder output data, 632. The output data, 632, comprises OPD message capsule data as information data expressed in novel constructs such as compressed Full ASCII video messaging combined with real time audio and video imagery, octave pulse harmonic construct messaging, and octave pulse Turbo Coded plus Dictionary Compression algorithmic procedures, Arithmetic Compression algorithmic procedures, Lev-Zimpel Compression algorithmic procedures plus parity bits#1, 633, respectively. RSC coder #2, 629, generates parity bit#2, 634. In FIG. 29 a typical Turbo Code decoder, 627, selectively de-multiplexes coded input data, 635, via the de-multiplexer, 636.

The de-multiplexer, 636, separates the previously combined OPD message capsule data that was received at the coded data input point, 635, respectively. The de-multiplexed OPD stream sends parity-check bits #1, 638, and information bits, 639, comprised as octave pulse data constructs to each decoder #1, 637, and decoder #2, 642, an interleaver module, 640, reorders the OPD bits according to how it was originally encoded at the input data point, 646, located within the Turbo Code encoder, 626, construct. With reference to the Turbo Code Decoder, 627, construct, feedback from the last decoder #1, 637, allows for additional multiplexing via a selected plurality of multiplexer(s), 641, that enable multiple decoder module(s) such as #2 to produce a further multiplicity of decoding iterations that lead to final stages of deinterleaving via a selected deinterleaver module, 643, via a selected decoded distribution port, 644, at OPD message capsule \data output point, 645 accordingly.

In reference to FIG. 29, depicted here is also the invention's Transcoder/Rate Adaptation Unit (TRAU) remote management system (TRMS), 647, according the means and methods of speech channel construct manipulations of protocols, processes and procedures. TRMS system is comprised of selected host network elements that include but are not limited to, a selected currently serving base site, 101c, base site radio-transceiver unit installation configurations, 625, and a base site subsystem (BSS), 616. The transcoder construct simply relates to the process that involves the decoding process performed by the TRAU unit, 618, and the decoder unit, 619, respectively. The conventional protocols, processes and procedures of these respective GSM PLMN networks are known to those of skill in the art, therefore specific details that are external to the specific novelty of the invention's processes and procedures are omitted. A TRAU unit is simply a system that manages speech channel timing and speech frame synchronization with special reference to measuring and adjusting the air interface link with a conventional mobile cellular telephone. The transcoder located in the Base Station Subsystem applies the decoding operations that are the inverse to those applied to digitize the speech signal.

The 13 kbps digitized speech data stream transmitted from a conventional digital cellular mobile station to the transcoder and then decompressed using a standard 64 kbps Adaptive Delta Pulse Code Modulation (ADPCM) configuration: 8 ksamples/s, 8 bits/sample. Conversely a NOC originated OPD message capsule is transmitted via the 64 kbps rate is then reduced to 13 kbps by use of a voice coder. In the TRAU, therefore, the transcoder reformats the 13 kbps vocoder-processed data stream, adds 3 kbps of signaling and expands the format to 64 kbps for ADPCM transmission via the PSTN with reference to 32 kbps speech rate accordingly, again the reverse is true when an OPD message in originated from the NOC. It is in this process of transforming the vocoder-processed data to a PCM data stream that the transcoder creates distortion, of which the present invention circumvents and thus compensates with its OPD-CODEC protocols, processes and procedures. This distortion is innocuous as far as speech is concerned, but would insert damaging errors into a stream of symbolic data if not managed by the invention's NOC ADPCM-OPD-CODEC and the VTT-intelligent sleeve OPD-CODEC respectively. The OPD-CODEC compensates for this essential error generation problem by leaving In addition to this vocoder-to-PCM transformation, the base-band (BB) processing unit in the Base station Subsystem also removes the error control encoding, thus reducing the data rate from 22.8 kbps to 13 kbps.

The OPD-CODEC also compensates for this process with special reference to the heretofore-disclosed novel processes and procedures. In one scenario the invention manages the TRAU unit dynamically via its network operation center (NOC) 68. When a selected ASP, 108, transmits an OPD message request to the currently serving regional NOC, 68, its internal host network management sub-system, also known as the VHS, 256, and the OPCC octave pulse data character conversion and host network element control systems (OPCC), 270, as shown in FIG. 25. With reference to FIG. 29, during initializing of the OPD messaging event, once the ADPCM circuit, 360a, route path, 615, is established, and the GSM or other such digital cellular physical traffic channel, and logical speech channel is assigned and stablized, the NOC, 68, and its OPCC VHS system transmits the OPD-TRAU compensation protocol 648, which maintains TRAU stablization during a selected OPD message capsule event. This event includes the invention's OPD harmonic messaging, OPD video burst full ASCII messaging, video burst real time video and audio, thus enabling MP-3 audio, and intelligent sleeve video conferencing, OPD Turbo Coded and Dictionary Compressed full ASCII messaging and the like. This OPD-TRAU compensation protocol, 648, actualization data instruction sets. OPD message capsules, 332, depicted in FIG. 22, illustrate a specific OPD maintenance word, 335d, that contains a 50 byte payload that contains the instruction sets that initialize the OPD-TRAU compensation protocol as shown in FIG. 29 respectively. The OPD maintenance word acts as the OPD-TRAU compensation protocol, 648, "trigger" with reference to the Deactivation, 623b, instruction set. With reference to FIG. 22, the OPD maintenance word capsule and attached "tail-flag", 336d, increment contains the instruction sets that Activate, 623a, the TRAU unit as shown in FIG. 29 respectively. The 50 btye OPD-maintenance word with "tail flag", TRAU activation instruction sets is always placed at the end of an OPD message event whether the data communication is originated by the invention's VTT or the novel NOC and its contained VHS.

Additional objects and advantages will readily occur to those skilled in the art. The invention in its broader aspects is not limited to the specific details, methods, representative devices, and illustrative examples shown and described. Accordingly, departures may be made from such details without departing from the spirit or scope of the general inventive concept as defined by the appended claims and their equivalents. The examples provided herein are illustrative only, and are in no way meant to limit the invention.

What is claimed is:

1. A method of sending a data communication over a wireless digital voice communication network which transmits voice communications in voice frames, each of which contains a digitized segment of a voice communication in a voice frame format, the method including the steps of:
    (a) encoding the data communication into data frames having the same format as the voice frame format, by substituting each data code word of the data communication with a complex waveform construct assigned as a signature for the data code word to provide a sequence of complex waveform constructs, and subjecting the sequence of complex waveform constructs to voice encoding to encode the data into a plurality of data frames having the same format as the voice frame format and to be handled as voice frames for transmission over the wireless digital voice communications network;
    (b) transmitting the data frames over the wireless digital voice communications network; and
    (c) decoding the data frames to reconstruct the data communication.

2. A method according to claim 1 wherein the data communication is encoded using octave pulse data encoding wherein the complex waveform constructs are octave pulse signatures.

3. A method according to claim 1 wherein the data frames in the data communication are interspersed between voice frames, so that a voice communication and a data communication are transmitted simultaneously.

4. A method according to claim 1 wherein some or all of the data frames include a digitized segment of a voice communication as well as a segment of the data communication, so that a voice communication and a data communication are transmitted simultaneously.

5. A method according to claim 1 wherein the data communication is a text message composed of alphanumeric characters, and the encoding step uses an encoding algorithm which minimizes the number of data frames used to encode the message.

6. A method according to claim 1 wherein the data communication is transmitted by a digital wireless communications device which is:
    (a) an attachment for a portable computer or personal digital assistant;
    (b) a Wireless Application Protocol device; or
    (c) a mobile telephone which has an ability to enter and send data messages.

7. A method according to claim 1 wherein the data communication is received by a digital wireless communications receiver which has an ability to determine dynamically whether a received communication is a voice communication or a data communication, and to process the communication accordingly.

8. Apparatus for transmitting a data communication over a wireless digital voice communication network which transmits voice communications in voice frames, each of which contains a digitized segment of a voice communication in a voice frame format, the apparatus including:
    (a) processor for encoding the data communication into data frames having the same format as the voice frame format, by substituting each data code word of the data communication with a complex waveform construct assigned as a signature for the data code word to provide a sequence of complex waveform constructs, and subjecting the sequence of complex waveform constructs to voice encoding to encode the data into a plurality of data frames having the same format as the voice frame format and to be handled as voice frames for transmission over the wireless digital voice communications network; and (b) a transmitter for transmitting the data frames over the wireless digital voice communications network.

9. Apparatus according to claim 8 wherein the apparatus is a mobile digital wireless communications device which is:
(a) an attachment for a portable computer or personal digital assistant;
(b) a Wireless Application Protocol device; or
(c) a mobile telephone which has an ability to enter and send data messages.

10. Apparatus according to claim 9 wherein the mobile digital wireless communications device is a personal digital assistant or an attachment for a personal digital assistant and the data communication is initiated by tapping on a touch screen on the personal digital assistant.

11. Apparatus according to claim 8 wherein the processor is an octave pulse data encoding processor wherein the complex waveform constructs are octave pulse signatures.

12. Apparatus according to claim 11 wherein the octave pulse data encoding processor is located on a SIM (subscriber identity module) card.

13. A method for communicating octave pulse signature messages between a wireless virtual transaction terminal, and a virtual host system over a wireless telecommunications network that includes a digital traffic channel that transports speech frames and subframes over selected air interface channels, and a pulse code modulated circuit that conveys speech frames and subframes through public land mobile networks, and publicly switched telecommunications networks, the method comprising:
(a) compiling a communicative message derived from stored conventional alphanumeric characters using conventional human machine interface apparatus, the apparatus including a personal digital assistant tablet tap screen;
(b) generating an octave pulse message at the wireless virtual transaction terminal, the message comprising a plurality of octave pulse resonant signature encoding constructs;
(c) encoding each octave pulse resonant signature with complex harmonic waveforms associated with musical constructs interpreted as musical notation.

14. A method for wireless data and voice messaging, comprising:
(a) composing a communicative message derived from alpha-numeric characters wherein each alpha-numeric character is substituted in the communicative message with a complex waveform construct assigned as a signature for the alphanumeric character to provide a communicative message having a sequence of complex waveform constructs;
(b) subjecting the sequence of complex waveform constructs to speech encoding using pulse code modulated circuits to include in manipulated speech frames and subframes the sequence of complex waveform constructs comprising the communicative message encoded as speech and having the same format as a speech frame format; and
(c) conveying the manipulated speech frames and subframes including the speech encoded sequence of complex waveform constructs comprising the communicative message in a speech frame format over air interface traffic channels as speech frames and subframes.

15. A method according to claim 14 wherein using the pulse code modulated circuits to convey the manipulated speech frames and subframes comprises conveying the speech frames and subframes through public land mobile networks and publicly switched telecommunications networks.

16. An apparatus for wireless data and voice messaging, comprising:
(a) a composer to compose a communicative message derived from alpha-numeric characters wherein each alpha-numeric character is substituted in the communicative message with a complex waveform construct assigned as a signature for the alphanumeric character to provide a communicative message having a sequence of complex waveform constructs;
(b) a speech encoder including pulse code modulated circuits to subject the sequence of complex waveform constructs to speech encoding to include in manipulated speech frames and subframes the sequence of complex waveform constructs comprising the communicative message encoded as speech having the same format as a speech frame format; and
(c) a transmitter to convey the manipulated speech frames and subframes including the speech encoded sequence of complex waveform constructs comprising the communicative message in a speech frame format over air interface traffic channels as speech frames and subframes.

17. A method for transmitting data or information or web content material, over air interface traffic channels, using wireless telecommunications networks, whereby the information, data, or web content material is subjected to data compression prior to being transmitted, said method comprising:
(a) composing said data, information, or web content material,
(b) compressing said data, information, or web content material, using any form of data compression algorithm, and subjecting the compressed data to octave pulse harmonic frequency manipulation to substitute each data code word of the compressed data with a complex waveform construct assigned as a signature for the data code word to provide a sequence of complex waveform constructs,
(c) encoding said sequence of complex waveform constructs using speech encoding to encode the sequence of complex waveform constructs into manipulated speech frames or subframes having the formatting of speech frames and subframes, and
(d) transmitting manipulated speech frames and subframes including the sequence of complex waveform constructs over wireless telecommunications networks as speech frames and subframes.

18. A method for transmitting data or information or web content material, over air interface traffic channels, using wireless telecommunications networks, whereby the information, data, or web content material is subjected to turbo encoding prior to being transmitted, said method comprising:
(a) composing said data, information, or web content material,
(b) turbo coding said data, information, or web content material, using any form of turbo encoding algorithm, and subjecting the turbo coded data to octave pulse harmonic frequency manipulation to substitute each data code word of the turbo coded data with a complex waveform construct assigned as a signature for the data code word to provide a sequence of complex waveform constructs,
(c) encoding said sequence of complex waveform constructs using speech encoding to encode the sequence of complex waveform constructs into manipulated speech frames or subframes having the formatting of speech frames and subframes, and (d) transmitting manipulated speech frames and subframes including the sequence of complex waveform constructs over wireless telecommunications networks as speech frames and subframes.

19. A method for transmitting data or information or web content material, over air interface traffic channels, using wireless telecommunications networks, whereby the information, ASCII text messaging, data, or web content material is subjected to video compression prior to being transmitted, said method comprising:

(a) composing said data, full ASCII messaging, or web content material, (b) video compressing said data, full ASCII text messaging, information, or web content material, using any form of data video compression algorithm, and subjecting the video compressed data to octave pulse harmonic frequency manipulation to substitute each data code word of the turbo coded data with a complex waveform construct assigned as a signature for the data code word to provide a sequence of complex waveform constructs, (c) encoding said sequence of complex waveform constructs using speech encoding to encode the sequence of complex waveform constructs into manipulated speech frames or subframes having the formatting of speech frames and subframes, and (d) transmitting manipulated speech frames and subframes including the sequence of complex waveform constructs over wireless telecommunications networks as speech frames and subframes.

* * * * *